(12) United States Patent
Li

(10) Patent No.: US 11,910,197 B2
(45) Date of Patent: Feb. 20, 2024

(54) SERVICE PROCESSING METHOD AND DEVICE

(71) Applicant: Huawei Device Co., Ltd., Dongguan (CN)

(72) Inventor: Zhuofei Li, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 388 days.

(21) Appl. No.: 17/271,281

(22) PCT Filed: Sep. 7, 2018

(86) PCT No.: PCT/CN2018/104697
§ 371 (c)(1),
(2) Date: Feb. 25, 2021

(87) PCT Pub. No.: WO2020/047868
PCT Pub. Date: Mar. 12, 2020

(65) Prior Publication Data
US 2021/0258796 A1    Aug. 19, 2021

(51) Int. Cl.
*H04W 12/71* (2021.01)
*H04W 4/50* (2018.01)
(Continued)

(52) U.S. Cl.
CPC ............ *H04W 12/71* (2021.01); *H04W 4/24* (2013.01); *H04W 4/50* (2018.02); *H04W 12/06* (2013.01); *H04W 12/104* (2021.01); *H04W 12/63* (2021.01)

(58) Field of Classification Search
CPC ....... H04W 12/71; H04W 4/50; H04W 12/63; H04W 12/104; H04W 4/24; H04W 12/06
See application file for complete search history.

(56) References Cited

U.S. PATENT DOCUMENTS 8,646,060 B1 *   2/2014   Ben Ayed ............... H04W 4/20
                                                         726/9
10,623,401 B1 *  4/2020   Yager ...................... H04L 67/12
(Continued)

FOREIGN PATENT DOCUMENTS

CN           1413283 A      4/2003
CN         104272332 A      1/2015
(Continued)

OTHER PUBLICATIONS

Li Bo, et al., "Review on Vulnerability of Vehicle Embedded System," 2018, 5 pages.

*Primary Examiner* — Catherine Thiaw
(74) *Attorney, Agent, or Firm* — Conley Rose, P.C.

(57) ABSTRACT

A service processing method includes receiving, by a mobile phone, a first identifier from a head device of a vehicle after the head device receives a trigger request to perform a vehicle door opening service, determining, by the mobile phone based on the first identifier, to perform authentication, indicating, by the mobile phone, the head device to perform the vehicle door opening service when the authentication succeeds, or determining, by the mobile phone based on the first identifier, not to perform the authentication, and sending, by the mobile phone, location information of the mobile phone, and an indication that indicating a location of the mobile phone and a location of the head device are normal to the head device.

20 Claims, 34 Drawing Sheets

(51) Int. Cl.
*H04W 12/63* (2021.01)
*H04W 12/104* (2021.01)
*H04W 4/24* (2018.01)
*H04W 12/06* (2021.01)

(56) References Cited

U.S. PATENT DOCUMENTS

| | | | |
|---|---|---|---|
| 11,140,175 | B2* | 10/2021 | Zhong .................... G07C 9/29 |
| 11,242,031 | B2* | 2/2022 | Han ...................... B60R 25/245 |
| 2002/0180582 | A1 | 12/2002 | Nielsen |
| 2003/0217151 | A1* | 11/2003 | Roese .................... H04L 67/04 |
| | | | 709/225 |
| 2005/0259620 | A1 | 11/2005 | Igarashi et al. |
| 2008/0258868 | A1 | 10/2008 | Nakajima et al. |
| 2009/0254975 | A1* | 10/2009 | Turnbull ............... H04W 4/029 |
| | | | 709/205 |
| 2011/0112969 | A1 | 5/2011 | Zaid et al. |
| 2011/0252464 | A1* | 10/2011 | Sanjeev ............... H04W 12/30 |
| | | | 715/780 |
| 2012/0066034 | A1 | 3/2012 | Nolan |
| 2012/0079581 | A1 | 3/2012 | Patterson |
| 2013/0159186 | A1 | 6/2013 | Brudnicki et al. |
| 2015/0067819 | A1 | 3/2015 | Shribman et al. |
| 2015/0363986 | A1 | 12/2015 | Hoyos et al. |
| 2016/0358389 | A1 | 12/2016 | Menard et al. |
| 2017/0083898 | A1 | 3/2017 | Sidhu et al. |
| 2017/0148018 | A1 | 5/2017 | Levin |
| 2017/0180388 | A1* | 6/2017 | Belz .................... H04L 63/0853 |
| 2017/0242428 | A1* | 8/2017 | Pal ....................... H04W 12/06 |
| 2018/0098194 | A1 | 4/2018 | Brown et al. |
| 2018/0114384 | A1 | 4/2018 | Graziano |
| 2018/0234797 | A1 | 8/2018 | Ledvina et al. |
| 2018/0288046 | A1* | 10/2018 | Celi, Jr. ............... H04L 63/0884 |
| 2018/0320419 | A1 | 11/2018 | Haugede et al. |
| 2019/0066412 | A1* | 2/2019 | Nam ..................... H04L 63/107 |
| 2019/0098006 | A1* | 3/2019 | Kim ..................... H04W 12/06 |
| 2021/0158639 | A1* | 5/2021 | Westra ................. H04L 9/3271 |
| 2021/0350012 | A1* | 11/2021 | Delaney ............... H04L 63/107 |

FOREIGN PATENT DOCUMENTS

| | | |
|---|---|---|
| CN | 104527576 A | 4/2015 |
| CN | 104580784 A | 4/2015 |
| CN | 104599354 A | 5/2015 |
| CN | 106231099 A | 12/2016 |
| CN | 106416332 A | 2/2017 |
| CN | 106515658 A | 3/2017 |
| CN | 106789067 A | 5/2017 |
| CN | 107215309 A | 9/2017 |
| CN | 107403491 A | 11/2017 |
| CN | 206871026 U | 1/2018 |
| EP | 1469368 A1 | 10/2004 |
| EP | 1653421 A1 | 5/2006 |
| JP | H11321565 A | 11/1999 |
| JP | 2001338356 A | 12/2001 |
| JP | 2003286779 A | 10/2003 |
| JP | 2006044491 A | 2/2006 |
| JP | 2006072937 A | 3/2006 |
| JP | 2006352460 A | 12/2006 |
| JP | 2014180937 A | 9/2014 |
| WO | 2003098908 A1 | 11/2003 |
| WO | 2004080008 A1 | 9/2004 |
| WO | 2017076683 A1 | 5/2017 |
| WO | 2017081639 A2 | 5/2017 |

* cited by examiner

CONT. FROM FIG. 8B-2

CONT. FROM FIG. 8B-2

CONT. FROM FIG. 8B-2

811. Determine whether positioning succeeds

— No → 808A. Prompt a user to perform identity authentication

— Yes → 813. Determine whether first location information obtained through positioning matches historical location information — No → 808A. Prompt a user to perform identity authentication 808A → 808B. Determine whether identity authentication succeeds 808B — Yes → 810A. Send second information, where the second information is signed information, and the second information includes the second identifier → TO FIG. 8B-4

808B — No → TO FIG. 8B-4

813 — Yes → 810B. Send signed first information, where the first information includes a third identifier and first location information → TO FIG. 8B-4

Set the first identifier to be in the first state → TO FIG. 8B-4

FIG. 8B-3

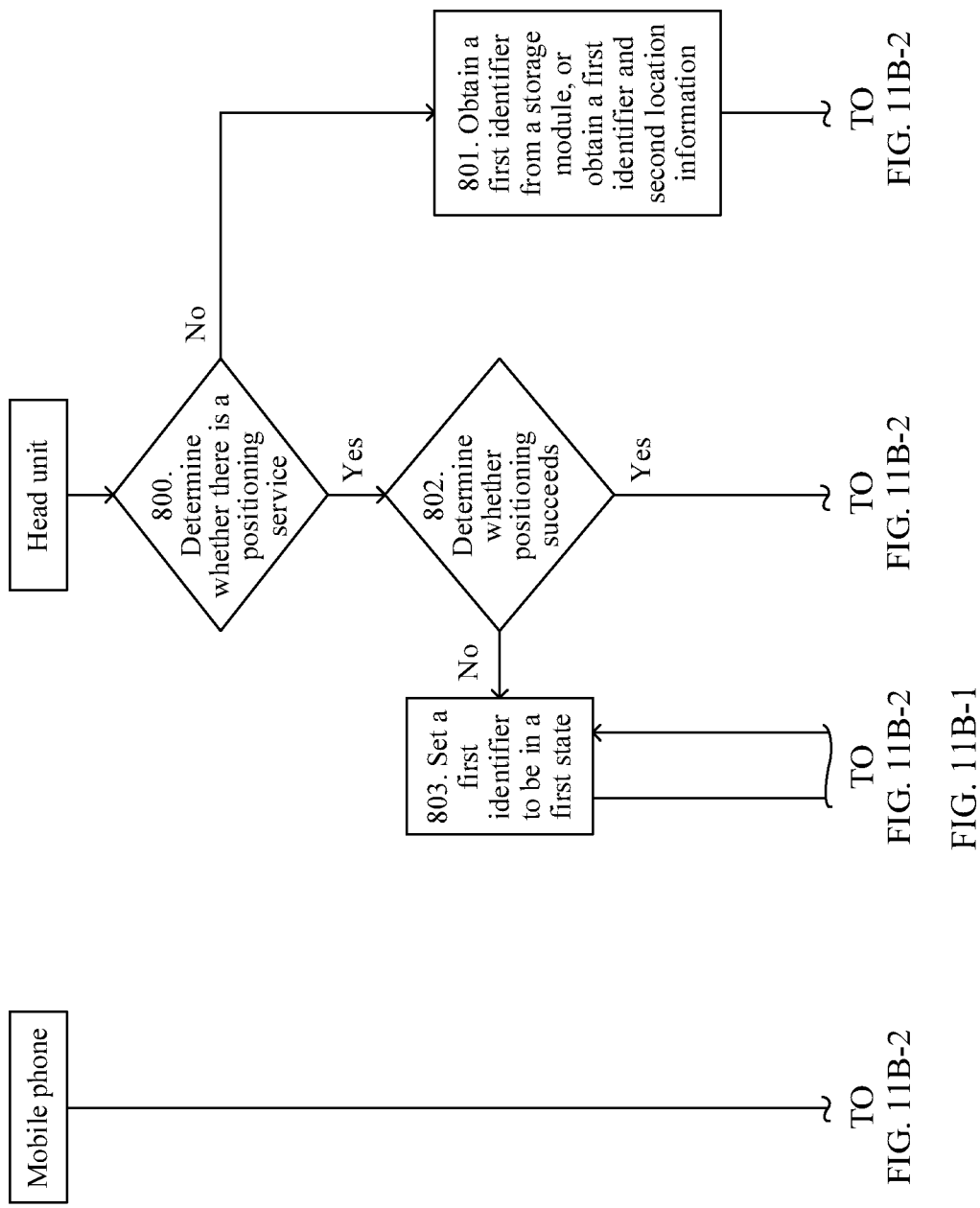

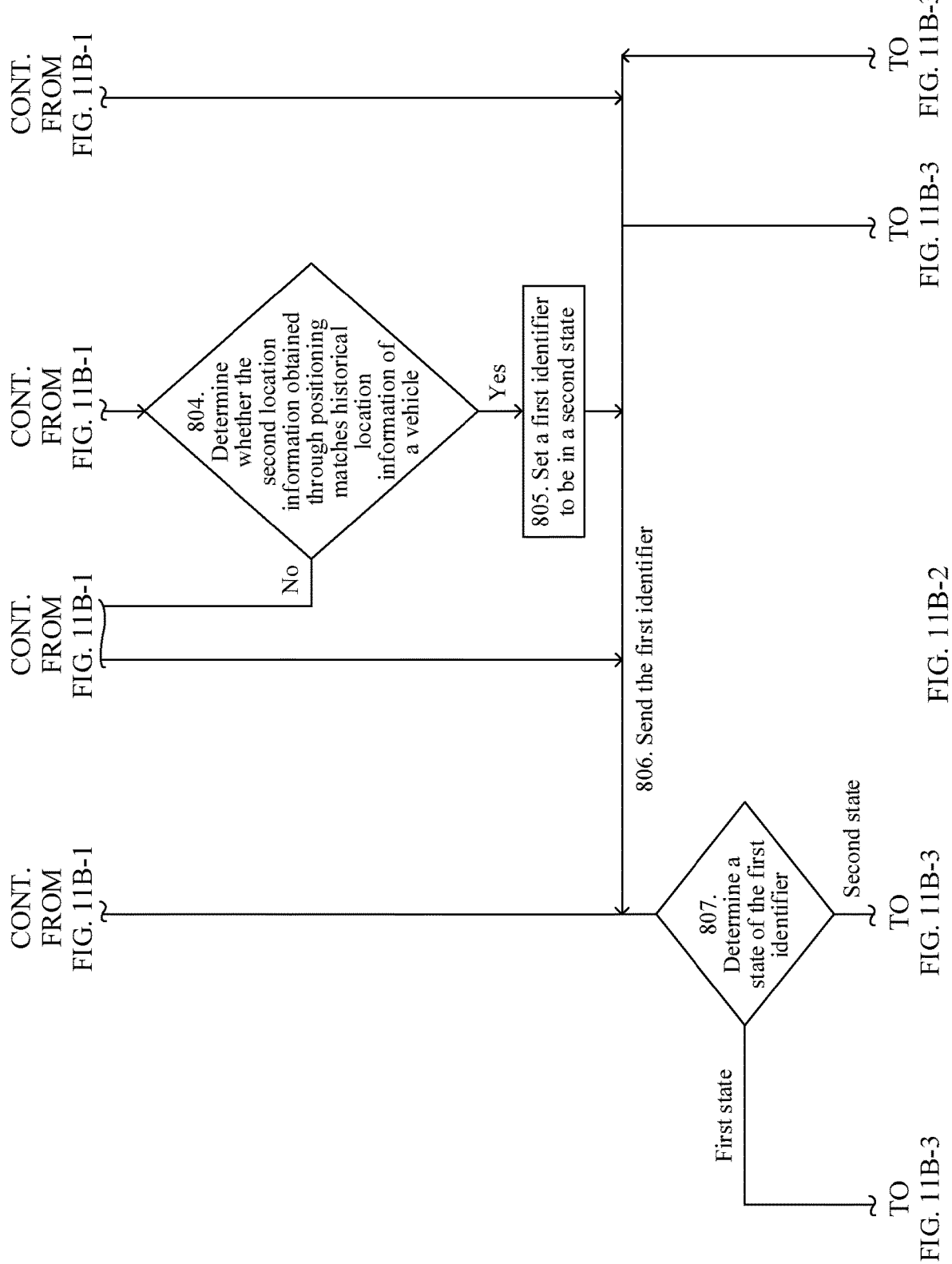

FIG. 11B-4

- CONT. FROM FIG. 11B-3 → 808B. Determine whether identity authentication succeeds
  - No → 809. Send service failure information to the head unit
  - Yes → 810A. Send second information, where the second information is signed information, and the second information includes the second identifier
- CONT. FROM FIG. 11B-3 → 814. Determine whether signature verification succeeds
  - No → 815. Send service failure information to the mobile phone
  - Yes → 816. Determine a state of the second identifier
    - Second identifier → 817. Operate a service
    - Third identifier → 818. Determine whether a location of the mobile phone is valid
      - Yes → 817. Operate a service
      - No → (back to CONT. FROM FIG. 11B-3)

SERVICE PROCESSING METHOD AND DEVICE

CROSS-REFERENCE TO RELATED APPLICATIONS

This application is a U.S. National Stage of International Patent Application No. PCT/CN2018/104697 filed on Sep. 7, 2018, which is hereby incorporated by reference in its entirety.

TECHNICAL FIELD

This application relates to the field of communications technologies, and in particular, to a service processing method and a device.

BACKGROUND

With development of mobile payment, more services are migrated to an electronic device such as a mobile phone. For example, a user uses a mobile phone as a key to open a vehicle door through swiping, a user performs contactless payment in a shopping mall by using a mobile phone bank card, or a user uses a mobile phone bus card to take a bus.

For convenience of the user, many of the foregoing services are usually performed in wireless and contactless transaction manners, and usually can be automatically performed without user intervention, for example, card swiping performed when a mobile phone is turned off, and automatic fee deduction in the background. Consequently, an attacker has an opportunity to perform an illegal operation such as a relay attack and an unauthorized transaction, resulting in low security of these services.

The relay attack is used as an example. Referring to FIG. 1, when a mobile phone 101 of a vehicle owner that supports a vehicle key application is not near the vehicle 102, a relay device 103 of an attacker approaches the mobile phone 101 of the vehicle owner, another relay device 104 of the attacker approaches a door of the vehicle, and the relay device 103 and the relay device 104 may perform remote communication. The relay device 103 obtains a wireless signal such as a Bluetooth signal or a near field communication (near field communication, NFC) signal that is sent by the vehicle key application on the mobile phone 101, and remotely transmits the wireless signal to the relay device 104. The relay device 104 forwards the wireless signal to the vehicle. In this way, the attacker can open the vehicle door by forwarding information in a relay manner. Therefore, security of a vehicle door opening service is relatively low.

SUMMARY

Embodiments of this application provide a service processing method and a device, to improve security of a wireless and contactless service.

To achieve the foregoing objective, the following technical solutions are used in the embodiments of this application.

According to a first aspect, a technical solution of this application provides a service processing method, including: receiving, by a first device, a first identifier sent by a second device, where the first identifier is sent by the second device after the second device receives a trigger request used to perform a first service, the first identifier is in a first state or a second state, the first service is an unlocking service or a payment service, that the first identifier is in the first state indicates that a location of the second device or a location of the first device is abnormal, and that the first identifier is in the second state indicates that the location of the second device is normal; and if the first device determines, based on the received first identifier, to perform authentication, and the authentication succeeds, sending, by the first device, a second identifier to the second device, where the second identifier indicates that it is determined to perform the first service; or if the first device determines, based on the received first identifier, not to perform authentication, sending, by the first device, first information to the second device, where the first information includes first location information and a third identifier, the first location information is location information of the first device, and the third identifier indicates that the location of the first device and the location of the second device are normal. The authentication may be user identity authentication or manual user authentication. For example, the first device may require a user to enter information such as a password and a fingerprint for identity authentication. Alternatively, the first device may indicate, to a user, that the first service is currently to be performed, and request the user to grant authorization. If the user grants authorization, the authentication succeeds, and the first service is performed; or if the user refuses to grant authorization, the authentication fails, and the first service is not performed.

In this solution, the first device may receive the first identifier used to indicate whether the location of the second device or the location of the first device is normal. If the first device determines, based on the first identifier received from the second device, that authentication needs to be performed, and the authentication succeeds, the first device sends the second identifier to the second device, to indicate the second device to perform the first service. If the first device determines, based on the first identifier received from the second device, that authentication does not need to be performed, the first device may send, to the second device, the first location information and the third identifier used to indicate that the location of the first device and the location of the second device are normal, so that the second device performs the first service only when determining, based on the first location information, that the location of the first device is valid, thereby improving security of operating the first service.

In a possible implementation, the sending, by the first device, a second identifier to the second device includes: sending, by the first device, second information including the second identifier to the second device, where the second information is signed information; or the first information is signed information.

The first device sends the third identifier, the first location information, or the second identifier to the second device through the signed information, so that the second device can determine, through signature verification, whether the third identifier, the first location information, or the second identifier is forged or tampered with, thereby improving information security.

In another possible implementation, before the sending, by the first device, a second identifier or first information, the method further includes: performing, by the first device, positioning; and that the first device determines, based on the first identifier, to perform authentication includes: if the received first identifier is in the first state, determining, by the first device, to perform authentication; or if the received first identifier is in the second state, and positioning performed by the first device fails, determining, by the first device, to perform authentication; or if the received first identifier is in the second state, and first location information obtained by the first device through positioning does not match historical location information of the first device, determining, by the first device, to perform authentication.

If the first device receives a first identifier that is in the first state and that is sent by the second device, it indicates that the location of the second device or the location of the first device is abnormal. Therefore, the first device may prompt the user to perform identity authentication. If positioning performed by the first device fails, or if the first location information obtained by the first device through positioning does not match the historical location information of the first device, it may indicate that the location of the first device is abnormal. Therefore, the first device may prompt the user to perform identity authentication.

In another possible implementation, before the sending, by the first device, a second identifier or first information, the method further includes: performing, by the first device, positioning; and that the first device determines, based on the first identifier, not to perform authentication includes: if the received first identifier is in the second state, and first location information obtained by the first device through positioning matches historical location information of the first device, determining, by the first device, not to perform authentication.

If the first device receives a first identifier that is in the second state and that is sent by the second device, and the first location information obtained by the first device through positioning matches the historical location information of the first device, it indicates that both the location of the second device and the location of the first device are normal. Therefore, authentication may not be performed.

In another possible implementation, when the first service is an unlocking service, the first device is a mobile terminal, and the second device is a head unit or a lock. According to the method provided in the technical solutions of this application, security of the unlocking service can be improved.

In another possible implementation, when the first service is a payment service, the first device is a mobile terminal, and the second device is a charging terminal. For example, the first device may be a mobile phone, and the second device may be a POS terminal. According to the method provided in the technical solutions of this application, security of the payment service can be improved.

In another possible implementation, the second device is a head unit, and before the sending, by the first device, a second identifier or first information, the method further includes: obtaining, by the first device, parking location information, where the parking location information is location information of a location at which a vehicle is located when the vehicle is turned off; performing, by the first device, positioning; and that the first device determines, based on the first identifier, to perform authentication includes: if the received first identifier is in the second state, the first location information obtained by the first device through positioning matches the historical location information of the first device, and the first location information does not match the parking location information, determining, by the first device, to perform authentication.

If the first location information does not match the parking location information, it may indicate that the location of the first device is abnormal, and the first device may determine to perform authentication.

In another possible implementation, the second device is a head unit, and before the sending, by the first device, a second identifier or first information, the method further includes: obtaining, by the first device, parking location information, where the parking location information is location information of a location at which a vehicle is located when the vehicle is turned off; performing, by the first device, positioning; and that the first device determines, based on the first identifier, not to perform authentication includes: if the received first identifier is in the second state, the first location information obtained by the first device through positioning matches the historical location information of the first device, and the first location information matches the parking location information, determining, by the first device, not to perform authentication.

If the first location information obtained by the first device through positioning matches the historical location information of the first device, and the first location information matches the parking location information, it may indicate that the location of the first device and the location of the second device are normal. Therefore, it may be determined that authentication is to be performed.

In another possible implementation, the obtaining, by the first device, parking location information includes: receiving, by the first device, the parking location information sent by the second device.

In this solution, the first device may obtain, from the second device, the location information of the vehicle when the vehicle is turned off.

In another possible implementation, the obtaining, by the first device, parking location information includes: receiving, by the first device, parking location request information sent by the second device; and performing, by the first device, positioning, where if the first device obtains third location information through positioning, the third location information is the parking location information.

In this solution, the first device may obtain location information of the first device when the vehicle is turned off. The location information of the first device is the parking location information.

In another possible implementation, the method further includes: setting, by the first device, the first identifier to be in the first state if positioning performed by the first device fails or third location information obtained by the first device through positioning does not match the historical location information of the first device; and sending, by the first device, first parking location response information including the first identifier to the second device, where the first identifier included in the first parking location response information is in the first state; or setting, by the first device, the first identifier to be in the second state if third location information obtained by the first device through positioning matches the historical location information of the first device; and sending, by the first device, second parking location response information including the first identifier and the parking location information to the second device, where the first identifier included in the second parking location response information is in the second state.

In other words, if the first device determines that the location of the first device is abnormal, the first device may send the first identifier in the first state to the second device; or if the first device determines that the location of the first device is normal, the first device may send a first identifier in the second state to the second device.

In another possible implementation, the first device signs the first information in the following manner: obtaining, by the first device, the first location information from a positioning service module through a secure module, where the secure module includes a trusted execution environment TEE module and/or a secure element SE module; signing, by the first device, the first information through the secure module; and sending, by the first device, the signed first information to the second device.

In this way, the secure module of the first device may directly obtain the location information of the first device from the positioning service module and sign the location information. The location information of the first device does not pass through an insecure module, and therefore is not tampered with or forged by the insecure module.

According to a second aspect, a technical solution of this application provides another service processing method, including: receiving, by a second device, a trigger request used to perform a first service, where the first service is an unlocking service or a payment service; sending, by the second device, a first identifier to a first device, where the first identifier is in a first state or a second state, that the first identifier is in the first state indicates that a location of the second device or a location of the first device is abnormal, and that the first identifier is in the second state indicates that the location of the second device is normal; and performing, by the second device, the first service if the second device receives a second identifier sent by the first device, where the second identifier indicates that it is determined to perform the first service; or if the second device receives a third identifier and first location information that are sent by the first device, determining, by the second device based on the first location information, whether the location of the first device is valid, where the first location information is location information of the first device, and the third identifier indicates that the location of the first device and the location of the second device are normal; and performing, by the second device, the first service if the location of the first device is valid.

In this solution, the second device may determine a state of the first identifier based on whether a location of a vehicle and the location of the first device are normal, and send the first identifier in the first state or the first identifier in the second state to the first device, so that the first device determines, based on the first identifier, to send the second identifier or the third identifier. The second device performs the first service if the second device receives the second identifier used to indicate to perform the first service. If the second device determines, based on the first location information and the third identifier used to indicate that the location of the first device and the location of the second device are normal, the second device performs the first service only when determining, based on the first location information, that the location of the first device is valid, thereby improving security of operating the first service.

In a possible implementation, the method further includes: if the location of the first device is invalid, sending, by the second device, the first identifier in the first state to the first device.

If the location of the first device is invalid, it may indicate that the location of the first device is abnormal. Therefore, the second device may send, to the first device, the first identifier that is in the first state and that is used to indicate that the location is abnormal.

In another possible implementation, the performing, by the second device, the first service if the second device receives a second identifier sent by the first device; or if the second device receives a third identifier and first location information that are sent by the first device, determining, by the second device based on the first location information, whether the location of the first device is valid includes: receiving, by the second device, third information sent by the first device; performing, by the second device, signature verification on the third information; performing, by the second device, the first service if the signature verification succeeds and the third information includes the second identifier; and if the signature verification succeeds, and the third information includes the third identifier and the first location information, determining, by the second device based on the first location information, whether the location of the first device is valid.

In this solution, the second device may determine, through signature verification, whether the second identifier, the third identifier, or the first location information is tampered with or forged, thereby improving security.

In another possible implementation, before the sending, by the second device, a first identifier to a first device, the method further includes: obtaining, by the second device, the first identifier from a storage module.

In another possible implementation, before the sending, by the second device, a first identifier to a first device, the method further includes: performing, by the second device, positioning; and setting, by the second device, the first identifier to be in the first state if positioning performed by the second device fails or second location information obtained by the second device through positioning does not match historical location information of the second device; or setting, by the second device, the first identifier to be in the second state if second location information obtained by the second device through positioning matches historical location information of the second device.

If positioning performed by the second device fails, or if the second location information obtained by the second device through positioning does not match the historical location information of the second device, it may indicate that the location of the second device is abnormal. Therefore, the second device may set the first identifier to be in the first state.

If the second location information obtained by the second device through positioning matches the historical location information of the second device, it may indicate that the location of the second device is normal. Therefore, the second device may set the first identifier to be in the second state.

In another possible implementation, when the first service is a payment service, the first device is a mobile terminal, and the second device is a charging terminal. For example, the first device may be a mobile phone, and the second device may be a POS terminal. According to the method provided in the technical solutions of this application, security of the payment service can be improved.

In another possible implementation, when the first service is an unlocking service, the first device is a mobile terminal, and the second device is a head unit or a lock. According to the method provided in the technical solutions of this application, security of the unlocking service can be improved.

In another possible implementation, the second device is a head unit of a vehicle, and before the determining, by the second device based on the first location information, whether the location of the first device is valid, the method further includes: obtaining, by the second device, the second location information from the storage module, where the second location information is parking location information, and the parking location information is location information of a location at which the vehicle is located when the vehicle is turned off. Therefore, the second device may determine, based on the second location information and the first location information, whether the location of the first device is valid.

In another possible implementation, the determining, by the second device based on the first location information, whether the location of the first device is valid includes: if a distance between a location indicated by the first location information and a location indicated by the second location information is less than or equal to a preset threshold, determining, by the second device, that the location of the first device is valid.

In other words, when the first device is near the second device, the second device may consider that the location of the first device is valid.

In another possible implementation, before the receiving, by the second device, third information sent by the first device, the method further includes: sending, by the second device, the parking location information to the first device when the vehicle is turned off. Therefore, the first device may determine, based on the parking location information, whether the location information of the first device matches the parking location information.

In another possible implementation, before the receiving, by the second device, third information sent by the first device, the method further includes: sending, by the second device, the parking location request information to the first device when the vehicle is turned off; and receiving, by the second device, parking location response information sent by the first device, where the parking location response information includes the parking location information, and the parking location information is location information obtained by the first device through positioning performed after the first device receives the parking location request information.

In other words, the parking location information of the second device is the location information of the first device obtained from the first device when the vehicle is turned off.

According to a third aspect, a technical solution of this application provides a service processing apparatus. The apparatus is included in a first device. The apparatus has a function of implementing behavior of the first device in any one of the first aspect and the possible implementations of the first aspect. The function may be implemented by hardware, or may be implemented by hardware executing corresponding software. The hardware or the software includes one or more modules or units corresponding to the foregoing function, for example, an input module or unit, a display module or unit, or a processing module or unit.

According to a fourth aspect, a technical solution of this application provides a service processing apparatus. The apparatus is included in a second device. The apparatus has a function of implementing behavior of the second device in any one of the second aspect and the possible implementations of the second aspect. The function may be implemented by hardware, or may be implemented by hardware executing corresponding software. The hardware or the software includes one or more modules or units corresponding to the foregoing function, for example, an input module or unit, a display module or unit, or a processing module or unit.

According to a fifth aspect, a technical solution of this application provides a service processing system, and the system includes a first device and a second device. The second device receives a trigger request used to perform a first service, where the first service is an unlocking service or a payment service; in response to the trigger request, the first device obtains first location information, where first location information is location information of the first device; the first device sends the first location information to the second device, where the first location information is used by the second device to determine whether a location of the first device is valid. The second device receives the first location information sent by the first device, and the first location information is the location information of the first device. If the second device determines, based on the first location information, that the location of the first device is valid, the second device performs the first service.

In this solution, the first device may send the first location information to the second device, and the second device may determine, based on the first location information, whether the location of the first device is valid, and perform the first service when the location of the first device is valid.

In a possible implementation, that the first device sends the first location information to the second device includes: sending, by the first device, signed first location information to the second device.

The first device sends the signed first location information to the second device, so that the second device can determine, through signature verification, whether the first location information is forged or tampered with, thereby improving security of the first location information.

In another possible implementation, if the first device receives identity authentication request information sent by the second device, the first device prompts the user to perform identity authentication; and if identity authentication succeeds, the first device sends identity authentication success information to the second device; or if identity authentication fails, the first device sends identity authentication failure information to the second device.

After performing authentication, the first device may notify the second device of an authentication result.

In another possible implementation, when the first service is an unlocking service, the first device is a mobile terminal, and the second device is a head unit or a lock. For example, the first device is a mobile phone, and the second device is a door lock of a vehicle door or a door lock of a home door.

In another possible implementation, when the first service is a payment service, the first device is a mobile terminal, and the second device is a charging terminal. For example, the first device may be a mobile phone, and the second device may be a POS terminal. For another example, the first device may be a mobile phone, and the second device may be a bank server. For another example, the first device may be a POS terminal, and the second device may be a bank server.

In another possible implementation, that the second device determines, based on the first location information, whether the location of the first device is valid includes: if a distance between a location indicated by the first location information and a location indicated by the second location information is less than or equal to a preset threshold, the location of the first device is valid.

In other words, if it is indicated, in the second location information, that the location of the first device is near, it may be considered that the location of the first device is valid. The second location information is reference location information.

In another possible implementation, before the second device determines, based on the first location information, whether the location of the first device is valid, the method further includes: performing, by the second device, signature verification on the first location information; and that the second device determines, based on the first location information, whether the location of the first device is valid includes: if the signature verification succeeds, determining, by the second device based on the first location information, whether the location of the first device is valid.

In this way, the second device may determine, through signature verification, whether the first location information is forged or tampered with, thereby improving security of the first location information, and improving security of the first service.

Optionally, if the location of the first device is invalid, the second device refuses to perform the first service.

In this solution, if the location of the first device is invalid, the second device may not perform the first service.

Alternatively, optionally, if the location of the first device is invalid, the second device sends identity authentication request information to the first device; and if the second device receives authentication success information sent by the first device, the second device performs the first service; or if the second device receives authentication failure information sent by the first device, the second device refuses to perform the first service.

In this solution, if the location of the first device is invalid, the second device may request the first device to perform authentication, and process the first service based on an identity authentication result.

According to a sixth aspect, a technical solution of this application further provides an electronic device, and the electronic device is configured to implement a function of the first device in any possible implementation of the foregoing service processing system.

According to a seventh aspect, a technical solution of this application further provides an electronic device, and the electronic device is configured to implement a function of the second device in any possible implementation of the foregoing service processing system.

According to an eighth aspect, an embodiment of this application provides an electronic device, including one or more processors and one or more memories. The one or more memories are coupled to the one or more processors, the one or more memories are configured to store computer program code, the computer program code includes a computer instruction, and when the one or more processors execute the computer instruction, the electronic device performs the service processing method in any possible implementation of the first aspect or the second aspect.

According to a ninth aspect, an embodiment of this application provides a computer storage medium, including a computer instruction. When the computer instruction is run on an electronic device, the electronic device is enabled to perform the service processing method in any possible implementation of the first aspect or the second aspect.

According to a tenth aspect, an embodiment of this application provides a computer program product. When the computer program product is run on a computer, the electronic device is enabled to perform the service processing method in any possible implementation of the first aspect or the second aspect.

BRIEF DESCRIPTION OF DRAWINGS

FIG. 8A-1 to FIG. 8A-4 are a flowchart of another service processing method according to an embodiment of this application;

FIG. 8B-1 to FIG. 8B-4 are a flowchart of another service processing method according to an embodiment of this application;

FIG. 11A-1 to FIG. 11A-4 are a flowchart of another service processing method according to an embodiment of this application;

FIG. 11B-1 to FIG. 11B-4 are a flowchart of another service processing method according to an embodiment of this application;

DESCRIPTION OF EMBODIMENTS

The following describes the technical solutions in the embodiments of this application with reference to the accompanying drawings in the embodiments of this application. In description of the embodiments of this application, "l" means "or" unless otherwise specified. For example, A/B may represent A or B. In this specification, "and/or" describes only an association relationship for describing associated objects and represents that three relationships may exist. For example, A and/or B may represent the following three cases: Only A exists, both A and B exist, and only B exists. In addition, in the descriptions in the embodiments of this application, "a plurality of" means two or more than two.

Figure 2:
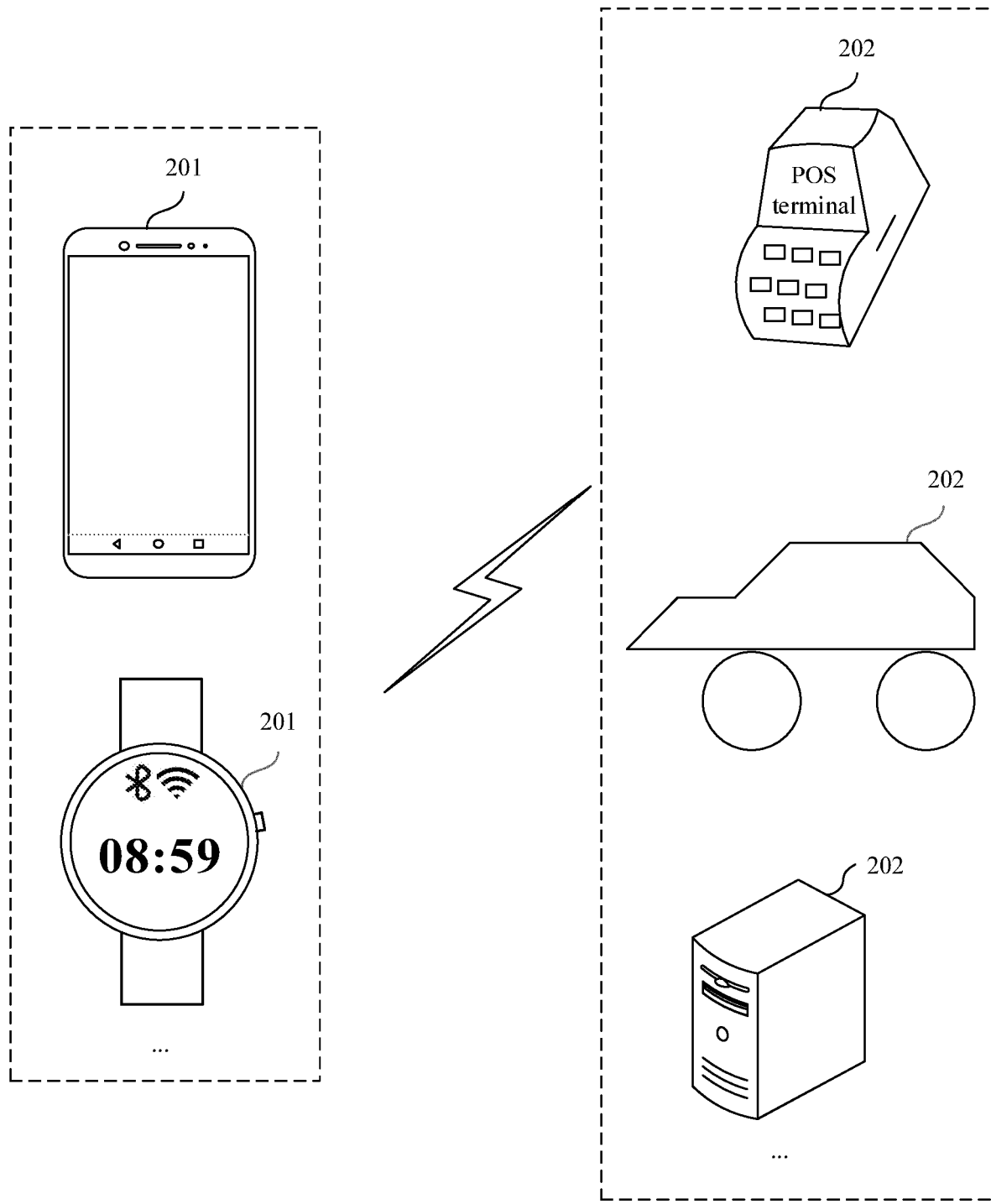
FIG. 2 is a schematic diagram of a service processing system according to an embodiment of this application.

An embodiment of this application provides a service processing method, which may be applied to a service processing system 200 shown in FIG. 2. As shown in FIG. 2, the service processing system 200 may include a first device 201 and a second device 202. The first device 201 may support one or more service applications. The first device 201 and the second device 202 perform service processing in a wireless communication manner and a contactless manner, for example, open a vehicle door, opening a home door, swiping a bus card, swiping a credit card, and paying a fee at a toll station.

The wireless communication manner may include manners such as Bluetooth (Bluetooth, BT), near field communication (near field communication, NFC), wireless fidelity (wireless fidelity, Wi-Fi) P2P, and infrared (infrared, IR). The first device 201 may be a terminal such as a mobile phone, a wearable device, a portable device, an augmented reality (augmented reality, AR)/virtual reality (virtual reality, VR) device, a tablet, a notebook computer, an ultra-mobile personal computer (ultra-mobile personal computer, UMPC), a netbook, a personal digital assistant (personal digital assistant, PDA), or a vehicle-mounted device. A specific type of the terminal is not limited in this embodiment of this application. The second device 202 may be a device such as a POS terminal, a server, or a head unit that can perform a transaction service with the first device 201 such as a mobile phone or a wearable device.

Figure 3:
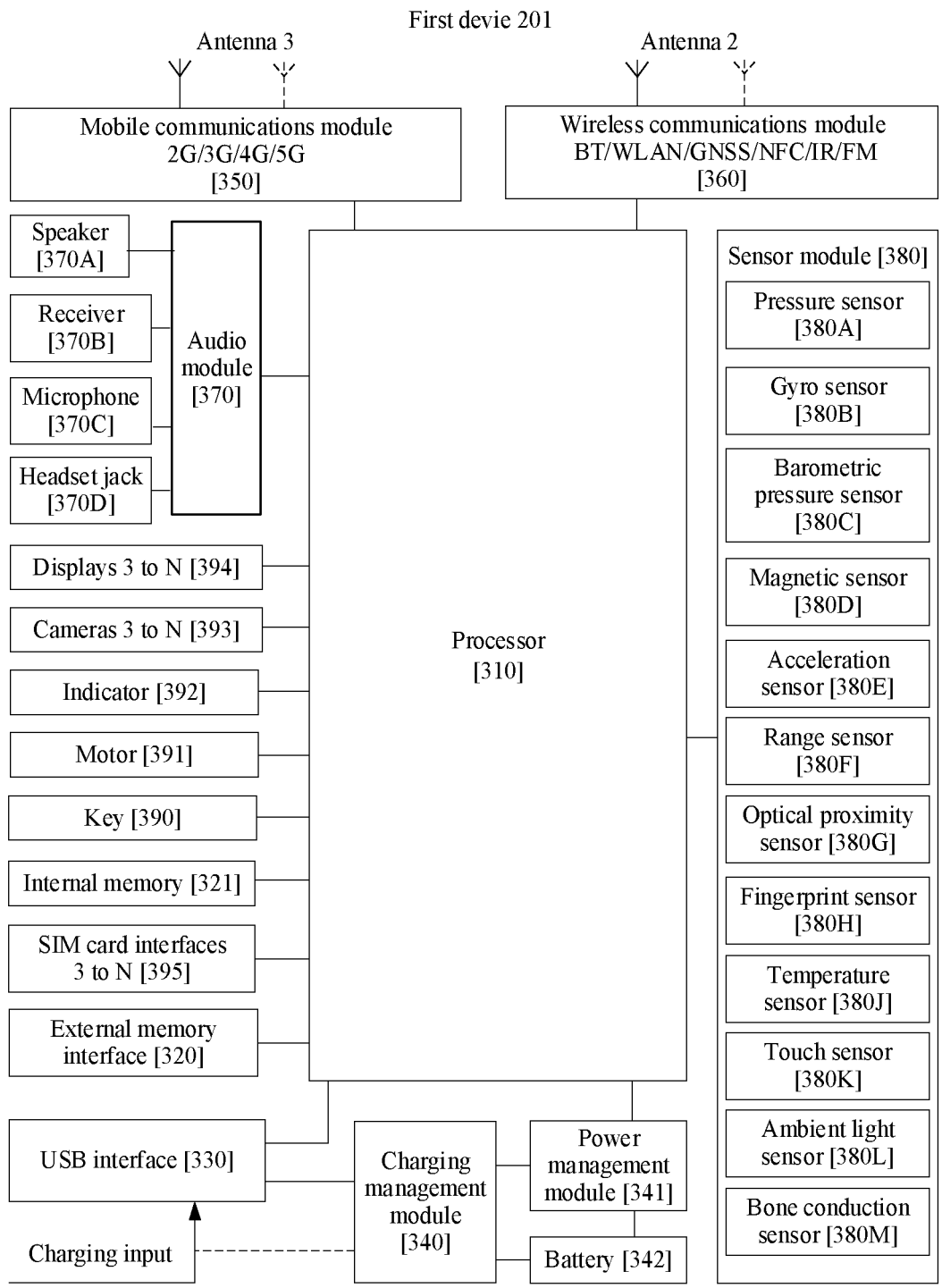
FIG. 3 is a schematic structural diagram of hardware of a first device according to an embodiment of this application.

For example, FIG. 3 is a schematic structural diagram of a first device 201. The first device 201 may include a processor 310, an external memory interface 320, an internal memory 321, a universal serial bus (universal serial bus, USB) interface 330, a charging management module 340, a power management module 341, a battery 342, an antenna 1, an antenna 2, a mobile communications module 350, a wireless communications module 360, an audio module 370, a speaker 370A, a receiver 370B, a microphone 370C, a headset jack 370D, a sensor module 380, a key 390, a motor 391, an indicator 392, a camera 393, a display 394, a subscriber identification module (subscriber identification module, SIM) card interface 395, and the like. The sensor module 380 may include a pressure sensor 380A, a gyro sensor 380B, a barometric pressure sensor 380C, a magnetic sensor 380D, an acceleration sensor 380E, a range sensor 380F, an optical proximity sensor 3806, a fingerprint sensor 380H, a temperature sensor 380J, a touch sensor 380K, an ambient light sensor 380L, a bone conduction sensor 380M, and the like.

It may be understood that the structure shown in this embodiment of this application does not constitute a specific limitation on the first device 201. In some other embodiments of this application, the first device 201 may include more or fewer components than those shown in the figure, or some components may be combined, or some components may be split, or different component arrangements may be used. The components shown in the figure may be implemented by hardware, software, or a combination of software and hardware.

The processor 310 may include one or more processing units. For example, the processor 310 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural processing unit (neural-network processing unit, NPU). Different processing units may be independent devices, or may be integrated into one or more processors.

The controller may be a nerve center and a command center of the first device 201. The controller may generate an operation control signal based on instruction operation code and a time sequence signal, to complete control of fetch instruction and execution instruction.

A memory may be further disposed in the processor 310, and is configured to store an instruction and data. In some embodiments, the memory in the processor 310 is a cache. The memory may store an instruction or data that is just used or cyclically used by the processor 310. If the processor 310 needs to use the instruction or the data again, the processor 310 may directly invoke the instruction or the data from the memory, to avoid repeated access and reduce a waiting time of the processor 310, thereby improving system efficiency.

In some embodiments, the processor 310 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identification module (subscriber identity module, SIM) interface, a universal serial bus (universal serial bus, USB) interface, and/or the like.

The I2C interface is a two-way synchronization serial bus, and includes a serial data line (serial data line, SDA) and a serial clock line (derail clock line, SCL). In some embodiments, the processor 310 may include a plurality of groups of I2C buses. The processor 310 may be coupled to the touch sensor 380K, a charger, a flash light, the camera 393, and the like through different I2C bus interfaces. For example, the processor 310 may be coupled to the touch sensor 380K by using the I2C interface, so that the processor 310 communicates with the touch sensor 380K through the I2C bus interface, to implement a touch function of the first device 201.

The I2S interface may be configured to perform audio communication. In some embodiments, the processor 310 may include a plurality of groups of I2S buses. The processor 310 may be coupled to the audio module 370 through the I2S bus, to implement communication between the processor 310 and the audio module 370. In some embodiments, the audio module 370 may transmit an audio signal to the wireless communications module 360 through the I2S interface, to implement a function of answering a call by using a Bluetooth headset.

The PCM interface may also be configured to: perform audio communication, and sample, quantize, and code an analog signal. In some embodiments, the audio module 370 and the wireless communications module 360 may be coupled through a PCM bus interface. In some embodiments, the audio module 370 may also transmit an audio signal to the wireless communications module 360 through the PCM interface, to implement a function of answering a call by using a Bluetooth headset. Both the I2S interface and the PCM interface may be configured to perform audio communication.

The UART interface is a universal serial data bus, and is configured to perform asynchronous communication. The bus may be a two-way communications bus, and converts to-be-transmitted data between serial communication and parallel communication. In some embodiments, the UART interface is usually configured to connect the processor 310 to the wireless communications module 360. For example, the processor 310 communicates with a Bluetooth module in the wireless communications module 360 through the UART interface, to implement a Bluetooth function. In some embodiments, the audio module 370 may transmit an audio signal to the wireless communications module 360 through the UART interface, to implement a function of playing music through a Bluetooth headset.

The MIPI interface may be configured to connect the processor 310 to a peripheral component such as the display 394 or the camera 393. The MIPI interface includes a camera serial interface (camera serial interface, CSI), a display serial interface (display serial interface, DSI), and the like. In some embodiments, the processor 310 communicates with the camera 393 through the CSI interface, to implement a photographing function of the first device 201. The processor 310 communicates with the display 394 through the DSI interface, to implement a display function of the first device 201.

The GPIO interface may be configured by software. The GPIO interface may be configured as a control signal, or may be configured as a data signal. In some embodiments, the GPIO interface may be configured to connect the processor 310 to the camera 393, the display 394, the wireless communications module 360, the audio module 370, the sensor module 380, and the like. The GPIO interface may alternatively be configured as the I2C interface, the I2S interface, the UART interface, the MIPI interface, or the like.

The USB interface 330 is an interface that conforms to a USB standard specification, and may be specifically a mini USB interface, a micro USB interface, a USB Type C interface, or the like. The USB interface 330 may be configured to connect to the charger to charge the first device 201, or may be configured to perform data transmission between the first device 201 and a peripheral device, or may be configured to connect to a headset to play audio through the headset. The interface may alternatively be configured to connect to another electronic device such as an AR device.

It may be understood that an interface connection relationship between the modules that is shown in this embodiment of the present invention is merely an example for description, and does not constitute a limitation on a structure of the first device 201. In some other embodiments of this application, the first device 201 may alternatively use an interface connection manner different from that in the foregoing embodiment, or a combination of a plurality of interface connection manners.

The charging management module 340 is configured to receive a charging input from the charger. The charger may be a wireless charger or a wired charger. In some embodiments of wired charging, the charging management module 340 may receive a charging input of the wired charger through the USB interface 330. In some embodiments of wireless charging, the charging management module 340 may receive a wireless charging input through a wireless charging coil of the first device 201. The charging management module 340 supplies power to an electronic device through the power management module 341 while charging the battery 342.

The power management module 341 is configured to connect the battery 342 and the charging management module 340 to the processor 310. The power management module 341 receives an input of the battery 342 and/or the charging management module 340, and supplies power to the processor 310, the internal memory 321, an external memory, the display 394, the camera module 393, the wireless communications module 360, and the like. The power management module 341 may be further configured to monitor parameters such as a battery capacity, a battery cycle count, and a battery health status (electric leakage or impedance). In some other embodiments, the power management module 341 may alternatively be disposed in the processor 310. In some other embodiments, the power management module 341 and the charging management module 340 may alternatively be disposed in a same device.

A wireless communication function of the first device 201 may be implemented by using the antenna 1, the antenna 2, the mobile communications module 350, the wireless communications module 360, the modem processor, the baseband processor, and the like.

The antenna 1 and the antenna 2 are configured to: transmit and receive an electromagnetic wave signal. Each antenna in the first device 201 may be configured to cover one or more communications frequency bands. Different antennas may be further multiplexed, to improve antenna utilization. For example, the antenna 1 may be multiplexed as a diversity antenna in a wireless local area network. In some other embodiments, the antenna may be used in combination with a tuning switch.

The mobile communications module 350 can provide a solution, applied to the first device 201, to wireless communication including 2G/3G/4G/5G, and the like. The mobile communications module 350 may include at least one filter, a switch, a power amplifier, a low noise amplifier (low noise amplifier, LNA), and the like. The mobile communications module 350 may receive an electromagnetic wave by using the antenna 1, perform processing such as filtering or amplification on the received electromagnetic wave, and transmit the electromagnetic wave to the modem processor for demodulation. The mobile communications module 350 may further amplify a signal modulated by the modem processor, and convert the signal into an electromagnetic wave for radiation by using the antenna 1. In some embodiments, at least some function modules in the mobile communications module 350 may be disposed in the processor 310. In some embodiments, at least some function modules in the mobile communications module 350 may be disposed in a same device as at least some modules in the processor 310.

The modem processor may include a modulator and a demodulator. The modulator is configured to modulate a to-be-sent low-frequency baseband signal into a medium or high-frequency signal. The demodulator is configured to demodulate a received electromagnetic wave signal into a low-frequency baseband signal. Then, the demodulator transfers the low-frequency baseband signal obtained through demodulation to the baseband processor for processing. The low-frequency baseband signal is processed by the baseband processor, and is then transferred to an application processor. The application processor outputs a sound signal through an audio device (which is not limited to the speaker 370A, the receiver 370B, or the like), or displays an image or a video through the display 394. In some embodiments, the modem processor may be an independent component. In some other embodiments, the modem processor may be independent of the processor 310, and is disposed in a same device as the mobile communications module 350 or another function module.

The wireless communications module 360 may provide a wireless communication solution that is applied to the first device 201 and that include a wireless local area network (wireless local area networks, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, or an infrared (infrared, IR) technology. The wireless communications module 360 may be one or more components integrating at least one communications processor module.

The wireless communications module 360 receives an electromagnetic wave by using the antenna 2, performs frequency modulation and filtering processing on the electromagnetic wave signal, and sends a processed signal to the processor 310. The wireless communications module 360 may further receive a to-be-sent signal from the processor 310, perform frequency modulation and amplification on the signal, and convert the signal into an electromagnetic wave for radiation by using the antenna 2.

In some embodiments, the antenna 1 of the first device 201 is coupled to the mobile communications module 350, and the antenna 2 is coupled to the wireless communications module 360, so that the first device 201 can communicate with a network and another device by using a wireless communications technology. The wireless communications technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (beidou navigation satellite system, BDS), a quasi-zenith satellite system (quasi-zenith satellite system, QZSS), and/or satellite based augmentation systems (satellite based augmentation systems, SBAS).

The first device 201 implements a display function by using the GPU, the display 394, the application processor, and the like. The GPU is a microprocessor for image processing, and connects the display 394 to the application processor. The GPU is configured to perform mathematical and geometric calculation, and is configured to render an image. The processor 310 may include one or more GPUs, which execute a program instruction to generate or change display information.

The display 394 is configured to display an image, a video, and the like. The display 394 includes a display panel. The display panel may be a liquid crystal display (liquid crystal display, LCD), an organic light-emitting diode (organic light-emitting diode, OLED), an active-matrix organic light emitting diode or an active-matrix organic light emitting diode (active-matrix organic light emitting diode, AMOLED), a flexible light-emitting diode (flex light-emitting diode, FLED), a mini LED, a micro LED, a micro OLED, a quantum dot light emitting diode (quantum dot light emitting diodes, QLED), or the like. In some embodiments, the first device 201 may include one or N displays 394, where N is a positive integer greater than 1.

The first device 201 may implement a photographing function by using the ISP, the camera 393, the video codec, the GPU, the display 394, the application processor, and the like.

The ISP is configured to process data fed back by the camera 393. For example, during photographing, a shutter is pressed, a ray of light is transmitted to a light-sensitive element of the camera through a lens, and an optical signal is converted into an electrical signal. The light-sensitive element of the camera transmits the electrical signal to the ISP for processing, and converts the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 393.

The camera 393 is configured to capture a static image or a video. An optical image of an object is generated by using the lens, and is projected to a light-sensitive element. The light-sensitive element may be a charge coupled device (charge coupled device, CCD) or a complementary metal-oxide-semiconductor (complementary metal-oxide-semiconductor, CMOS) phototransistor. The light-sensitive element converts an optical signal into an electrical signal, and then transmits the electrical signal to the ISP to convert the electrical signal into a digital image signal. The ISP outputs the digital image signal to a DSP for processing. The DSP converts the digital image signal into an image signal of a standard format such as RGB or YUV. In some embodiments, the first device 201 may include one or N cameras 393, where N is a positive integer greater than 1.

The digital signal processor is configured to process a digital signal, and may process another digital signal in addition to the digital image signal. For example, when the first device 201 selects a frequency, the digital signal processor is configured to perform Fourier transform on frequency energy and the like.

The video codec is configured to compress or decompress a digital video. The first device 201 may support one or more video codecs. In this way, the first device 201 can play or record videos in a plurality of coding formats, for example, moving picture experts group (moving picture experts group, MPEG) 1, MPEG 2, MPEG 3, and MPEG 4.

The NPU is a neural-network (neural-network, NN) computing processor, quickly processes input information by referring to a structure of a biological neural network, for example, by referring to a transfer mode between human brain neurons, and may further continuously perform self-learning. Applications such as intelligent cognition of the first device 201 may be implemented by using the NPU, for example, image recognition, facial recognition, speech recognition, and text understanding.

The external memory interface 320 may be configured to connect to an external memory card, for example, a micro SD card, to extend a storage capability of the first device 201. The external storage card communicates with the processor 310 by using the external memory interface 320, to implement a data storage function. For example, music and videos are stored in the external storage card.

The internal memory 321 may be configured to store computer executable program code, and the computer executable program code includes an instruction. The processor 310 may run the foregoing instruction stored in the internal memory 321, to perform various function applications and data processing of the first device 201. The internal memory 321 may include a program storage area and a data storage area. The program storage area may store an operating system, an application required by at least one function (for example, a voice playing function or an image playing function), and the like. The data storage area may store data (such as audio data and an address book) created during use of the first device 201, and the like. In addition, the internal memory 321 may include a high-speed random access memory, and may further include a nonvolatile memory, for example, at least one magnetic disk storage device, a flash memory device, or a universal flash storage (universal flash storage, UFS).

The first device 201 may implement an audio function through the audio module 370, the speaker 370A, the receiver 370B, the microphone 170C, the headset jack 170D, the application processor, and the like, for example, music playing or recording.

The audio module 370 is configured to convert digital audio information into analog audio signal output, and is also configured to convert analog audio input into a digital audio signal. The audio module 370 may be further configured to: code and decode an audio signal. In some embodiments, the audio module 370 may be disposed in the processor 310, or some function modules in the audio module 370 are disposed in the processor 310.

The speaker 370A, also referred to as a "horn", is configured to convert an audio electrical signal into a sound signal. The first device 201 may be used to listen to music or answer a call in a hands-free mode over the speaker 370A.

The receiver 370B, also referred to as an "earpiece", is configured to convert an audio electrical signal into a sound signal. When a call is answered or audio information is listened to by using the first device 201, the receiver 370B may be put close to a human ear to listen to a voice.

The microphone 170C, also referred to as a "mike" or a "microphone", is configured to convert a sound signal into an electrical signal. When making a call or sending voice information, the user may make a sound near the microphone 370C through the mouth of the user, to input a sound signal to the microphone 370C. At least one microphone 370C may be disposed in the first device 201. In some other embodiments, two microphones 370C may be disposed in the first device 201, to collect a sound signal and further implement a noise reduction function. In some other embodiments, three, four, or more microphones 370C may alternatively be disposed in the first device 201, to collect a sound signal, reduce noise, further identify a sound source, implement a directional recording function, and the like.

The headset jack 370D is configured to connect to a wired headset. The headset jack 370D may be a USB interface 330, or may be a 3.5 mm open mobile terminal platform (open mobile terminal platform, OMTP) standard interface or a cellular telecommunications industry association of the USA (cellular telecommunications industry association of the USA, CTIA) standard interface.

The pressure sensor 380A is configured to sense a pressure signal, and can convert the pressure signal into an electrical signal. In some embodiments, the pressure sensor 380A may be disposed on the display 394. There are many types of pressure sensors 380A, for example, a resistive pressure sensor, an inductive pressure sensor, and a capacitive pressure sensor. The capacitive pressure sensor may include at least two parallel plates made of conductive materials. When a force is applied to the pressure sensor 380A, capacitance between electrodes changes. The first device 201 determines pressure intensity based on the change in the capacitance. When a touch operation is performed on the display 394, the first device 201 detects touch operation intensity by using the pressure sensor 380A. The first device 201 may also calculate a touch location based on a detection signal of the pressure sensor 380A. In some embodiments, touch operations that are performed at a same touch location but have different touch operation intensity may correspond to different operation instructions. For example, when a touch operation whose touch operation intensity is less than a first pressure threshold is performed on an SMS message application icon, an instruction for viewing an SMS message is executed. When a touch operation whose touch operation intensity is greater than or equal to a first pressure threshold is performed on an SMS message application icon, an instruction for creating a new SMS message is executed.

The gyro sensor 380B may be configured to determine a moving posture of the first device 201. In some embodiments, an angular velocity of the first device 201 around three axes (namely, axes x, y, and z) may be determined by using the gyro sensor 380B. The gyro sensor 380B may be configured to implement image stabilization during photographing. For example, when the shutter is pressed, the gyro sensor 380B detects an angle at which the first device 201 jitters, calculates, based on the angle, a distance for which a lens module needs to compensate, and allows the lens to cancel the jitter of the first device 201 through reverse motion, to implement image stabilization. The gyro sensor 380B may also be used in a navigation scenario and a somatic game scenario.

The barometric pressure sensor 380C is configured to measure barometric pressure. In some embodiments, the first device 201 calculates an altitude by using a barometric pressure value measured by the barometric pressure sensor 380C, to assist in positioning and navigation.

The magnetic sensor 380D includes a Hall sensor. The first device 201 may detect opening and closing of a flip leather case by using the magnetic sensor 380D. In some embodiments, when the first device 201 is a clamshell phone, the first device 201 may detect opening and closing of a flip cover based on the magnetic sensor 380D. Further, a feature such as automatic unlocking of the flip cover is set based on a detected opening/closing state of the leather case or a detected opening/closing state of the flip cover.

The acceleration sensor 380E may detect magnitude of accelerations in various directions (usually on three axes) of the first device 201, and may detect magnitude and a direction of the gravity when the first device 201 is still. The acceleration sensor 380E may be further configured to identify a posture of the electronic device, and is applied to an application such as switching between landscape orientation and portrait orientation or a pedometer.

The range sensor 380F is configured to measure a distance. The first device 201 may measure the distance in an infrared or a laser manner. In some embodiments, in a photographing scenario, the first device 201 may use the range sensor 380F to measure a distance, to implement fast focusing.

The optical proximity sensor 380G may include, for example, a light emitting diode (LED) and an optical detector such as a photodiode. The light emitting diode may be an infrared light emitting diode. The first device 201 emits infrared light by using the light emitting diode. The first device 201 detects infrared reflected light from a nearby object by using the photodiode. When sufficient reflected light is detected, the first device 201 may determine that there is an object near the first device 201. When insufficient reflected light is detected, the first device 201 may determine that there is no object near the first device 201. The first device 201 may detect, by using the optical proximity sensor 380G, that the user holds the first device 201 close to an ear to make a call, to automatically perform screen-off for power saving. The optical proximity sensor 380G may also be used in a smart cover mode or a pocket mode to automatically perform screen unlocking or locking.

The ambient light sensor 380L is configured to sense ambient light brightness. The first device 201 may adaptively adjust brightness of the display 394 based on the sensed ambient light brightness. The ambient light sensor 380L may also be configured to automatically adjust white balance during photographing. The ambient light sensor 380L may also cooperate with the optical proximity sensor 380G to detect whether the first device 201 is in a pocket to prevent a false touch.

The fingerprint sensor 380H is configured to collect a fingerprint. The first device 201 may use a feature of the collected fingerprint to implement fingerprint-based unlocking, application lock access, fingerprint-based photographing, fingerprint-based call answering, and the like.

The temperature sensor 380J is configured to detect a temperature. In some embodiments, the first device 201 executes a temperature processing policy by using the temperature detected by the temperature sensor 380J. For example, when the temperature reported by the temperature sensor 380J exceeds a threshold, the first device 201 lowers performance of a processor near the temperature sensor 380J, to reduce power consumption for thermal protection. In some other embodiments, when the temperature is lower than another threshold, the first device 201 heats the battery 342 to prevent the first device 201 from being shut down abnormally because of a low temperature. In some other embodiments, when the temperature is lower than still another threshold, the first device 201 boosts an output voltage of the battery 342 to avoid abnormal shutdown caused by a low temperature.

The touch sensor 380K may also be referred to as a "touch panel". The touch sensor 380K may be disposed on the display 394, and the touch sensor 380K and the display 394 constitute a touchscreen, which is also referred to as a "touchscreen". The touch sensor 380K is configured to detect a touch operation on or near the touch sensor 380K. The touch sensor may transfer a detected touch operation to the application processor, to determine a type of the touch event. A visual output related to the touch operation may be provided by using the display 394. In some other embodiments, the touch sensor 380K may also be disposed on a surface of the first device 201 at a location different from that of the display 394.

The bone conduction sensor 380M may obtain a vibration signal. In some embodiments, the bone conduction sensor 380M may obtain a vibration signal of a vibration bone of a human vocal-cord part. The bone conduction sensor 380M may also contact a body pulse to receive a blood pressure beating signal. In some embodiments, the bone conduction sensor 380M may also be disposed in the headset, to obtain a bone conduction headset. The audio module 370 may obtain a speech signal through parsing based on the vibration signal that is of the vibration bone of the vocal-cord part and that is obtained by the bone conduction sensor 380M, to implement a speech function. The application processor may parse heart rate information based on the blood pressure beating signal obtained by the bone conduction sensor 380M, to implement a heart rate detection function.

The key 390 includes a power key, a volume key, and the like. The key 390 may be a mechanical key, or may be a touch key. The first device 201 may receive a key input, and generate a key signal input related to a user setting and function control of the first device 201.

The motor 391 may generate a vibration prompt. The motor 391 may be configured to provide an incoming call vibration prompt and a touch vibration feedback. For example, touch operations performed on different applications (for example, photographing and audio playing) may correspond to different vibration feedback effects. The motor 391 may also correspond to different vibration feedback effects for touch operations performed on different areas of the display 394. Different application scenarios (for example, a time reminder, information receiving, an alarm clock, and a game) may also correspond to different vibration feedback effects. The touch vibration feedback effect can also be customized.

The indicator 392 may be an indicator light, and may be configured to indicate a charging status and a power change, or may be configured to indicate a message, a missed call, a notification, and the like.

The SIM card interface 395 is configured to connect to a SIM card. The SIM card may be inserted into the SIM card interface 395 or plugged from the SIM card interface 395, to implement contact with or separation from the first device 201. The first device 201 may support one or N SIM card interfaces, where N is a positive integer greater than 1. The SIM card interface 395 may support a nano-SIM card, a micro-SIM card, a SIM card, and the like. A plurality of cards may be inserted into a same SIM card interface 395 at the same time. The plurality of cards may be of a same type or different types. The SIM card interface 395 may be compatible with different types of SIM cards. The SIM card interface 395 may further be compatible with an external storage card. The first device 201 interacts with a network by using the SIM card, to implement functions such as conversation and data communication. In some embodiments, the first device 201 uses an eSIM, namely, an embedded SIM card. The eSIM card may be embedded into the first device 201, and cannot be separated from the first device 201.

A software system of the first device 201 may use a layered architecture, an event-driven architecture, a micro-kernel architecture, a micro service architecture, or a cloud architecture. In this embodiment of this application, an Android system of a layered architecture is used as an example to illustrate a software structure of the first device 201.

Figure 4:
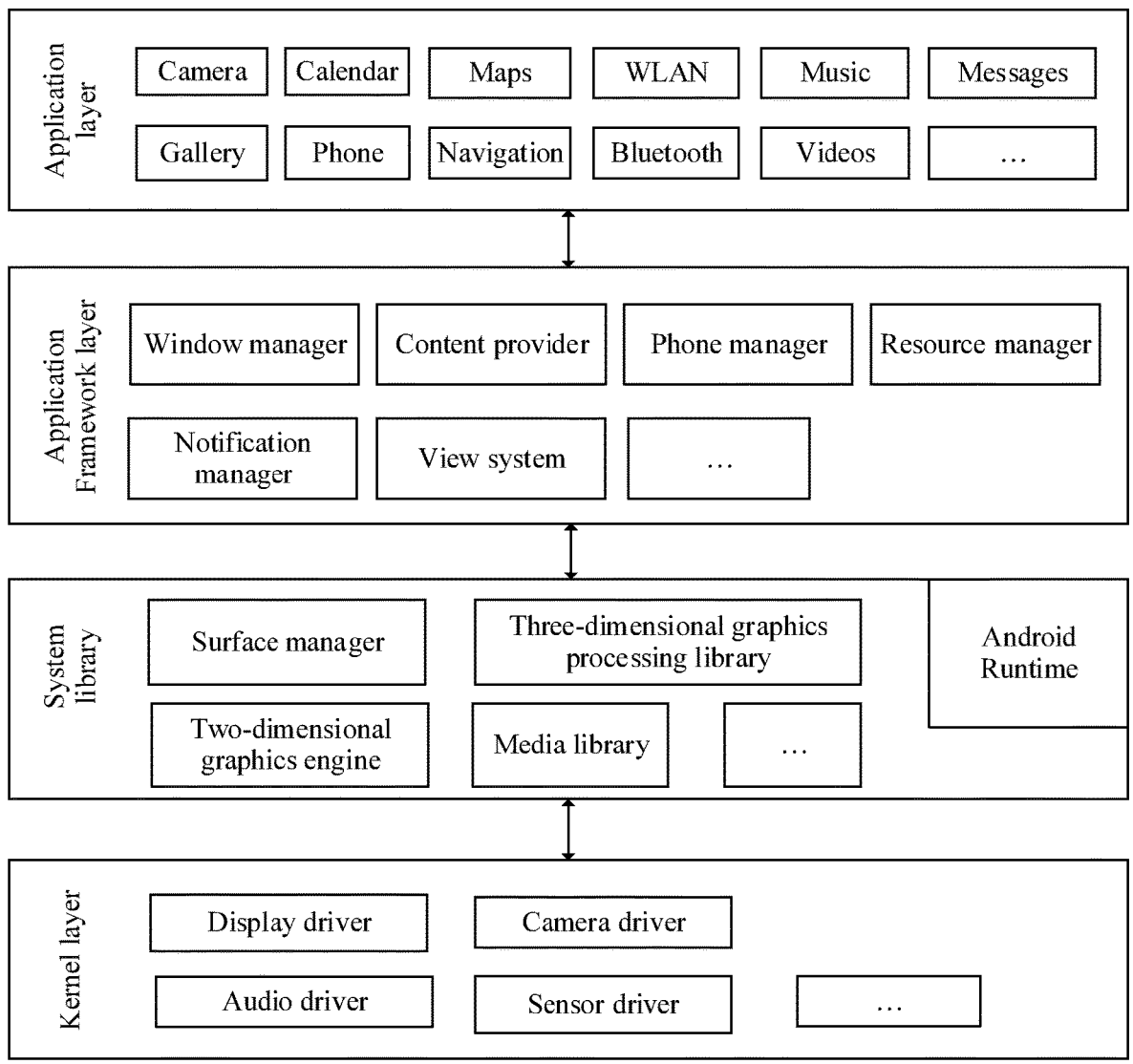
FIG. 4 is a schematic structural diagram of software of a first device according to an embodiment of this application.

For example, FIG. 4 is a structural block diagram of software of a first device 201. The software is divided into several layers by using the layered architecture, and each layer has a clear role and task. The layers communicate with each other through software interfaces. In some embodiments, the Android system is divided into four layers, namely, an application layer, an application framework layer, Android runtime (Android runtime), a system library, and a kernel layer from top to bottom. The application layer may include a series of application packages.

As shown in FIG. 4, the application packages may include applications such as Camera, Gallery, Calendar, Phone, Maps, Navigation, WLAN, Bluetooth, Music, Videos, and Messages.

The application framework layer provides an application programming interface (application programming interface, API) and a programming framework for an application at the application layer. The application framework layer includes some predefined functions.

As shown in FIG. 4, the application framework layer may include a window manager, a content provider, a view system, a phone manager, a resource manager, a notification manager, and the like.

The window manager is configured to manage a window program. The window manager may obtain a size of a display, determine whether there is a status bar, perform screen locking, take a screenshot of the display, and the like.

The content provider is configured to: store and obtain data, and make the data accessible to an application. The data may include a video, an image, an audio, calls that are made and received, a browsing history and a bookmark, an address book, and the like.

The view system includes a visual control such as a text display control, or a picture display control. The view system can be used to construct an application. A display interface may include one or more views. For example, a display interface including an SMS message notification icon may include a text display view and a picture display view.

The phone manager is configured to provide a communication function for the first device 201, for example, management of a call status (including answering or declining).

The resource manager provides various resources for an application, such as localized strings, icons, pictures, layout files, and video files.

The notification manager enables an application to display notification information in a status bar, and may be configured to convey a notification-type message. The notification-type message may automatically disappear after the message is displayed for a short period of time, without user interaction. For example, the notification manager is configured to notify that download is completed, a message reminder, and the like. The notification manager may alternatively be a notification that appears on the top of a status bar of a system in a text form of a graph or a scroll bar, for example, a notification of an application running in the background or a notification that appears on a screen in a form of a dialog window. For example, text information is prompted in the status bar, an alert sound is produced, the electronic device vibrates, or an indicator light blinks.

The Android runtime includes a kernel library and a virtual machine. The Android runtime is responsible for scheduling and management of the Android system.

The kernel library includes two parts: a functional function that needs to be invoked by a Java language and a kernel library of Android.

The application layer and the application framework layer may run in the virtual machine. The virtual machine executes a Java file at the application layer and the application framework layer as a binary file. The virtual machine is configured to perform functions such as object lifecycle management, stack management, thread management, security and exception management, and garbage collection.

The system library may include a plurality of function modules, for example, a surface manager (surface manager), a media library (Media Libraries), an OpenGraphicsLib (for example, OpenGL ES), and a 2D graphics engine (for example, SGL).

The surface manager is configured to manage a display subsystem, and provide fusion of 2D and 3D image layers for a plurality of application s.

The media library supports playback and recording of a plurality of commonly used audio and video formats, static image files, and the like. The media library may support a plurality of audio and video coding formats, for example, MPEG 4, H.264, MP3, AAC, AMR, JPG, and PNG.

The OpenGraphicsLib is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

The following describes a working process of software and hardware of the first device 201 by using an example with reference to a photographing scenario.

When the touch sensor 380K receives a touch operation, a corresponding hardware interruption is sent to the kernel layer. The kernel layer processes the touch operation into a raw input event (including information such as touch coordinates or a time stamp of the touch operation). The raw input event is stored at the kernel layer. The application framework layer obtains the raw input event from the kernel layer, and identifies a control corresponding to the input event. For example, the touch operation is a touch tap operation, and a control corresponding to the tap operation is a control of an icon of a camera application. The camera application invokes an interface at the application framework layer to enable the camera application, then enables a camera driver by invoking the kernel layer, and captures a static image or a video by using the camera 393.

Figure 5:
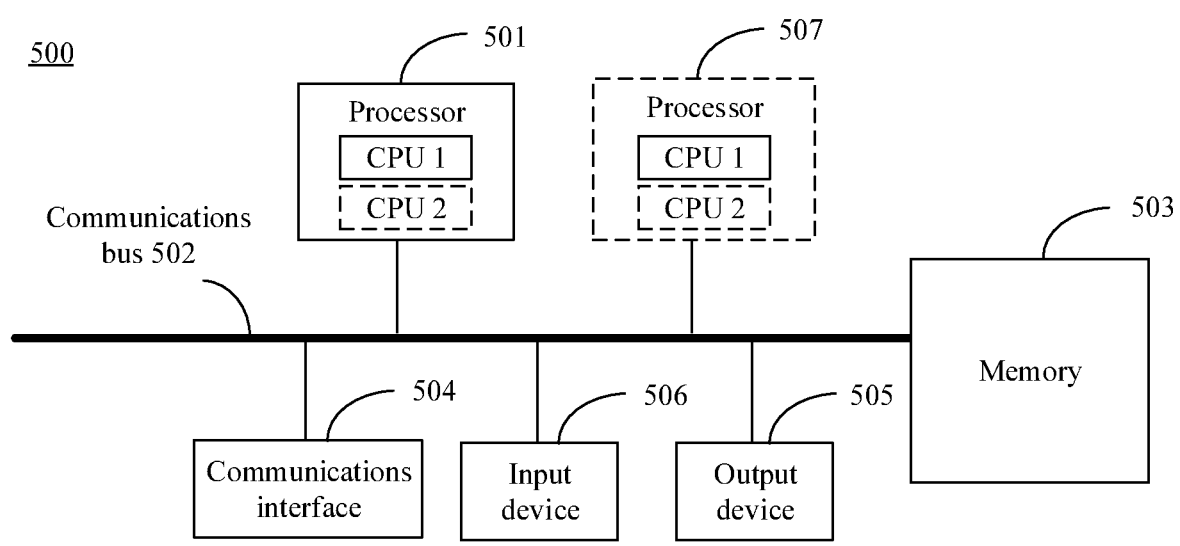
FIG. 5 is a schematic structural diagram of a computer system according to an embodiment of this application.

For example, the second device 202 in FIG. 2 may be implemented by using the computer system 500 shown in FIG. 5. The computer system 500 includes at least one processor 501, a communications bus 502, a memory 503, and at least one communications interface 504.

The processor 501 may be a general-purpose central processing unit (central processing unit, CPU), a microprocessor, an application-specific integrated circuit (application specific integrated circuit, ASIC), or one or more integrated circuits configured to control program execution of the solutions of this application.

The communications bus 502 may include a path used to transmit information between the foregoing components.

The communications interface 504 uses any transceiver-type apparatus, to communicate with another device or a communications network such as the Ethernet, a radio access network (radio access network, RAN), or a wireless local area network (wireless local area networks, WLAN).

The memory 503 may be a read-only memory (read-only memory, ROM), another type of static storage device that can store static information and a static instruction, a RAM, or another type of dynamic storage device that can store information and an instruction, or may be an electrically erasable programmable read-only memory (electrically erasable programmable read-only memory, EEPROM), a compact disc read-only memory (compact disc read-only memory, CD-ROM) or another compact disc storage, an optical disc storage (including a compact disc, a laser disc, an optical disc, a digital versatile disc, a Blu-ray disc, and the like), a magnetic disk storage medium or another magnetic storage device, or any other medium that can be configured to carry or store expected program code in a form of an instruction or a data structure and that can be accessed by a computer. However, this is not limited thereto. The memory may exist independently, and is connected to the processor through the bus. The memory may alternatively be integrated with the processor.

The memory 503 is configured to store application program code for performing the solutions of this application, and the processor 501 controls the execution. The processor 501 is configured to execute the application program code stored in the memory 503, to control the computer system 500 to implement the service processing methods provided in the following embodiments of this application.

Optionally, the computer executable instruction in this embodiment of this application may also be referred to as application program code. This is not specifically limited in this embodiment of the application.

In specific implementation, in an embodiment, the processor 501 may include one or more CPUs, for example, a CPU 0 and a CPU 5 in FIG. 5. Each CPU may support a plurality of virtual CPUs, and the virtual CPU is also referred to as a VCPU.

In specific implementation, in an embodiment, the computer system 500 may include a plurality of processors, for example, a processor 501 and a processor 507 in FIG. 5. Each of the processors may be a single-core (single-CPU) processor, or may be a multi-core (multi-CPU) processor. The processor herein may be one or more devices, circuits, and/or processing cores configured to process data (for example, a computer program instruction).

In specific implementation, in an embodiment, the computer system 500 may further include an output device 505 and an input device 506. The output device 505 communicates with the processor 501, and may display information in a plurality of manners. For example, the output device 505 may be a liquid crystal display (liquid crystal display, LCD), a light emitting diode (light emitting diode, LED) display device, a cathode ray tube (cathode ray tube, CRT) display device, or a projector (Projector). The input device 506 communicates with the processor 501, and may receive user input in a plurality of manners. For example, the input device 506 may be a mouse, a keyboard, a touchscreen device, or a sensor device.

The computer system 500 may be a general-purpose communications device or a dedicated communications device. A type of the computer system 500 is not limited in this embodiment of this application. In specific implementation, the computer system 500 may be a desktop computer, a portable computer, a network server, a palmtop computer (personal digital assistant, PDA), a mobile phone, a tablet, a wireless terminal device, an embedded device, or a device with a structure similar to that in FIG. 5. Components in the computer system 500 may be simultaneously deployed in a same computer device, or may be deployed in different computer devices located in a distributed system.

In the following embodiments, the technical solutions provided in the embodiments of this application are described in detail by using an example in which the mobile phone having the structures shown in FIG. 3 and FIG. 4 is the first device 201, and the computer system having the structure shown in FIG. 5 is the second device 202.

An embodiment of this application provides a service processing method that is applicable to a first device and a second device. The method may be applied to a processing scenario of a plurality of wireless and contactless unlocking services or payment services. The unlocking service may be using the first device to open a lock of the second device, for example, using a terminal such as a mobile phone to open a vehicle door, or using a mobile phone to open a lock of another mobile or fixed device (for example, opening a home door). The payment service may be using the first device to perform payment through the second device, for example, using a mobile phone as a bus card, a bank card, or the like for card payment. The following mainly describes the service processing method by using an example in which a mobile phone that supports a vehicle key application is the first device and a head unit that is used to control a vehicle is the second device in a scenario of opening a vehicle door (namely, a scenario of opening a door lock of the vehicle).

Figure 6:
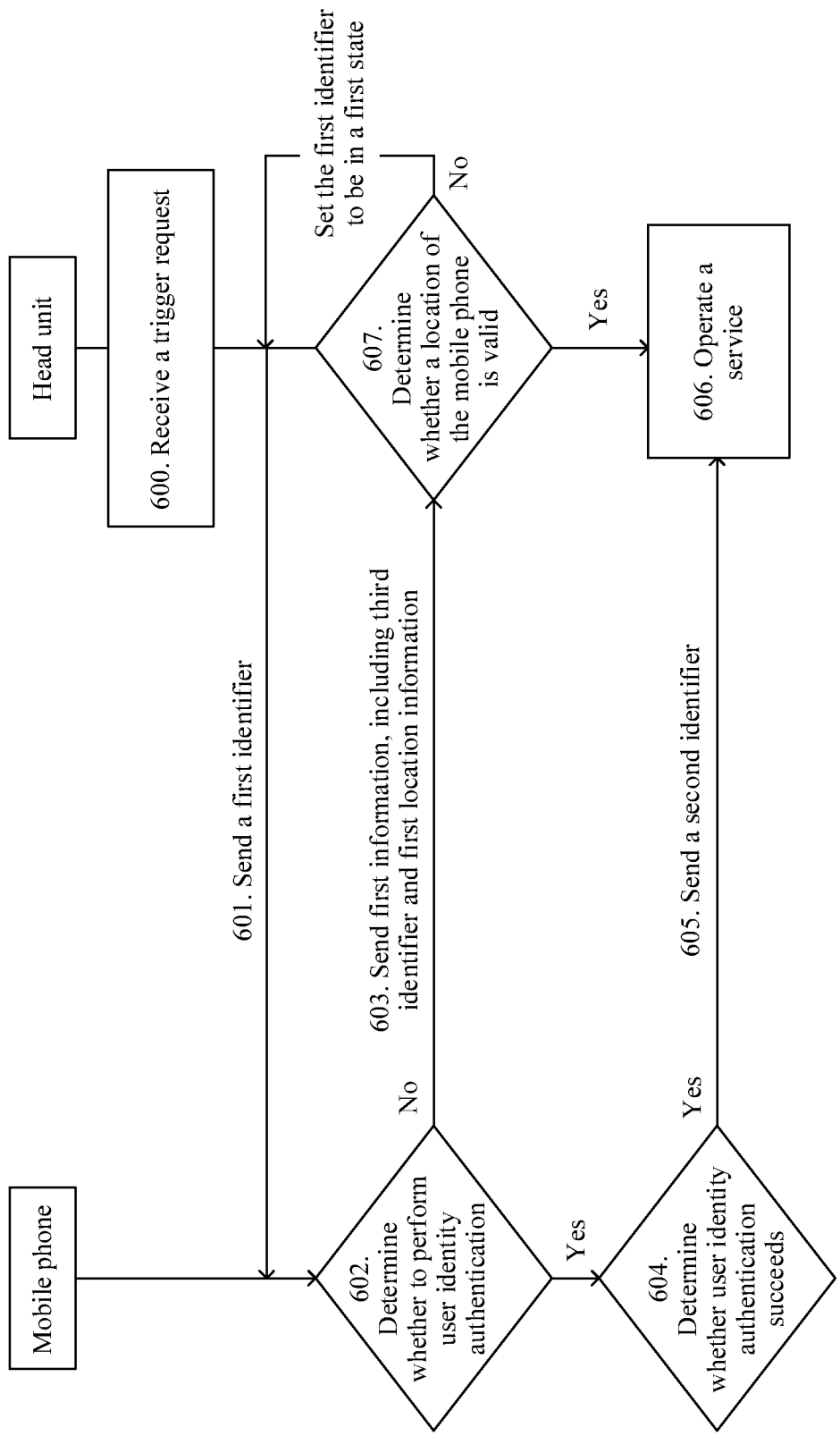
FIG. 6 is a flowchart of a service processing method according to an embodiment of this application.

In some embodiments, referring to FIG. 6, the service processing method may include the following steps.

600: The head unit receives a trigger request used to perform a vehicle door opening service.

Usually, when a distance between the mobile phone and the head unit is less than or equal to a first preset length (for example, 15 meters), the head unit and the mobile phone may establish a communication connection, for example, establish a Bluetooth connection (for example, a Bluetooth low energy (bluetooth low energy, BLE) connection) or a Wi-Fi P2P connection. Specifically, the Bluetooth connection is used as an example. The head unit may broadcast a Bluetooth radio signal. After receiving the Bluetooth radio signal broadcast by the head unit and determining that the mobile phone is successfully paired with the head unit, the mobile phone may send connection success response information to the head unit, to exchange information with the head unit.

In one case, the connection success response information sent by the mobile phone to the head unit may be the trigger request of the vehicle door opening service. After receiving the connection success response information sent by the mobile phone to the head unit, the head unit may consider that the mobile phone of a user is in a relatively close range, and the user may want to open the vehicle door. Therefore, the head unit may start a process of processing the vehicle door opening service.

In another case, when the user wants to open the vehicle door, the user may actively send indication information of the vehicle door opening service to the head unit by using the mobile phone. The indication information is the trigger request, to indicate the head unit to process the vehicle door opening service.

After step 600, the head unit may perform step 601.

601: The head unit sends a first identifier to the mobile phone, where the first identifier is in a first state or a second state.

After receiving the trigger request used to perform the vehicle door opening service, the head unit may send the first identifier in the first state (that is, the first identifier is in the first state) or the first identifier in the second state (that is, the first identifier is in the second state) to the mobile phone. That the first identifier is in the first state indicates that a location of the second device or a location of the first device is abnormal, and that the first identifier is in the second state indicates that the location of the second device is normal.

Specifically, when the head unit determines, based on a positioning service, that positioning fails, or location information obtained through positioning does not match historical location information stored in the head unit, it may be considered that a location of the head unit (which is also a location of the vehicle) is abnormal (namely, insecure or unreliable). Therefore, the head unit may send the first identifier in the first state to the mobile phone (that is, the first identifier sent by the head unit to the mobile phone is in the first state). The positioning service may include one or more of services such as GPS satellite positioning, BeiDou satellite positioning, Wi-Fi positioning, mobile cellular network base station positioning, and ultra wide band (ultra wide band, UWB) indoor positioning.

Alternatively, when the head unit determines that a distance between the mobile phone and the head unit is greater than a preset threshold, that is, the head unit is relatively far away from the head unit, it may be considered that a location of the mobile phone is abnormal (namely, insecure or unreliable), and therefore, the head unit may send the first identifier in the first state to the mobile phone. For example, for details, refer to subsequent descriptions in step 607.

When the location of the first device and the location of the second device are not abnormal, the head unit may determine that the location of the head unit is normal, and therefore send the first identifier in the second state to the mobile phone (that is, the first identifier sent by the head unit to the mobile phone is in the second state).

For example, the first identifier may be one-bit flag information. When the flag information is "0", it indicates that the first identifier is in the first state; or when the flag bit is "1", it indicates that the first identifier is in the second state. For another example, the first identifier may be a preset field. When content of the field is "normal", it indicates that the first identifier is in the first state; or when content of the field is "abnormal", it indicates that the first identifier is in the second state. For another example, the first identifier in the first state may be "00", and the first identifier in the second state may be "01". It may be understood that a specific form of the first identifier is described as an example herein, and the first identifier may alternatively be in another form. This is not limited in this embodiment of this application.

After step 601, the mobile phone may perform step 602.

602: After receiving the first identifier, the mobile phone determines, based on the first identifier, whether to perform user identity authentication.

After receiving the first identifier, the mobile phone may determine, based on a status of the first identifier, whether to perform user identity authentication. Specifically, if the first identifier received by the mobile phone from the head unit is in the first state, it may indicate that the location of the vehicle is abnormal, unreliable, or insecure. In this case, the mobile phone may perform user identity authentication, to determine, based on an authentication operation of the user and an authentication result, whether to continue service processing. If the first identifier received by the mobile phone from the head unit is in the second state, it may indicate that the location of the vehicle is normal, trusted, and secure, and the mobile phone may further determine, based on whether the location of the mobile phone is normal, whether to perform user identity authentication and whether to continue service processing.

Figure 7C:
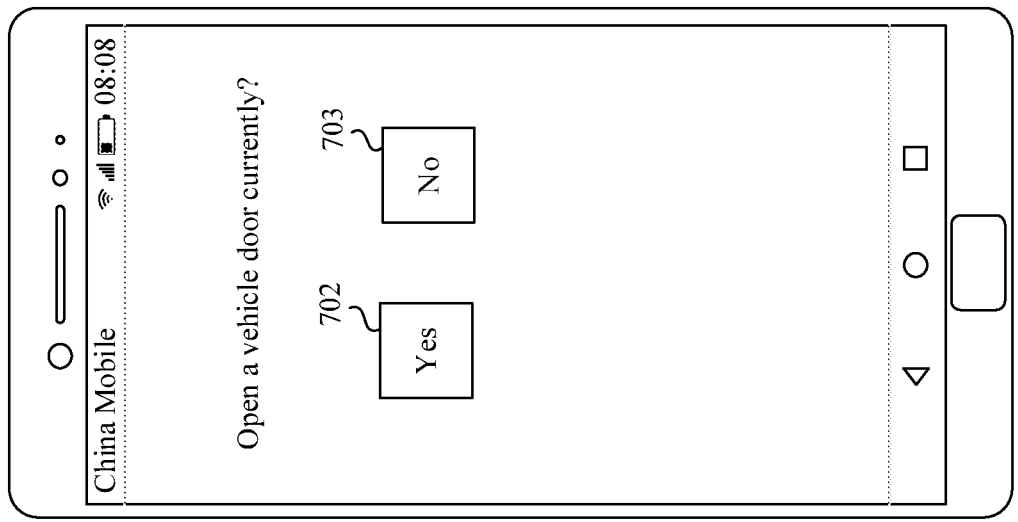
FIG. 7(a) to FIG. 7(c) are a schematic diagram of a group of authentication interfaces according to an embodiment of this application.

The identity authentication may include password authentication, voice authentication, SMS verification code authentication, and biometric feature information authentication such as a fingerprint, a face, an iris, or a voiceprint. For example, referring to FIG. 7(a), the mobile phone may prompt the user to perform password authentication. For another example, referring to FIG. 7(b), the mobile phone may prompt the user to perform fingerprint authentication. For another example, referring to FIG. 7(c), the mobile phone may prompt the user whether to open the vehicle door. If the user taps a "Yes" button 702, the mobile phone may display an interface shown in FIG. 7(a) or FIG. 7(b), to prompt the user to perform authentication. If the user taps a "No" button 703, the mobile phone may send service failure information to the head unit, or indicate the head unit to stop service processing. In addition, the mobile phone may further prompt, through a sound or vibration, the user to perform identity authentication. For example, the mobile phone may prompt, by using a voice, the user that "The vehicle door opening service is being processed, and please perform facial information verification".

It should be noted that user identity authentication in this embodiment is only an implementation. In this embodiment of this application, the user identity authentication may be replaced with another authentication manner. For example, when the mobile phone determines, based on the first identifier, to perform authentication, the mobile phone indicates, to the user, that the vehicle door opening service is to be performed, and requests the user to grant authorization. If the user grants authorization, authentication succeeds, and the vehicle door opening service is performed; or if the user refuses to grant authorization, authentication fails, and the vehicle door opening service is not performed. Specifically, when determining, based on the first identifier, that authentication needs to be performed, the mobile phone may directly display FIG. 7(c) for authentication. If the user selects "Yes", authentication succeeds; or if the user selects "No", authentication fails. Alternatively, when the mobile phone determines, based on the first identifier, that authentication needs to be performed, the mobile phone may further prompt the user by using a voice, to request the user to grant authorization. The mobile phone may prompt the user by displaying content on a screen, or by using a voice, through vibration, or the like. A manner in which the user grants authorization may be performing a manual input on the screen, feeding back a specific voice or a specific gesture to the mobile phone, operating a specific button on the mobile phone, or the like.

If the mobile phone determines not to perform user identity authentication, step 603 may be performed; or if the mobile phone determines to perform user identity authentication, step 604 may be performed.

603: The mobile phone sends first information to the head unit, where the first information includes first location information and a third identifier, the first location information is location information of the first device, and the third identifier indicates that the location of the mobile phone and the location of the head unit are normal.

If the mobile phone determines that user identity authentication does not need to be performed in step 602, the mobile phone may send the third identifier and location information of the mobile phone (namely, the first location information) to the head unit, so that after receiving the third identifier, the head unit determines that the location of the mobile phone and the location of the head unit are both normal. Therefore, whether the location of the mobile phone is valid can be determined based on the first location information used to indicate the location of the mobile phone and the location information of the head unit. Further, the head unit may determine, based on whether the location of the mobile phone is valid, whether to perform the vehicle door opening service.

After step 603, the head unit may perform step 607.

604: The mobile phone determines whether the user identity authentication succeeds.

If the mobile phone determines that the user identity authentication needs to be performed in step 602, the mobile phone may prompt the user to perform identity authentication. If the user really wants to perform the service, the user may enter identity authentication information such as a voice or a fingerprint. The mobile phone verifies, based on the identity authentication information entered by the user, whether an identity of the user is valid. For example, referring to FIG. 7(c), the user may press a finger to enter fingerprint information, and the mobile phone determines, based on the fingerprint information entered by the user, whether an identity of the user is valid.

Figure 7B:
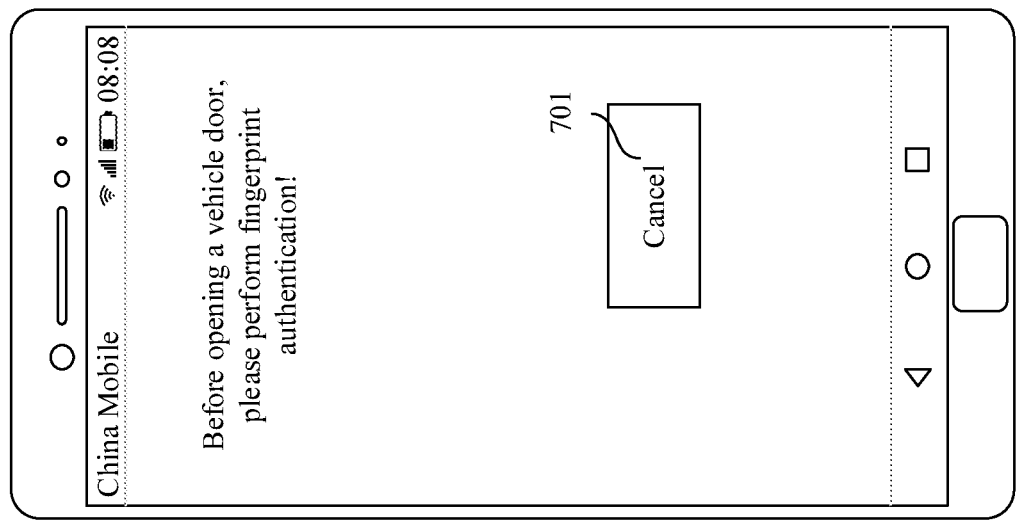
Figure 7A:
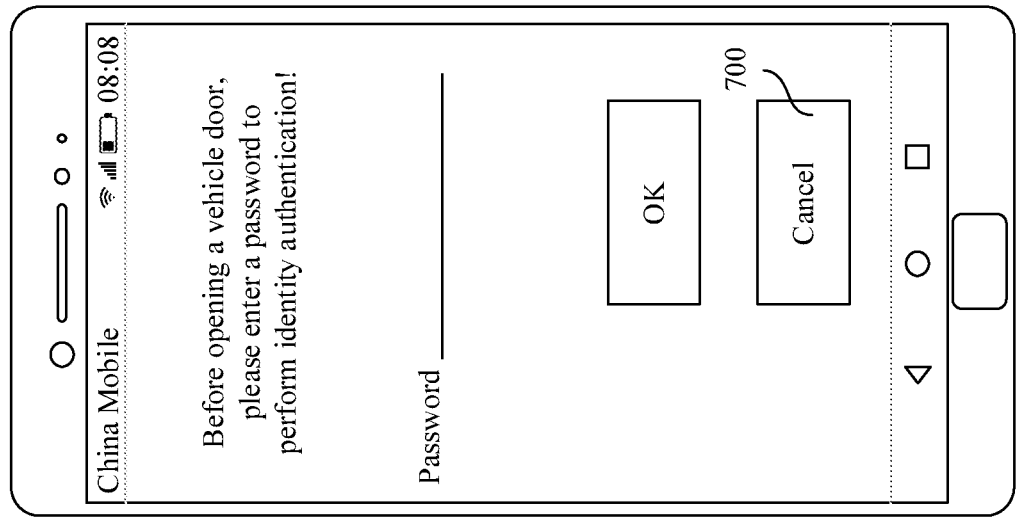

If the user actually does not want to perform the service (for example, in a case in which the mobile phone prompts, due to a relay attack, the user to perform identity authentication, but the user does not want to open the vehicle door), or if the user currently wants to cancel the service, the user may not enter identity authentication information, or the user may enter incorrect identity authentication information, or the user may cancel identity authentication. For example, as shown in FIG. 7(a) or FIG. 7(b), the interface in which the mobile phone prompts the user to perform identity authentication includes a cancel button 700 or a cancel button 701. When the user taps the cancel button 700 or the cancel button 701, the mobile phone may cancel user identity authentication. Alternatively, as shown in FIG. 7(*c*), the "No" button 703 is displayed in a prompt interface of the mobile phone. When the user taps the button 703, the mobile phone may cancel user identity authentication. The mobile phone may return, to the head unit, an indication of refusing to open the vehicle door. After receiving the indication, the head unit learns that the vehicle door opening service is not performed currently, and therefore does not open the vehicle door. Alternatively, the mobile phone may not return an indication to the head unit. When the head unit does not receive the indication, the head unit determines not to perform the vehicle door opening service currently, and therefore does not open the vehicle door.

If the mobile phone determines that the user identity authentication succeeds, step 605 may be performed.

605: The mobile phone sends a second identifier to the head unit, where the second identifier indicates that it is determined to perform the vehicle door opening service.

If the user performs identity authentication, and the mobile phone determines that the identity authentication succeeds, the mobile phone may send the second identifier to the head unit, to indicate the head unit to perform a vehicle door opening operation.

After step 605, the head unit may perform step 606.

606: The head unit performs the vehicle door opening service.

It can be learned from step 604 and step 605 that if the head unit receives the second identifier from the mobile phone, it may indicate that the mobile phone has performed user identity authentication and the user identity authentication succeeds. The mobile phone indicates, by using the second identifier, the head unit to perform the vehicle door opening service. Therefore, when receiving the second identifier, the head unit may open the vehicle door.

607: The head unit determines, based on the first location information, whether the location of the mobile phone is valid.

If the head unit receives, from the mobile phone, the first information that includes the third identifier and the first location information, and the third identifier is used to indicate that the location of the mobile phone and the location of the head unit are normal, the head unit determines, based on the normal first location information, whether the location of the mobile phone is valid. That the location of the mobile phone is valid means that a distance between the location of the mobile phone and a preset reference location is less than or equal to a preset threshold, that is, the location of the mobile phone is near the reference location. If the location of the mobile phone is valid, the head unit may perform step 606 to open the vehicle door for the user. If the location of the mobile phone is invalid, the head unit may refuse to open the vehicle door, or may perform step 601. To be specific, the head unit may send the first identifier to the mobile phone, so that the mobile phone performs user identity authentication. If the authentication succeeds, the vehicle door is opened; or if the authentication fails, the vehicle door is not opened. It should be noted that, that the location of the mobile phone is invalid is a case in which the location of the mobile phone is abnormal.

Optionally, the first identifier in the first state, the first identifier in the second state, the second identifier, and the third identifier are different identifiers. For example, the first identifier in the first state is a character string "00", the first identifier in the second state is a character string "01", the second identifier is a character string "10", and the third identifier is a character string "11".

Alternatively, optionally, the first identifier, the second identifier, and the third identifier are a same identifier. The first identifier in the first state, the first identifier in the second state, the second identifier, and the third identifier separately correspond to different states of a same identifier.

Alternatively, optionally, the first identifier, the second identifier, and the third identifier are different identifiers.

Alternatively, optionally, the first identifier, the second identifier, and the third identifier are a same identifier. The second identifier is the same as the first identifier in the first state, and the third identifier is the same as the first identifier in the second state. For example, the first identifier in the first state is a character string "00", the first identifier in the second state is a character string "01", the second identifier is a character string "00", and the third identifier is a character string "01".

It can be learned from steps 601 to 607 that in this embodiment of this application, the head unit may determine a state of the first identifier based on whether the location of the vehicle is normal and whether the location of the mobile phone is normal, and send the first identifier in the first state or the first identifier in the second state to the mobile phone. If the mobile phone determines, based on the first identifier received from the head unit, that user identity authentication needs to be performed, and the user identity authentication succeeds, the mobile phone sends the second identifier to the head unit, to indicate the head unit to perform the vehicle door opening service. The head unit performs the vehicle door opening service according to the indication of the second identifier. If the mobile phone determines, based on the first identifier received from the head unit, that user identity authentication does not need to be performed, the mobile phone may send, to the head unit, the first location information and the third identifier used to indicate that the location of the mobile phone and the location of the head unit are normal, so that the head unit can determine, based on the first location information, whether the location of the mobile phone is valid. In this way, the vehicle door opening operation is performed only when it is determined that the location of the mobile phone is valid, thereby improving security of operating a wireless and contactless service such as opening the vehicle door.

Figure 1:
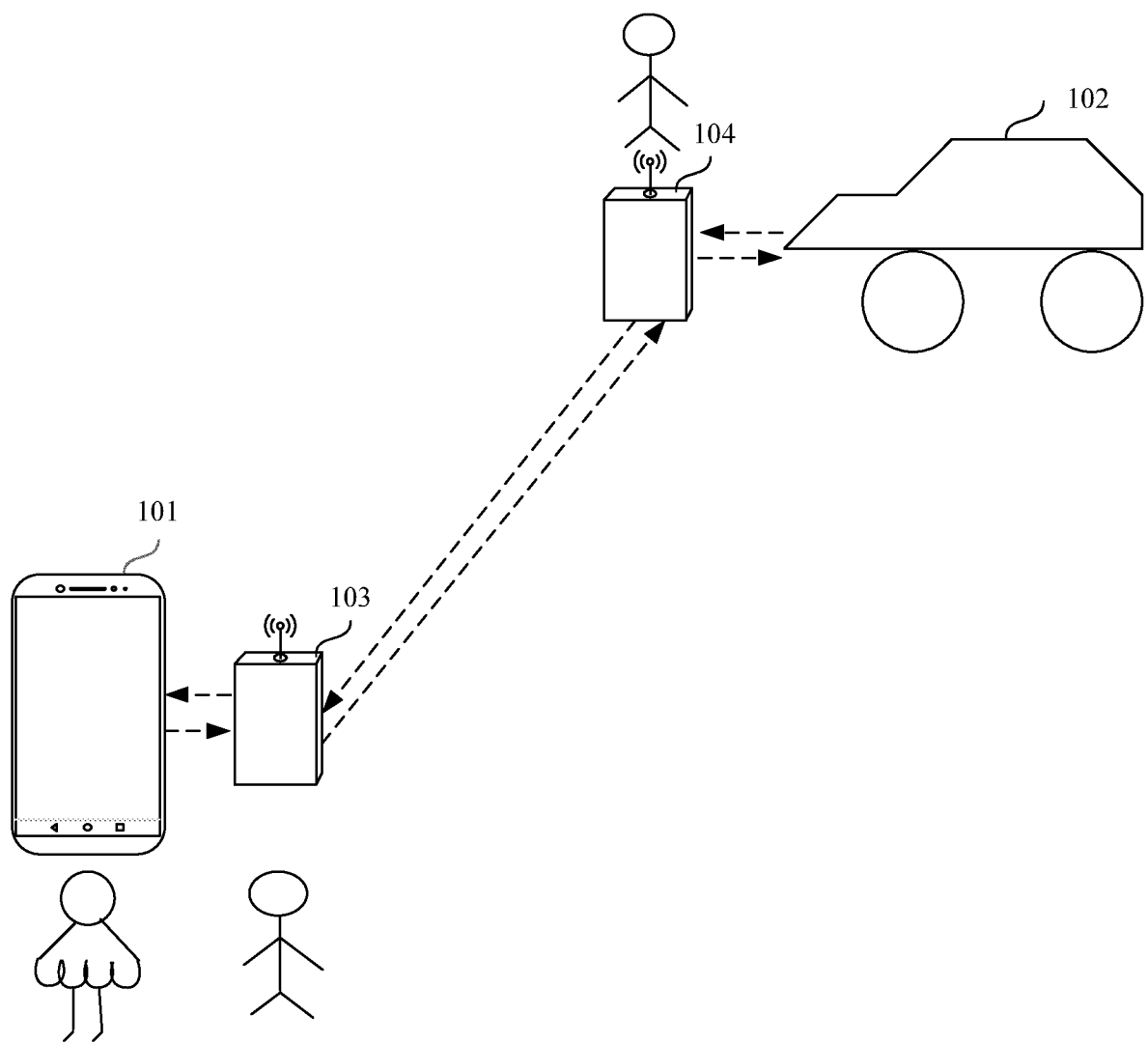
FIG. 1 is a schematic diagram of a relay attack scenario in the prior art.

In a scenario in which information is forwarded through a relay device shown in FIG. 1, if the solution provided in this embodiment of this application is used, because the user (a vehicle owner) does not want to open the vehicle door, user identity authentication is not performed. Therefore, the mobile phone does not send the second identifier to the head unit. If the mobile phone sends the third identifier and the location information (namely, the first location information) of the mobile phone of the user to the head unit, the head unit may determine, based on the location information of the mobile phone of the user, that the location of the mobile phone is invalid, and therefore does not perform the vehicle door opening operation.

Figures 1, 8A:
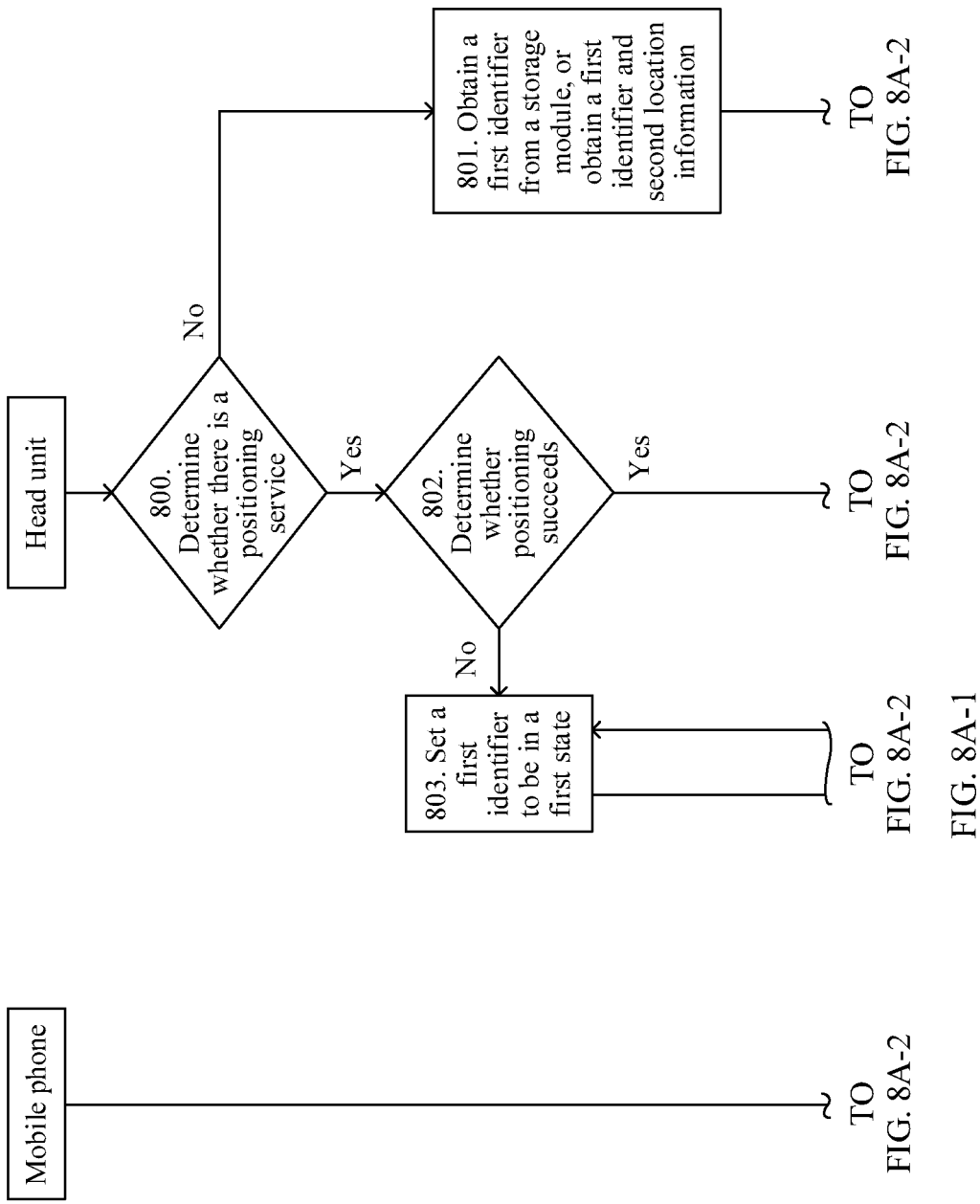
Figures 2, 8A:
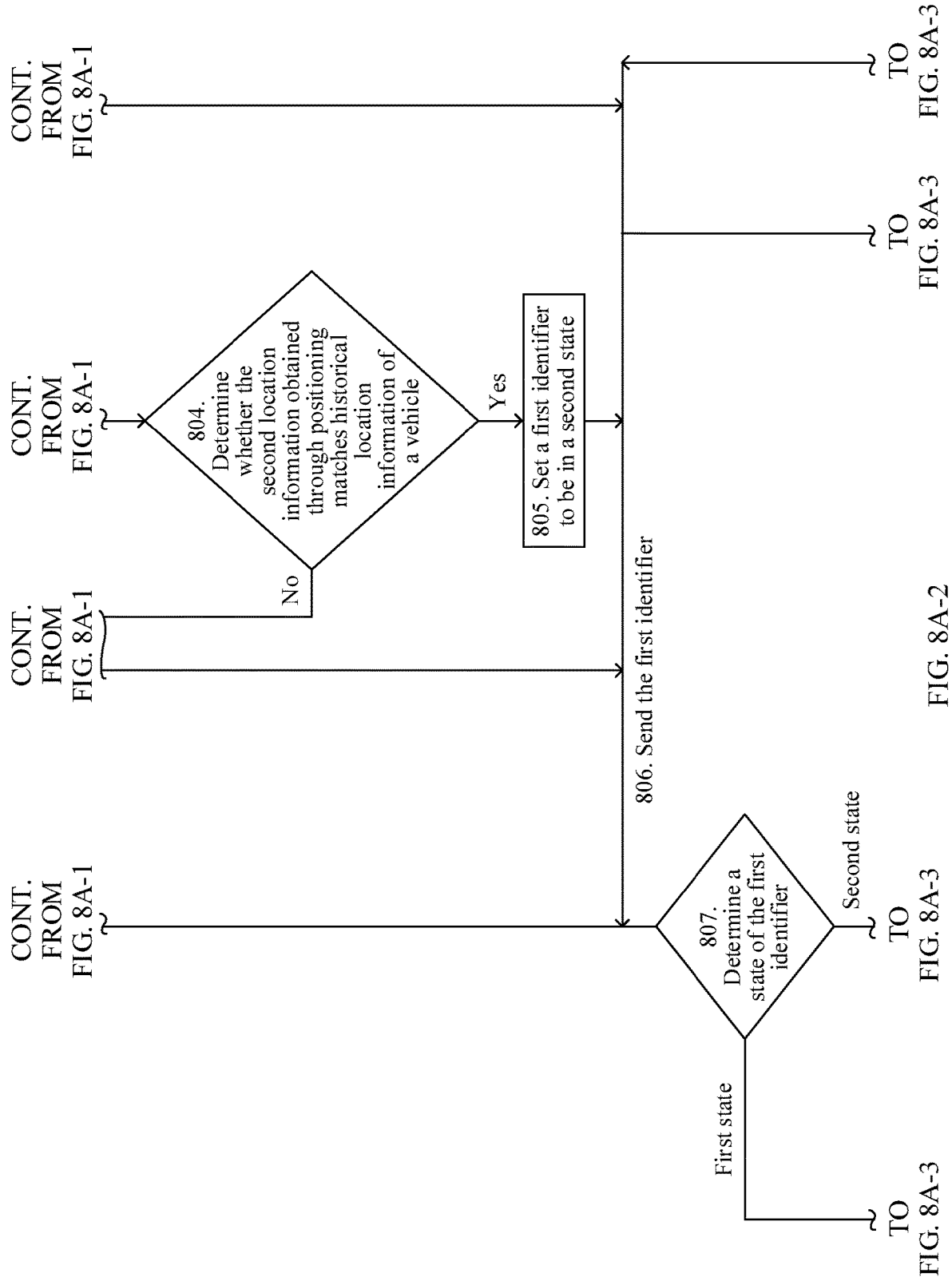
Figures 3, 8A:
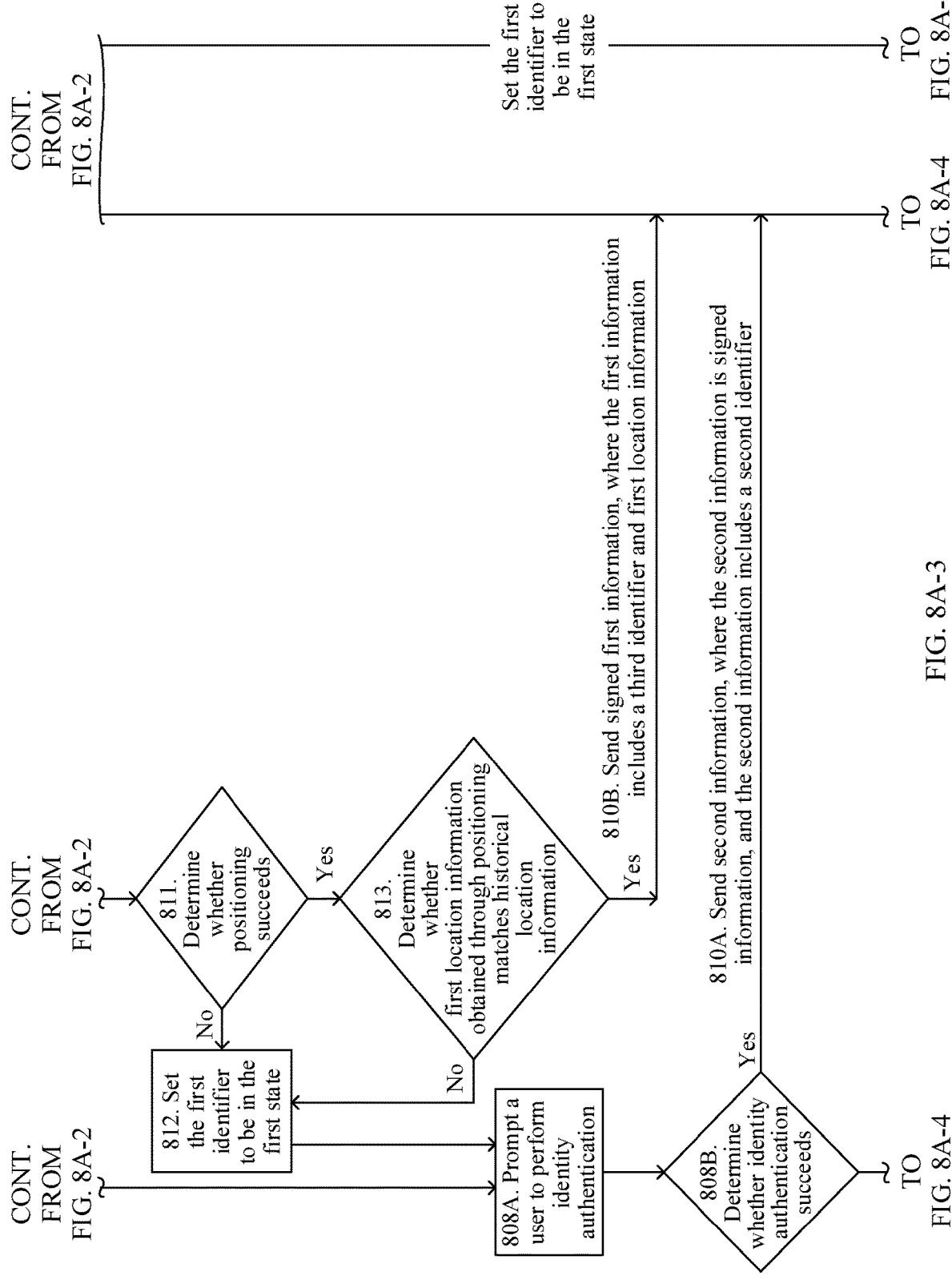
Figures 4, 8A:
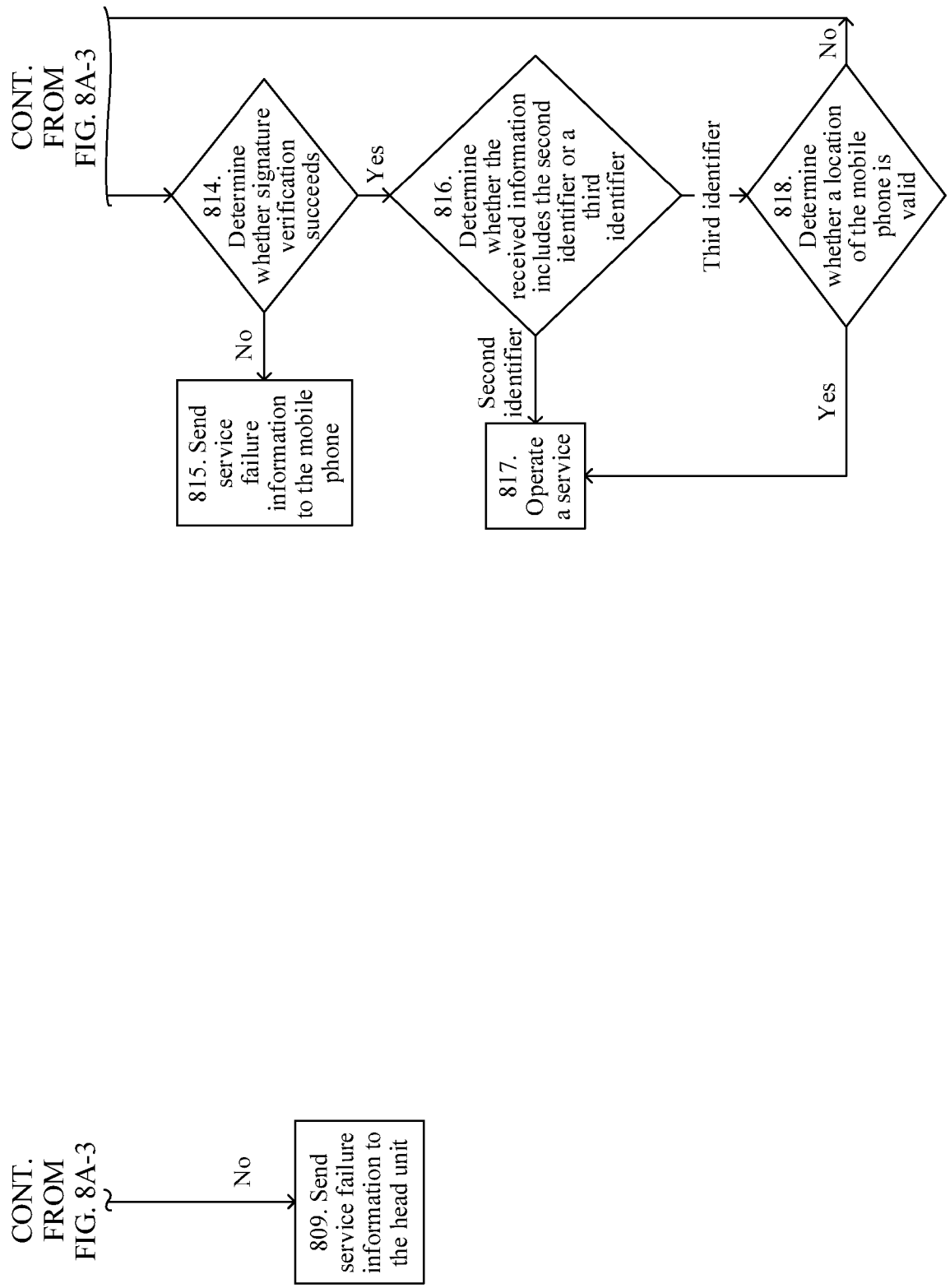

Another embodiment of this application further provides a service processing method. Referring to FIG. 8A-1 to FIG. 8A-4, the method may include the following steps.

800: A head unit determines whether there is a positioning service.

After establishing a communication connection to the mobile phone, the head unit considers that the user may want to open the vehicle door, and may determine whether the head unit has a positioning service. If the head unit has no positioning service, step 801 is performed; or if the head unit has a positioning service, step 802 is performed.

801: The head unit obtains the first identifier from a storage module, or obtains the first identifier and second location information, where the second location information is location information of a vehicle.

The second location information may be parking location information stored in the storage module when the vehicle is turned off, and the first identifier may be an identifier stored in the storage module when the vehicle is turned off.

After step 801, the head unit may perform step 806.

802: The head unit determines whether positioning succeeds.

When the head unit has a positioning service, the head unit may not be able to obtain a positioning signal such as a GPS, BeiDou, or Wi-Fi signal due to factors such as a geographical environment in which the vehicle is located (for example, the vehicle is located in a bridge cave) and quality of a positioning network. Therefore, positioning may not be able to succeed.

If positioning performed by the head unit fails, step 803 is performed; or if positioning performed by the head unit succeeds, step 804 is performed.

803: The head unit sets the first identifier to be in a first state.

If positioning performed by the head unit fails, that is, the head unit cannot obtain current location information, it may indicate that the location of the head unit is abnormal. The head unit may set the first identifier to be in the first state, and then perform step 806.

804: The head unit determines whether the second location information obtained through positioning matches historical location information of the vehicle, where the second location information is the location information of the vehicle.

If positioning succeeds, the head unit may obtain the second location information, where the second location information is current location information of the head unit. The positioning service of the head unit may include one or more of services such as GPS positioning, Wi-Fi positioning, mobile cellular network base station positioning, and UWB indoor positioning. When there are a plurality of types of positioning services, the head unit may determine the second location information based on the plurality of types of positioning services. For example, the mobile phone may obtain an average value of a plurality of pieces of reference location information determined based on the plurality of types of positioning services, and the average value is the second location information; or the mobile phone may obtain the second location information based on reference location information with a relatively small difference in a plurality of pieces of reference location information obtained based on the plurality of positioning services.

After the head unit obtains the second location information through positioning, the head unit may determine the second location information and the historical location information of the vehicle that is stored in the head unit, and determine whether the second location information of the vehicle is reasonable compared with the historical location information of the vehicle. For example, if previous location information of the head unit records that the vehicle was at the location 1 ten minutes ago and is currently located at the location 2, and a distance between the location 1 and the location 2 is 100 km (kilometers). This is obviously unreasonable, and the second location information does not match the historical location information of the vehicle.

If the second location information does not match the historical location information of the vehicle, it may indicate that the location of the head unit is abnormal, and the head unit may perform step 803 to set the first identifier to be in the first state. If the second location information matches the historical location information of the vehicle, it may indicate that the location of the head unit is normal, and the head unit may perform step 805 to set the first identifier to be in the second state.

805: The head unit sets the first identifier to be in the second state.

After step 805, the head unit may perform step 806.

806: The head unit sends the first identifier to the mobile phone, and then performs step 807.

For descriptions of step 806, refer to the descriptions in step 601. Details are not described herein again. The state of the first identifier is obtained by using steps 800 to 805.

807: After receiving the first identifier sent by the head unit, the mobile phone determines the state of the first identifier.

If the first identifier received by the mobile phone from the head unit is in the first state, step 808A is performed. If the first identifier received by the mobile phone from the head unit is in the second state, step 811 is performed.

808A: The mobile phone prompts the user to perform identity authentication.

If it is determined that the first identifier is in the first state in step 807, it may indicate that the location of the head unit is abnormal. Therefore, the mobile phone may prompt the user to perform identity authentication. For specific descriptions of user identity authentication, refer to the descriptions in step 602. Details are not described herein again.

After step 808A, the mobile phone may perform step 808B.

808B: The mobile phone determines whether the identity authentication succeeds.

If the user identity authentication fails, step 809 is performed; or if the user identity authentication succeeds, step 810A is performed.

809: The mobile phone sends service failure information to the head unit.

If the user identity authentication fails, the current user may be an unauthorized user, or the user may cancel a service, or the user currently does not want to continue service processing. Therefore, the mobile phone may send service failure information to the head unit, to indicate the head unit to stop service processing.

810A: The mobile phone sends second information including a second identifier to the head unit. The second information is signed information. The second identifier indicates that it is determined to perform the vehicle door opening service.

If the user identity authentication in step 808B succeeds, the mobile phone may send the signed information to the head unit. The information includes the second identifier used to indicate that it is determined to perform the door opening service, to indicate the head unit to perform the vehicle door opening operation.

Herein, signing is adding some data to to-be-signed data unit or performing encryption on the to-be-signed data unit. The added data or encryption processing enables a receive end to confirm a source of a received data unit and integrity of the data unit through signature verification, to protect the data unit from being forged or tampered with.

The mobile phone signs the second information including the second identifier, and then sends the signed second information to the head unit, so that the head unit can confirm, through signature verification, that the second identifier in the second information is forged or tampered with.

After step 810A, the head unit may perform step 814.

If the first identifier in step 807 is in the second state, the mobile phone may perform step 811.

811: The mobile phone determines whether positioning succeeds.

If it is determined that the first identifier is in the second state in step 807, it may indicate that the location of the head unit is normal, and the mobile phone may further determine, through positioning, whether the location of the mobile phone is normal.

Specifically, the mobile phone may include one or more of positioning services such as GPS positioning, BeiDou positioning, Wi-Fi positioning, or UWB indoor positioning. The mobile phone may locate a current location by using these positioning services.

If positioning performed by the mobile phone fails, step 812 is performed; or if positioning performed by the mobile phone succeeds, step 813 is performed.

812: The mobile phone sets the first identifier to be in the first state.

If positioning performed by the mobile phone fails, that is, the mobile phone cannot obtain current location information, it may indicate that the location of the mobile phone is abnormal. The mobile phone may set the first identifier to be in the first state. After step 812, the mobile phone may perform step 808A, to prompt the user to perform identity authentication.

813: The mobile phone determines whether the first location information obtained through positioning matches historical location information of the mobile phone.

If positioning performed by the mobile phone succeeds, the mobile phone determines whether current location information obtained through positioning, namely, the first location information matches the historical location information of the mobile phone.

If the first location information does not match the historical location information of the mobile phone, it may indicate that the location of the mobile phone is abnormal, and the mobile phone may perform step 812 to set the first identifier to be in the first state. If the first location information matches the historical location information of the mobile phone, it may indicate that the location of the mobile phone is normal, the first identifier is still in the second state, and the mobile phone may perform step 810B. If the first location information matches the historical location information of the mobile phone, the first identifier may remain in the second state.

810B: The mobile phone sends signed first information to the head unit, where the first information includes a third identifier and first location information, and the third identifier indicates that the location of the first device and the location of the second device are normal.

When the first location information matches the historical location information of the mobile phone, the mobile phone may determine that both the location of the head unit and the location of the mobile phone are normal, and send the third identifier and the first location information to the head unit.

After step 810B, the head unit may perform step 814.

814: The head unit performs signature verification on information received from the mobile phone.

The information received by the head unit from the mobile phone may be second information that includes the second identifier and that is sent by the mobile phone in step 810A, and the second information is signed information.

Alternatively, the information received by the head unit from the mobile phone may be the signed first information sent by the mobile phone in step 810B, and the first information includes the third identifier and the first location information. The information received by the head unit from the mobile phone may also be referred to as third information.

Signature verification is a process of verifying a signed data unit based on a signature result. Because an unauthorized user cannot sign invalid data to generate a valid signature result, if the second identifier, the third identifier, or the first location information in the information sent by the mobile phone is tampered with, the signature result received by the head unit is invalid. Therefore, the head unit may determine, through signature verification, whether the signed second identifier, the signed third identifier, or the signed first location information is forged or tampered with. If the head unit determines that the second identifier, the third identifier, or the first location information is not forged or tampered with, the signature verification succeeds; or if the head unit determines that the second identifier, the third identifier, or the first location information is forged or tampered with, the signature verification fails.

If the signature verification fails, step 815 is performed; or if the signature verification succeeds, step 816 is performed.

815: The head unit sends service failure information to the mobile phone.

If the signature verification fails, the second identifier, the third identifier, or the first location information sent by the mobile phone may be forged or tampered with, and the second identifier, the third identifier, or the first location information received by the head unit is untrusted data. Therefore, the head unit may send the service failure information to the mobile phone, to indicate the mobile phone and the user to stop service processing.

816: The head unit determines whether the received information includes the second identifier or includes the third identifier and the first location information.

If the signature verification succeeds, the head unit may determine whether the third information includes the second identifier or includes the third identifier and the first location information, to perform different processing operations based on different included content.

If the third information includes the second identifier, step 817 is performed; or if the third information includes the third identifier and the first location information, step 818 is performed.

817: The head unit performs the vehicle door opening service.

It can be learned from step 808 and step 810A that, if it is determined in step 816 that the third information includes the second identifier used to indicate that it is determined to perform the vehicle door opening service, it indicates that the user identity authentication succeeds on a mobile phone side, and the head unit may perform the vehicle door opening operation based on the indication of the second identifier, to open the vehicle door for the user.

818: The head unit determines, based on the first location information, whether the location of the mobile phone is valid.

If it is determined in step 816 that the third information includes the first location information and the third identifier used to indicate that both the location of the head unit and the location of the mobile phone are normal, the head unit may determine, based on the first location information, whether the location of the mobile phone is valid.

If the head unit obtains the second location information, and the head unit determines, based on the first location information and the second location information, that a distance between the location of the mobile phone and the location of the vehicle (namely, the reference location) is less than or equal to a preset threshold, the location of the mobile phone is valid; otherwise, the location of the mobile phone is invalid. For example, if the second location information is NULL or a preset value, and the head unit does not obtain the second location information through positioning, the location of the mobile phone is invalid. For another example, if a distance between a location indicated by the first location information and a location indicated by the parking location information is greater than the preset threshold, the location of the mobile phone is invalid.

If the location of the mobile phone is valid, the head unit performs step 817 to open the vehicle door for the user. In this way, for a relay attack scenario in which the mobile phone of the user is relatively far away from the vehicle shown in FIG. 1, the head unit determines that the mobile phone of the user is not near the vehicle, and the location of the mobile phone is invalid. Therefore, the vehicle door is not opened, to avoid a risk of unauthorized vehicle door opening caused by a relay attack can be avoided.

If the location of the mobile phone is invalid, it may indicate that the location of the mobile phone is abnormal. Therefore, the head unit sets the first identifier to be in the first state, and performs step 806 to send the first identifier in the first state to the mobile phone, so that the mobile phone performs step 807 and step 808A, to perform user identity authentication.

It should be noted that when the mobile phone sends the service failure information to the head unit, or when the mobile phone receives the service failure information sent by the head unit, the mobile phone and/or the head unit may further notify the user of a service failure by using a sound, through vibration, an indicator light, an interface display reminder, or the like, so that the user is alert to an illegal attack. For example, when the mobile phone receives the service failure information sent by the head unit, the mobile phone may remind, by using a voice, the user that "The vehicle door opening operation fails". In this way, if the user does not actually open the door near the vehicle, after receiving a prompt of the mobile phone, the user may be vigilant about whether there is an illegal attack.

It may be understood that in step 810A and step 810B, in addition to the second identifier, the first location information, or the third identifier, to-be-signed data may further include other data such as a mileage, a vehicle frame number, and time information. In addition, data sent by the head unit to the mobile phone in step 806 may further include a random number, and the to-be-signed data in step 810A and step 810B may also include the random number. In this case, the head unit may verify whether the random number received from the mobile phone is consistent with the random number sent by the head unit to the mobile phone in step 806, to improve security of the vehicle door opening service.

In some other embodiments, after step 808A, if the mobile phone performs step 810A, it may indicate that the user identity authentication performed by the mobile phone succeeds. The service information sent by the mobile phone to the head unit in step 810A may further include first location information, and the first location information may be NULL or a preset value.

In some other embodiments, the method procedure shown in FIG. 8A-1 to FIG. 8A-4 may not include step 814. To be specific, the head unit does not perform signature verification after receiving third information sent by the mobile phone. Correspondingly, in step 810A and step 810B, service information sent by the mobile phone to the head unit is unsigned information. The third information is the second identifier sent by the mobile phone, or the third information is the third identifier and the first location information that are sent by the mobile phone.

Figures 1, 8B:
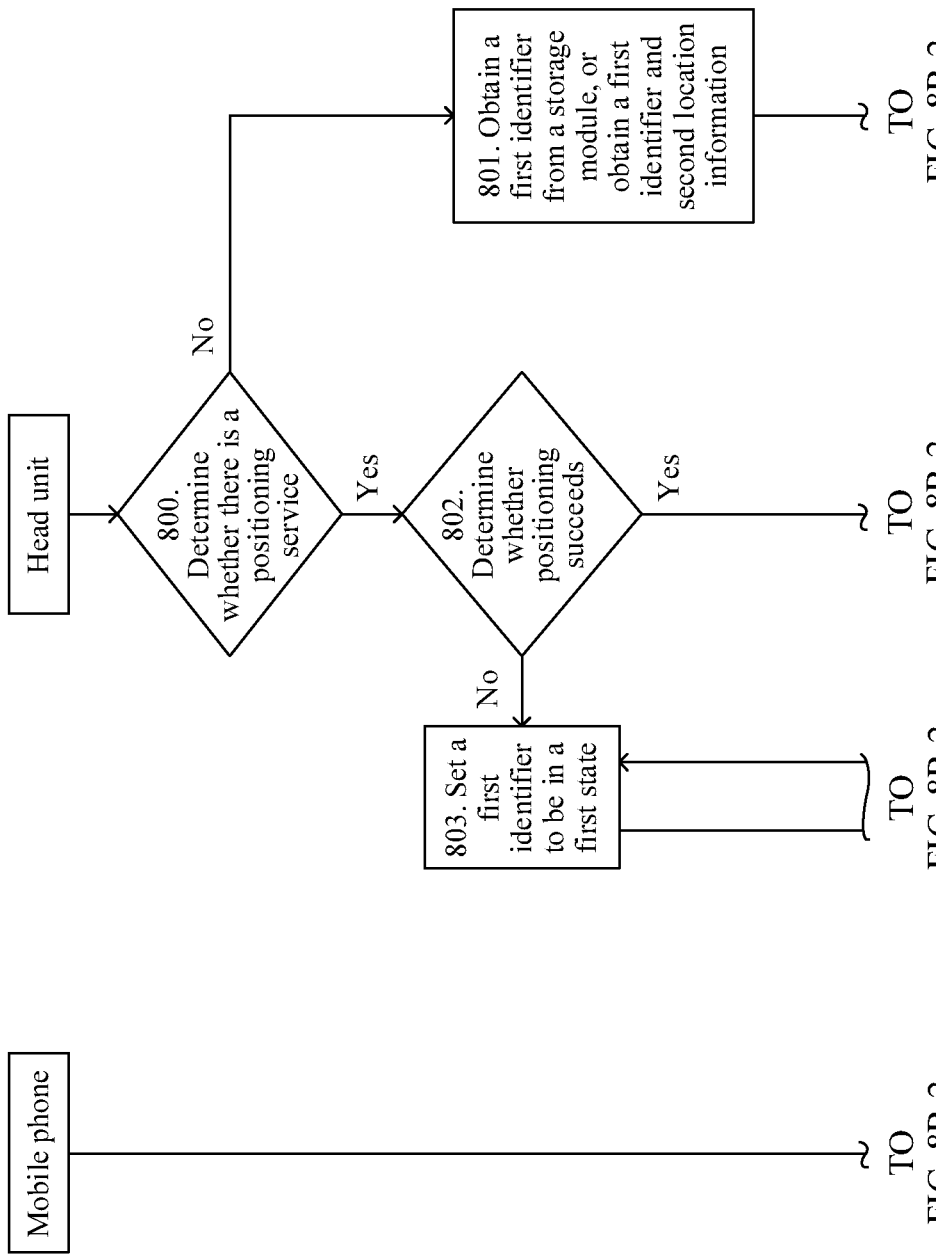
Figures 2, 8B:
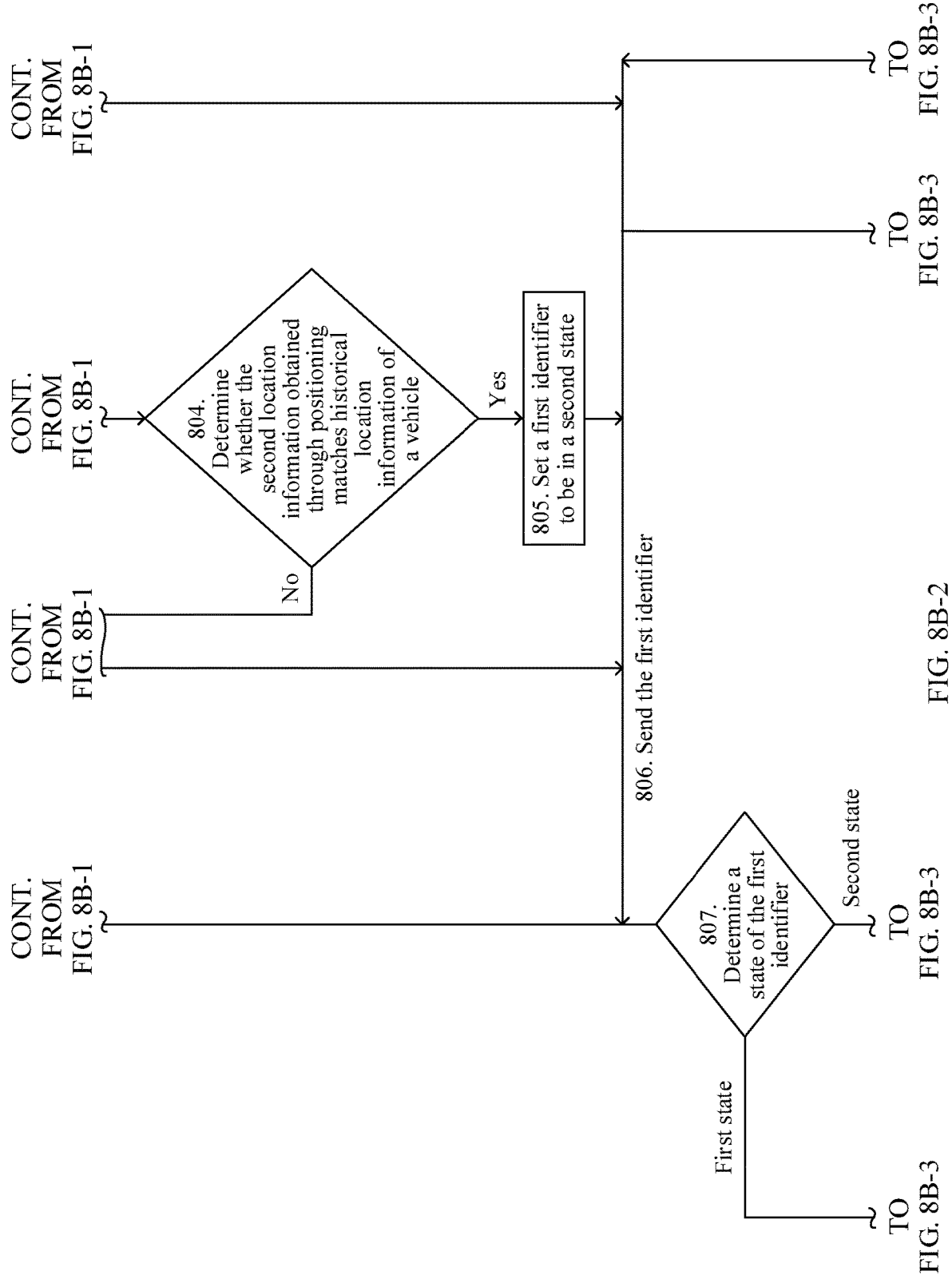
Figures 4, 8B:
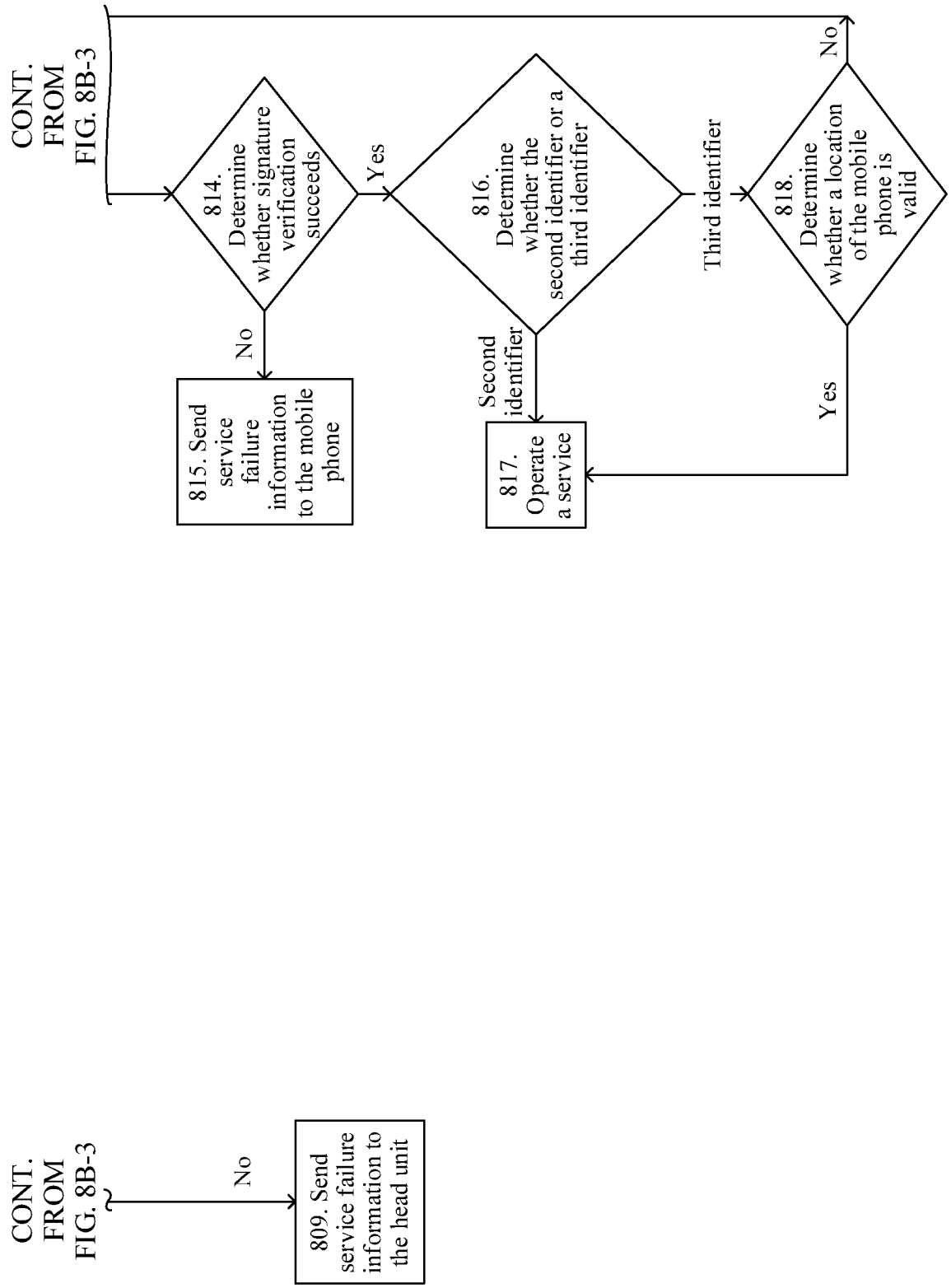

In some other embodiments, the method procedure shown in FIG. 8A-1 to FIG. 8A-4 may not include step 812. Referring to FIG. 8B-1 to FIG. 8B-4, when the mobile phone determines that positioning fails in step 811, it may indicate that the location of the mobile phone is abnormal. In this case, the mobile phone may not perform step 812, but directly perform step 808A, to prompt the user to perform identity authentication. When the mobile phone determines that the first location information does not match the historical location information in step 813, it may indicate that the location of the mobile phone is abnormal. In this case, the mobile phone may not perform step 812, but directly perform step 808A, to prompt the user to perform identity authentication.

Figure 9:
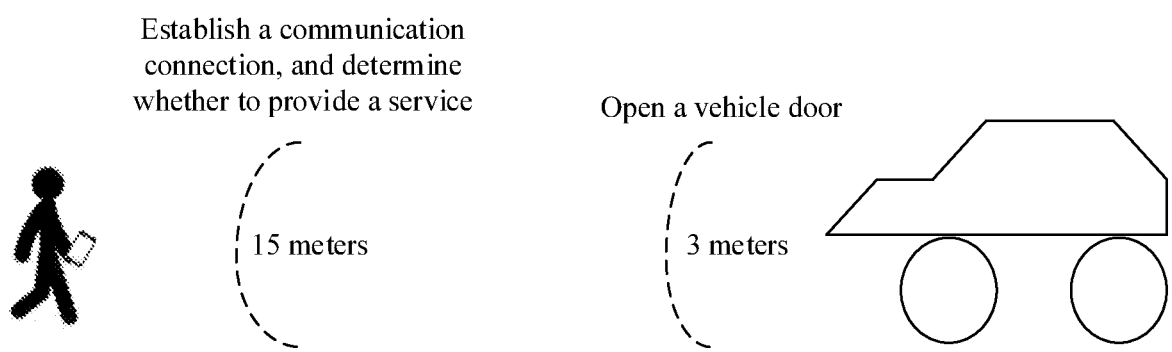
FIG. 9 is a diagram of a location relationship according to an embodiment of this application.

In some other embodiments, step 817 may be replaced with the following: If a distance between the mobile phone and the head unit is less than or equal to a second preset length (for example, three meters), the head unit performs the vehicle door opening operation. In other words, referring to FIG. 9, if the distance between the mobile phone and the head unit is less than or equal to a first preset length (for example, 15 meters), the mobile phone and the head unit may establish a communication connection, and the head unit may determine whether to perform the vehicle door opening operation. When the head unit determines that the vehicle door opening operation needs to be performed, if the distance between the mobile phone and the head unit is greater than a second preset length (for example, three meters), the head unit temporarily does not open the door; or if the distance between the mobile phone and the head unit is less than or equal to a second threshold, the head unit may automatically open the vehicle door.

In some embodiments, in the foregoing service processing procedure, the mobile phone may specifically directly obtain the first location information from a positioning service module through a secure module. The secure module may include a trusted execution environment (trusted execution environment, TEE) module and/or a secure element (secure element, SE) module. For example, the secure module may be directly connected to a positioning service module such as GPS or BeiDou through hardware. In this case, the mobile phone may directly obtain, into the secure module, first location information obtained through positioning by using the positioning service module such as GPS or BeiDou, and the first location information does not pass through an insecure module. Therefore, reliability and accuracy of the first location information can be ensured, and the first location information is prevented from being tampered with by an insecure module. After obtaining the first location information through the secure module, the mobile phone may use the service information to carry the first location information, sign the service information through the secure module, and then send the signed service information to the head unit, to prevent the service information from being tampered with or forged by another device. In this way, the first location is securely and accurately transferred to the head unit.

Figure 10A:
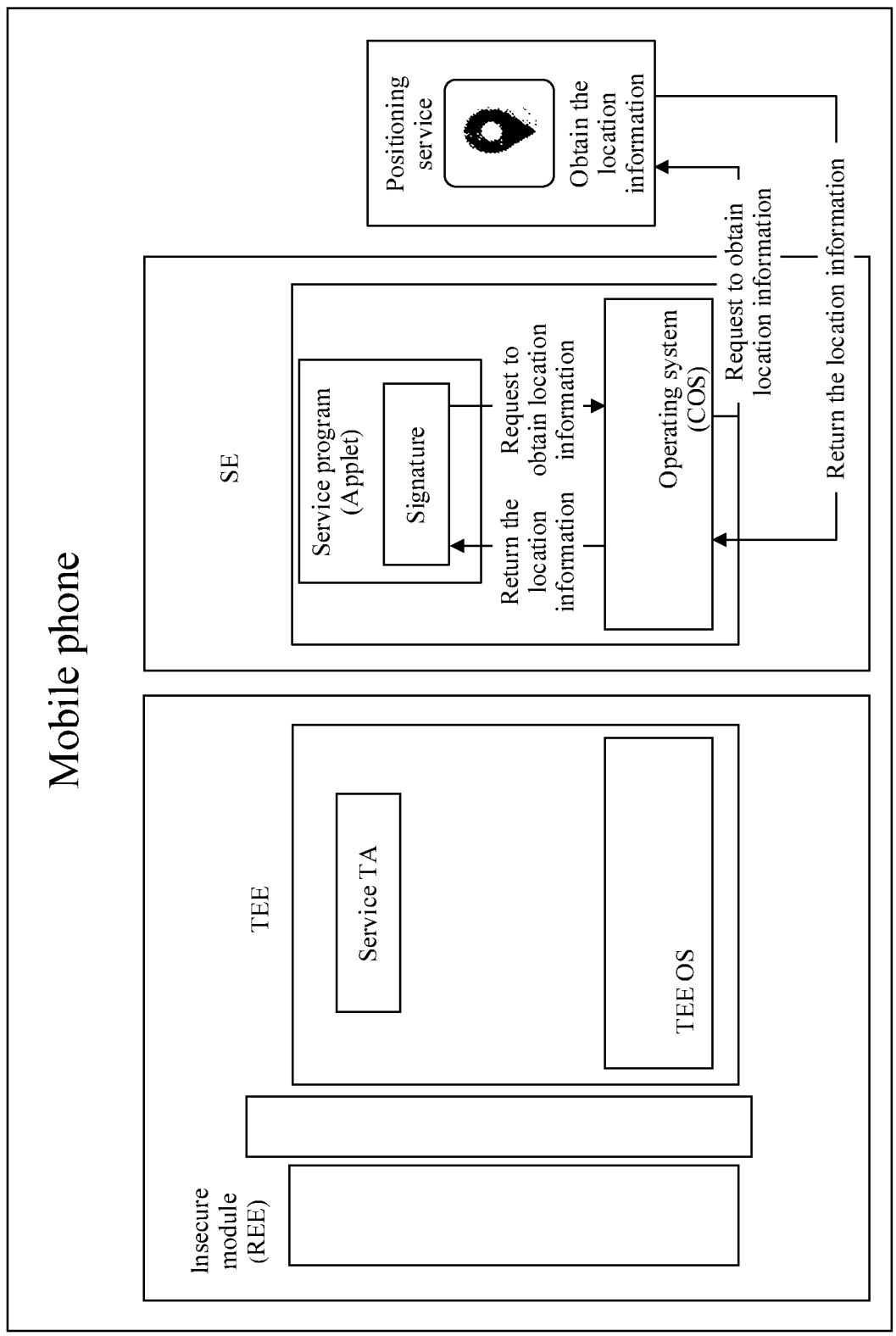
FIG. 10A is a flowchart of location information processing according to an embodiment of this application.
Figure 10B:
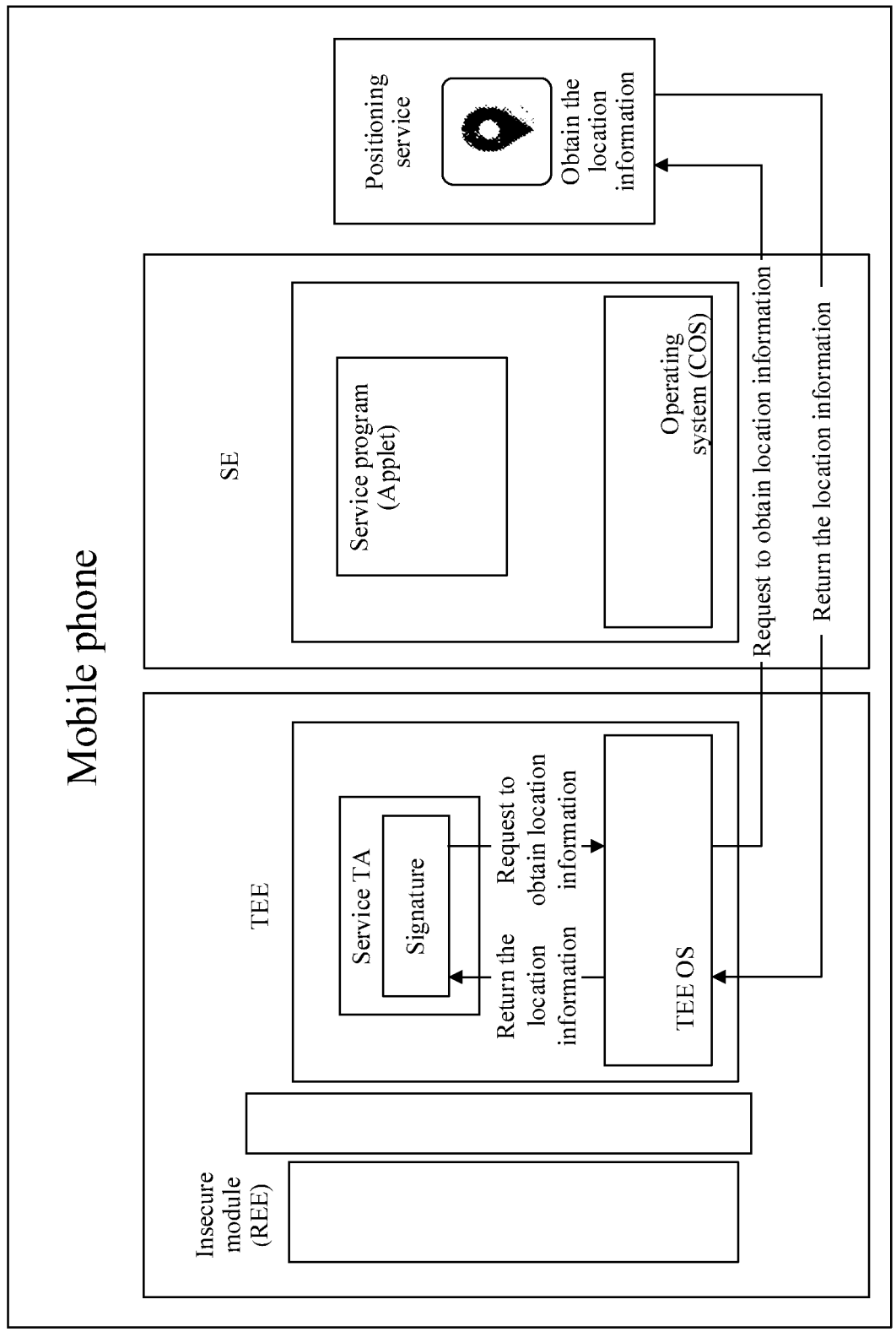
FIG. 10B is another flowchart of location information processing according to an embodiment of this application.

For example, referring to FIG. 10A, a vehicle key service Applet in the SE module of the mobile phone requests to obtain location information of the mobile phone, namely, the first location information, from the positioning service module. The positioning service module obtains the first location information, the SE module obtains the first location information from the positioning service module, and then the SE module generates the signed service information. The service information includes the first location information. Then, the mobile phone may send the signed service information generated by the SE module to the head unit, to securely and reliably transmit the first location information to the head unit. The REE represents the insecure module, the TEE module includes a TEE application (TEE Application, TA) and a TEE operating system (TEE operating system, TEE OS), and the SE module includes the service Applet and an operating system (COS).

For example, referring to FIG. 10A, a vehicle key service TA in the TEE module of the mobile phone requests to obtain location information of the mobile phone, namely, the first location information, from the positioning service module. The positioning service module obtains the first location information, the TEE module obtains the first location information from the positioning service module, and then the TEE module generates the signed service information. The service information includes the first location information. Then, the mobile phone may send the signed service information generated by the TEE module to the head unit, to securely and reliably transmit the first location information to the head unit.

Figure 10C:
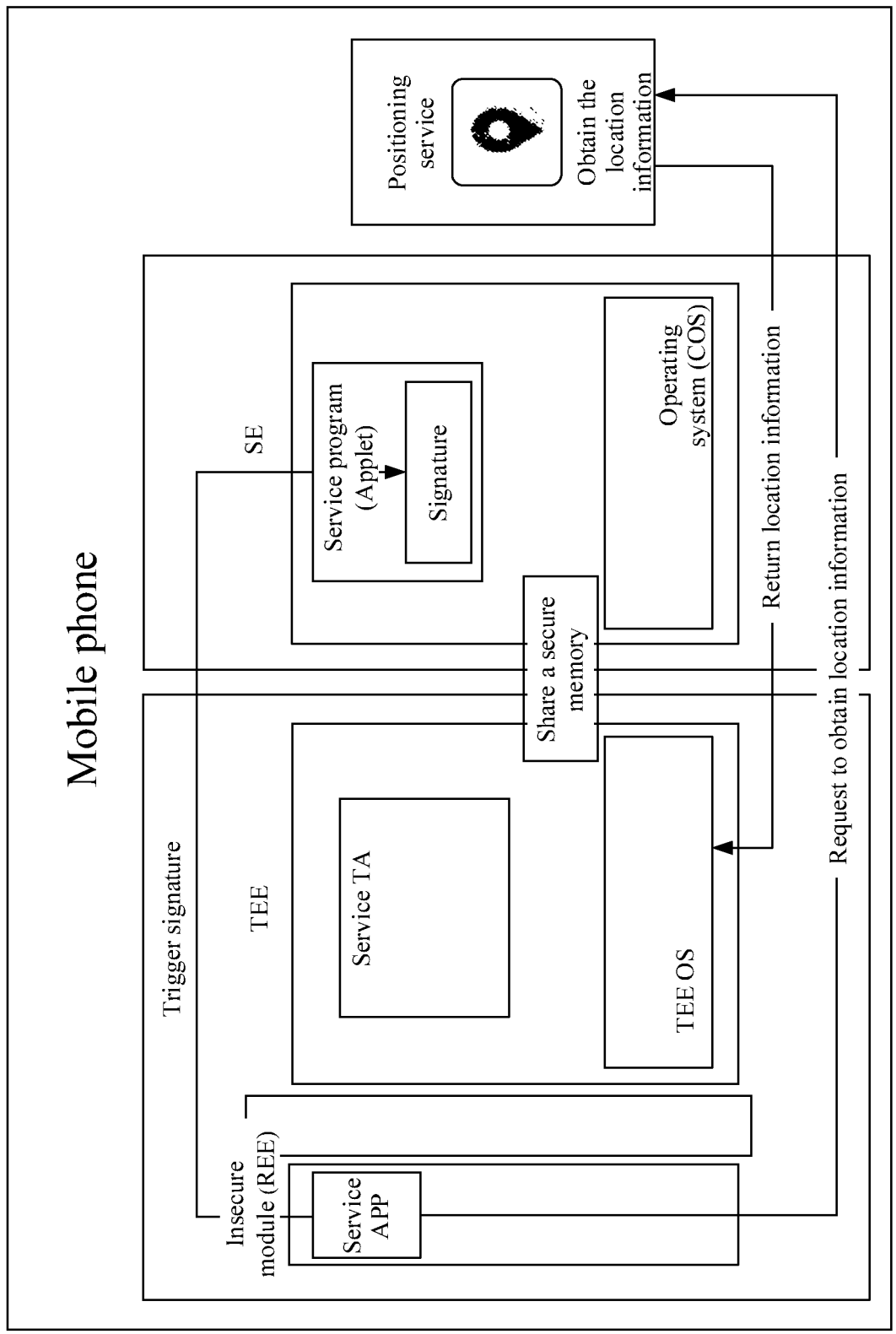
FIG. 10C is another flowchart of location information processing according to an embodiment of this application.

For another example, referring to FIG. 10C, a vehicle key service application (application, APP) in the REE module of the mobile phone requests to obtain location information (namely, the first location information) of the mobile phone from the positioning service module, and triggers the SE module to perform signature. After receiving the request from the vehicle key service APP, the positioning service module obtains the first location information, and returns the first location information to the TEE module. The TEE module and the SE module share a secure memory, and the SE module may obtain the first location information in the TEE module. After receiving an indication that is from the vehicle key service APP and that triggers signature, the SE module generates the signed service information based on the first location information. The service information includes the first location information. Then, the mobile phone may send the signed service information generated by the SE module to the head unit, to securely and reliably transmit the first location information to the head unit.

It should be noted that the service processing methods shown in FIG. 6 to FIG. 10 C may be applied to another wireless and contactless service scenario in addition to a vehicle door opening scenario. For example, the methods may be further applied to a scenario of unlocking another removable device. In this scenario, the first device may be a mobile phone, a wearable device, or the like, and the second device may be a lock of a movable device.

For another example, the service processing methods shown in FIG. 6 to FIG. 10C may be further applied to a scenario in which the mobile phone simulates a bus card and is swiped on a bus POS terminal, a scenario in which the mobile phone simulates a bank card and is swiped on a mobile POS terminal, and the like. In these scenarios, the first device may be a mobile phone, the second device may be a POS terminal (namely, a charging terminal), and the head unit in the foregoing procedure may be replaced with a POS terminal. It should be noted that the POS terminal may usually have one or more positioning services, and therefore may perform step 802. In other words, the method procedure shown in FIG. 8A-1 to FIG. 8A-4 may not include step 800 and step 801. In these scenarios, according to the service processing methods shown in FIG. 6 to FIG. 10C, the mobile phone may obtain secure and reliable first location information through the secure module, and send, in a temper-proof manner, the first location information, the second identifier, or the third identifier to the POS terminal by using the signed information. The POS terminal may determine, based on the second identifier, the third identifier, or the first location information, whether the location of the mobile phone is valid, and whether a card swiping service needs to be performed. In addition, when the location of the mobile phone is invalid, the mobile phone may further initiate user identity authentication based on the first identifier sent by the head unit, to improve security of a card swiping operation. Details are not described herein. It can be seen that when the service processing methods shown in FIG. 6 to FIG. 10C are applied to another wireless and contactless service scenario, security of operating a service can also be improved.

In some other embodiments, in a vehicle door opening scenario, referring to FIG. 11A-1 to FIG. 11A-4 and FIG. 11B-1 to FIG. 11B-4, after step 813, the method may further include the following steps.

819: The mobile phone determines whether the first location information matches the parking location information.

If neither the first location information nor the parking location information is NULL or the preset value, and the distance between the location indicated by the first location information and the location indicated by the parking location information is less than or equal to the preset threshold, the first location information matches the parking location information; otherwise, the first location information does not match the parking location information. For example, if the first location information is NULL or a preset value, it indicates that the mobile phone does not obtain the first location information through positioning, and therefore, it is determined that the first location information does not match the parking location information. For another example, if the distance between the location indicated by the first location information and the location indicated by the parking location information is greater than the preset threshold, it is determined that the first location information does not match the parking location information.

If the first location information matches the parking location information, it may indicate that both the location of the mobile phone and the location of the head unit are normal. Therefore, the mobile phone may perform step 810B, to send the third identifier and the first location information to the head unit. If the first location information does not match the parking location information, it may indicate that the location of the mobile phone is abnormal. Therefore, the mobile phone may perform step 812, to set the first identifier to be in the first state, and then perform subsequent steps shown in FIG. 11A-1 to FIG. 11A-4 such as 808A.

Figures 1, 11A:
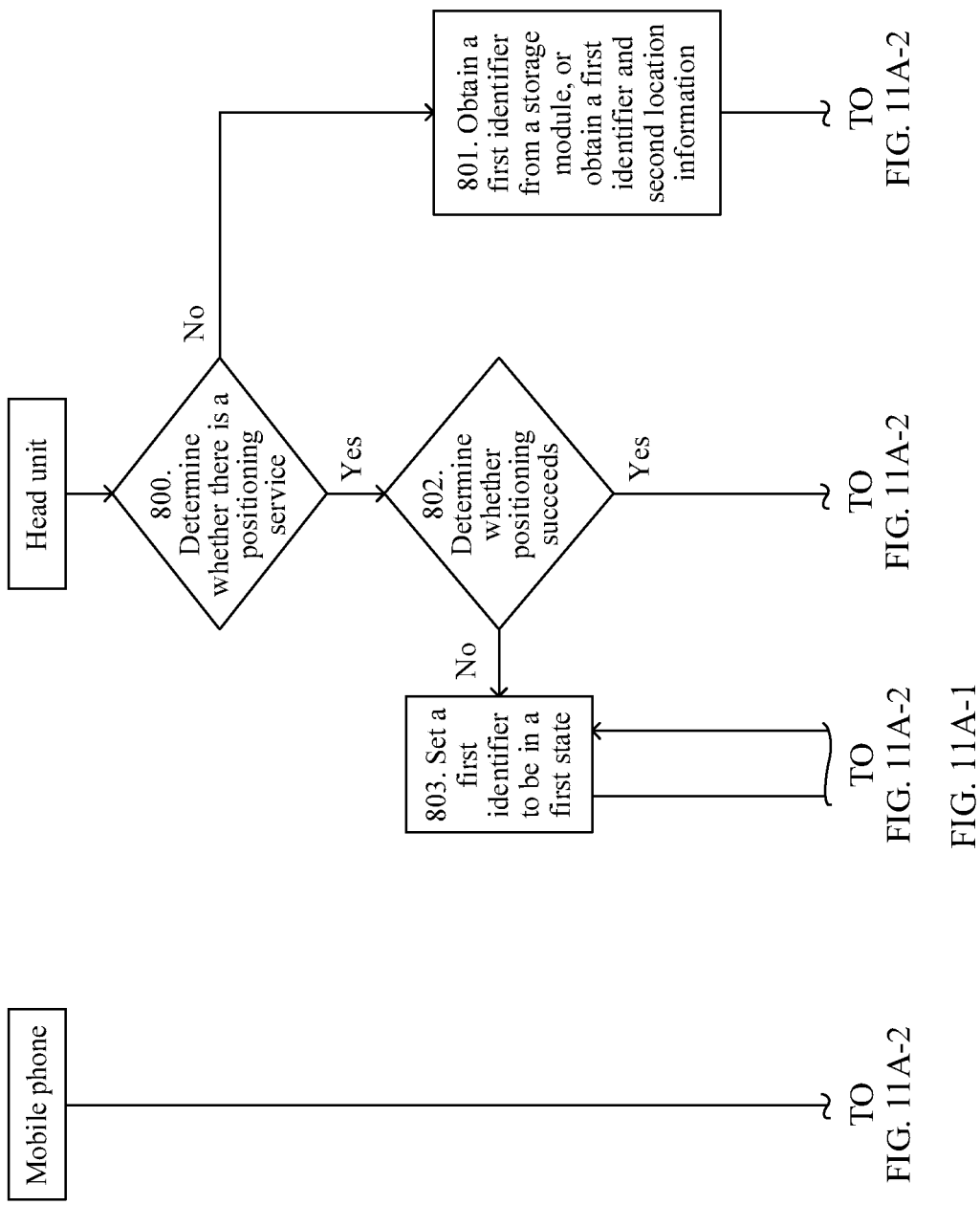
Figures 2, 11A:
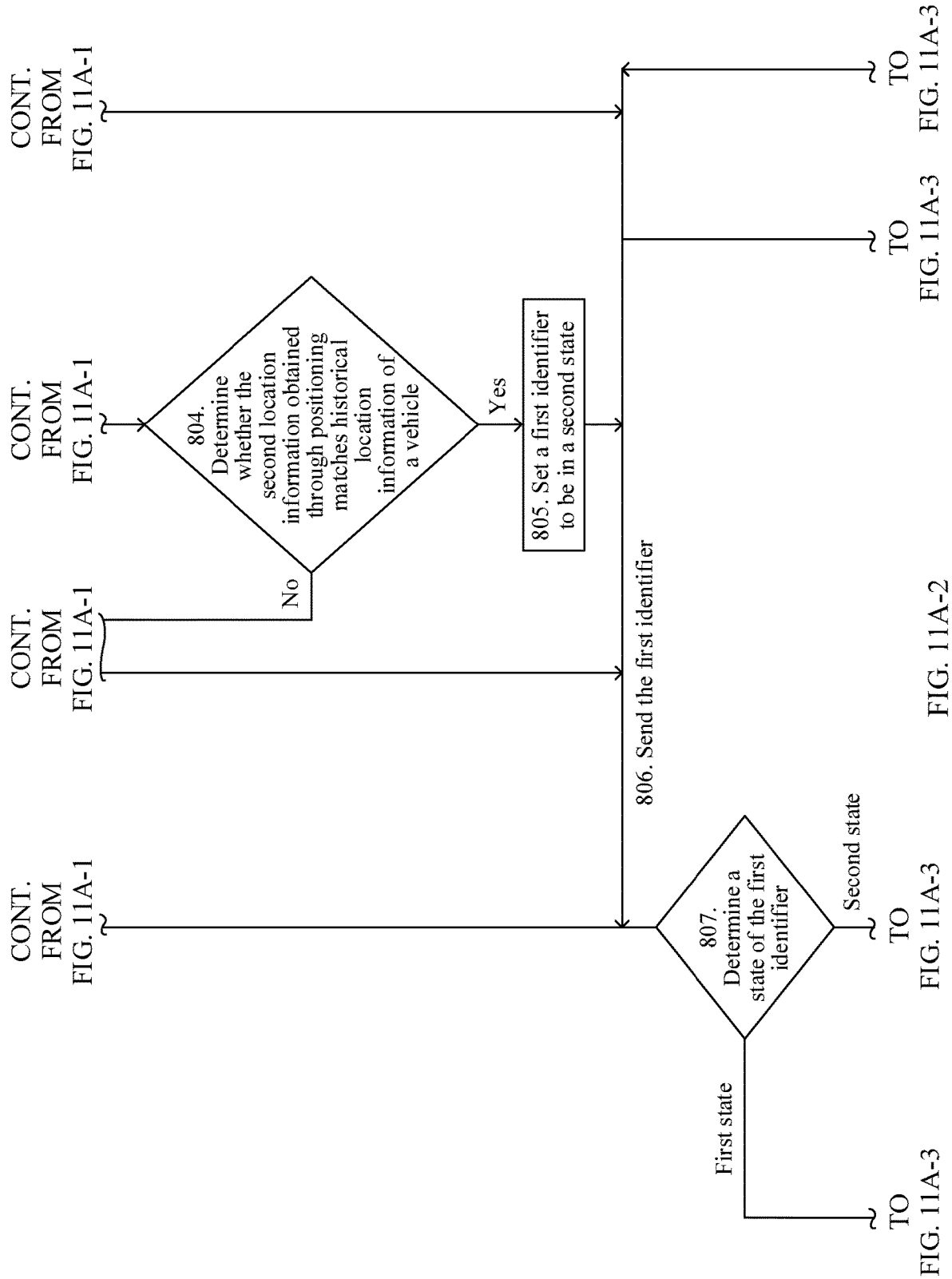
Figures 3, 11A:
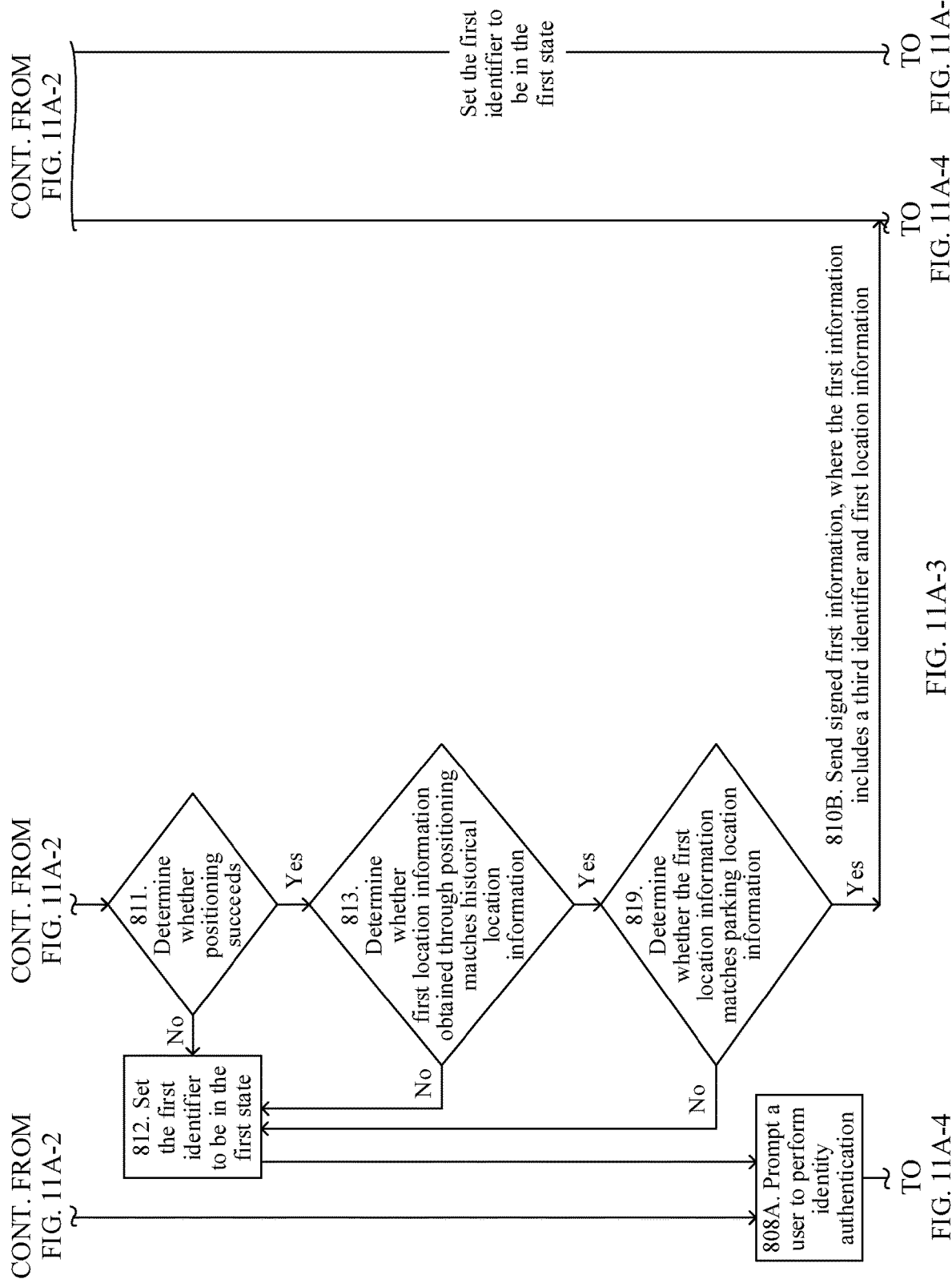
Figures 4, 11A:
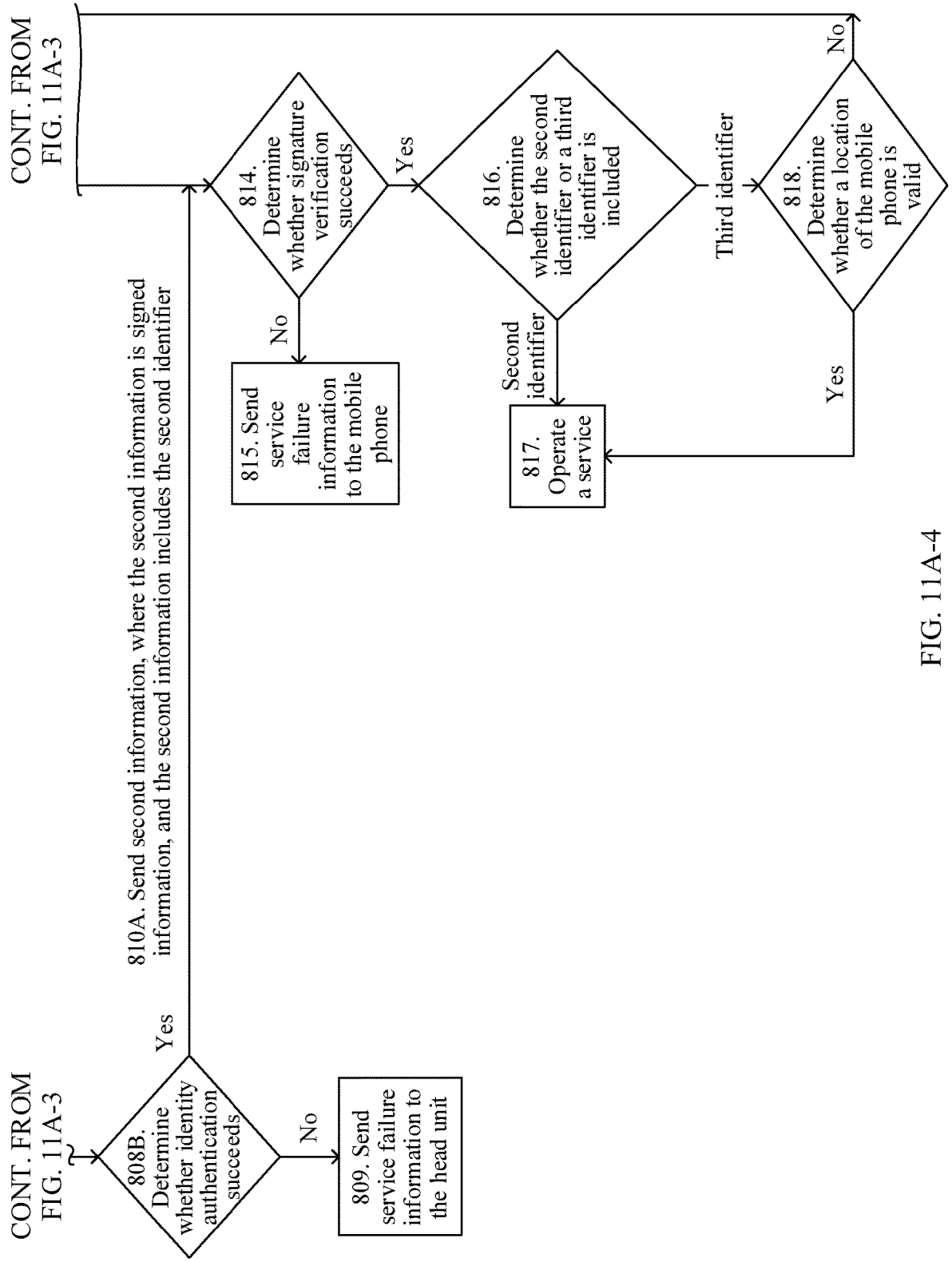
Figures 3, 11B:
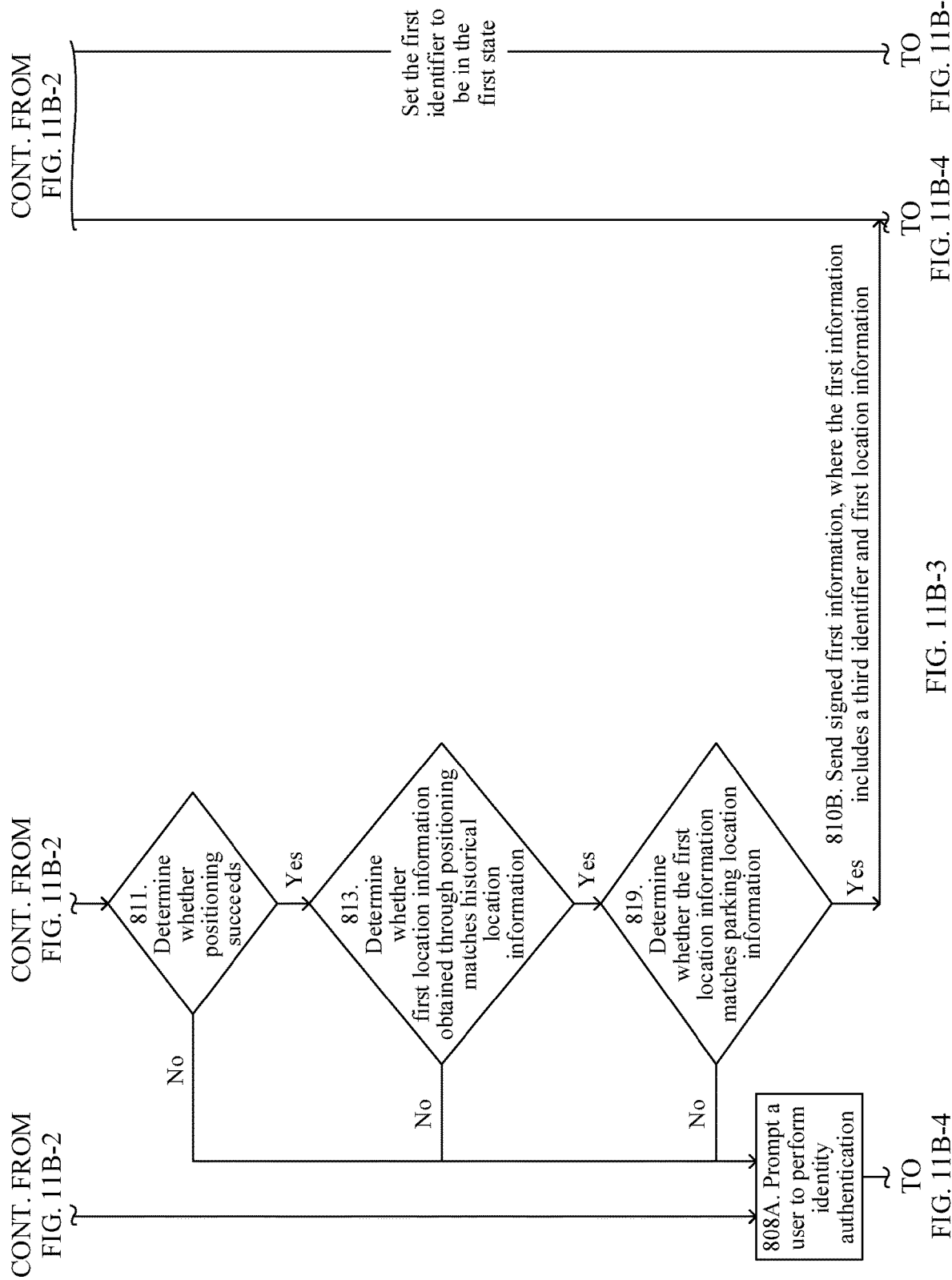

In some other embodiments, a method procedure shown in FIG. 11A-1 to FIG. 11A-4 may alternatively not include step 812. To be specific, referring to FIG. 11B-1 to FIG. 11B-4, when the mobile phone determines that positioning fails in step 811, it indicates that the location of the mobile phone is abnormal. In this case, the mobile phone may not perform step 812, but directly perform step 808A, to prompt the user to perform identity authentication. When the mobile phone determines that the first location information does not match the historical location information in step 813, it may indicate that the location of the mobile phone is abnormal. In this case, the mobile phone may not perform step 812, but directly perform step 808A, to prompt the user to perform identity authentication. When the mobile phone determines that the first location information does not match the parking location information in step 819, it indicates that the location of the mobile phone is abnormal. In this case, the mobile phone may not perform step 812, but directly perform step 808A, to prompt the user to perform identity authentication.

In some other embodiments, if the mobile phone determines that the first identifier is in the second state in step 807, the mobile phone may further determine whether the mobile phone is moving. The user usually wants to open the vehicle door in a process of moving towards the vehicle, and the mobile phone is moving in the process. Therefore, if the mobile phone is static, the user may not walk towards the vehicle, and the user may not want to open the vehicle door. Therefore, it is determined that the location of the mobile phone is abnormal. Therefore, the mobile phone may perform step 812 to set the first standard to be in the first state, so as to perform step 808A to prompt the user to perform identity authentication. Alternatively, if it is determined that the mobile phone is static, the mobile phone may not perform step 812, but perform step 808A to prompt the user to perform identity authentication. If the mobile phone is moving, the mobile phone may further perform step 811, step 813, or step 819. It should be noted that there is no definite sequence between step 811, step 813, or step 819 and determining whether the mobile phone is moving. If the mobile phone is moving, the first location information obtained by the mobile phone through positioning matches the historical location information, and the first location information matches the parking location information, the mobile phone may perform step 810B.

Figure 12A:
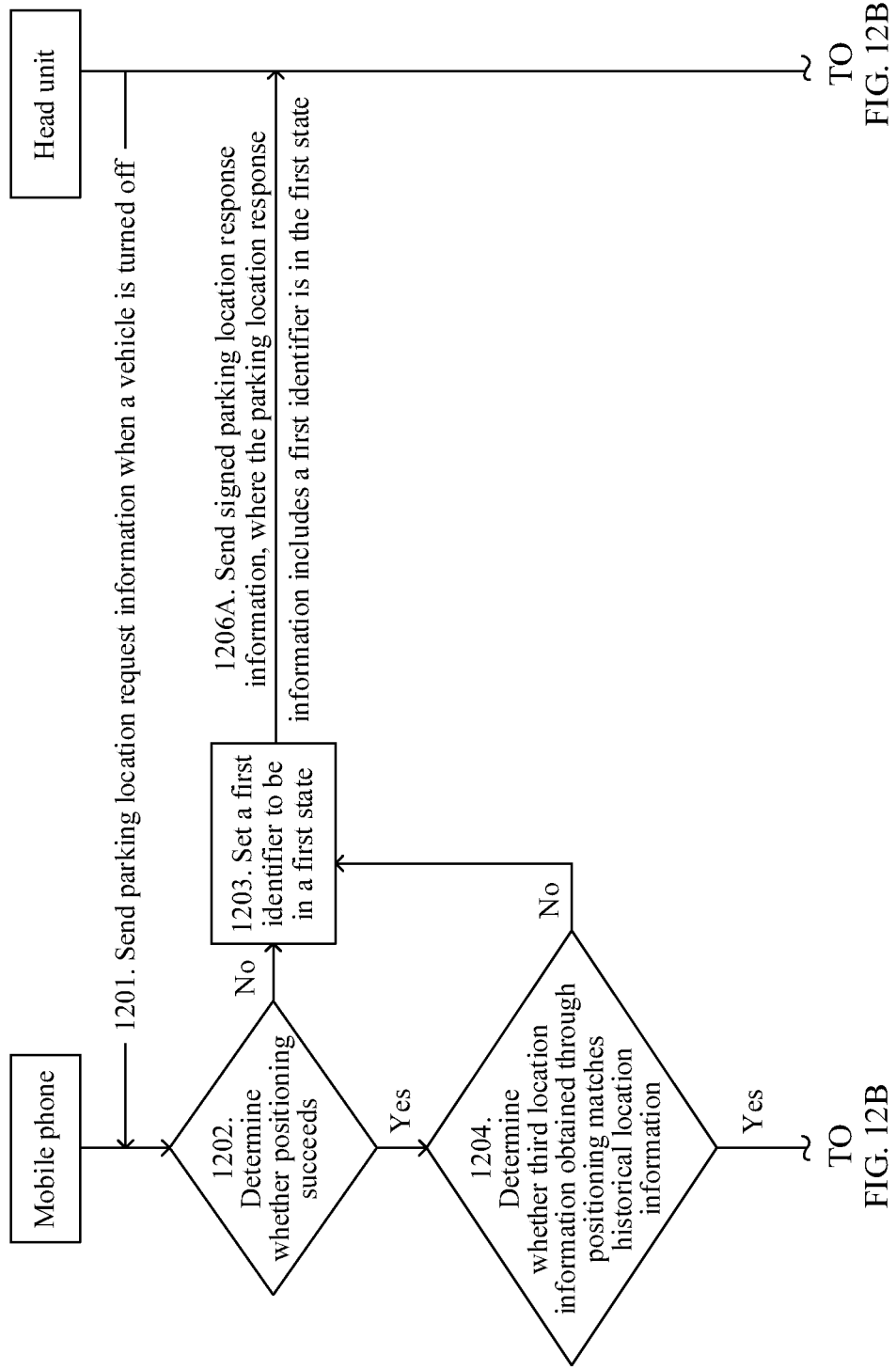
FIG. 12A and FIG. 12B are a flowchart of another service processing method according to an embodiment of this application.
Figure 12B:
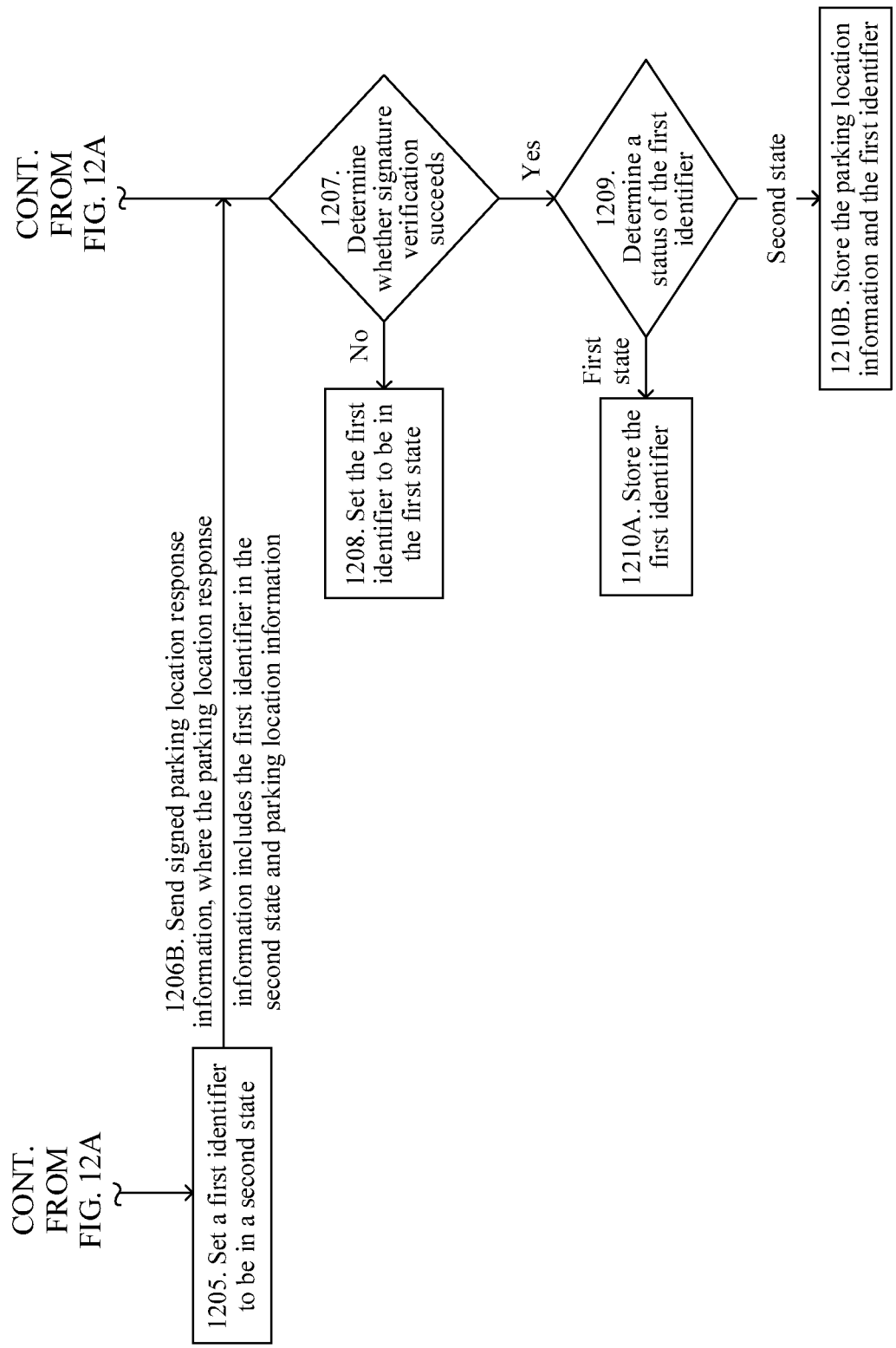

In some other embodiments, in a vehicle door opening scenario, if the head unit does not have a positioning service, before step 801, the head unit may further obtain parking location information that existing when the vehicle is turned off, so that the head unit obtains the parking location information in step 801. Specifically, the head unit may obtain the location information of the mobile phone from the mobile phone when the vehicle is turned off. The location information is the parking location information that exists when the vehicle is turned off. Referring to FIG. 12A and FIG. 12B, the process may include the following steps.

1201: The head unit sends parking location request information to the mobile phone when the vehicle is turned off.

1202: After receiving the parking location request information sent by the head unit, the mobile phone determines whether positioning succeeds.

If positioning performed by the mobile phone fails, step 1203 is performed; or if positioning performed by the mobile phone succeeds, step 1204 is performed.

1203: The mobile phone sets the first identifier to be in the first state.

If positioning performed by the mobile phone fails, that is, the mobile phone cannot obtain the location information, the mobile phone may set the first identifier to be in the first state.

After step 1203, the mobile phone may perform step 1206A.

1204: The mobile phone determines whether third location information obtained through positioning matches the historical location information of the mobile phone, where the third location information is the location information of the mobile phone.

If positioning performed by the mobile phone succeeds, the mobile phone may further determine whether the third location information obtained through positioning matches the historical location information of the mobile phone. The third location information is the location information that is of the mobile phone and that exists when the vehicle is turned off, namely, the parking location information.

If the third location information does not match the historical location information of the mobile phone, step 1203 may be performed. If the third location information matches the historical location information of the mobile phone, step 1205 is performed.

1205: The mobile phone sets the first identifier to be in the second state.

After step 1205, the mobile phone may perform step 1206B.

1206A: The mobile phone sends signed parking location response information to the head unit, where the parking location response information includes the first identifier, and the first identifier is in the first state.

1206B: The mobile phone sends signed parking location response information to the head unit, where the parking location response information includes the first identifier and the parking location information, and the first identifier is in the second state.

After step 1206A and step 1206B, the head unit may perform step 1207.

1207: After receiving the parking location response information sent by the mobile phone, the head unit performs signature verification.

If the signature verification fails, step 1208 is performed; or if the signature verification succeeds, step 1209 is performed.

1208: The head unit sets the first identifier to be in the first state, and then performs step 1210A.

1209: The head unit determines a status of the first identifier in the parking location response information.

If the first identifier is in the first state, step 1210A is performed. If the first identifier is in the second state, step 1210B is performed.

1210A: The head unit stores the first identifier.

1210B: The head unit stores the parking location information and the first identifier, where the first identifier is in the second state.

If the head unit does not have a positioning service, after step 1210A and step 1210B, the head unit may perform step 800 and step 801 shown in FIG. 8A-1 to FIG. 8A-4 or FIG. 11A-1 and FIG. 11B-1, and send the first identifier to the mobile phone in step 806.

In some other embodiments, the parking location response information sent by the mobile phone to the head unit may alternatively be unsigned information. After receiving the unsigned parking location response information, the head unit may directly determine the status of the first identifier in the parking location response information without a need to perform signature verification.

In some other embodiments, if it is determined in step 1202 that positioning performed by the mobile phone fails, the parking location information may be NULL or a preset value, and in step 1206A, the parking location information is carried in the parking location response information and sent to the head unit.

In some other embodiments, if the third location information does not match the historical location information of the mobile phone, the mobile phone may further store the parking location information, and the parking location information is NULL or a preset value. If the third location information matches the historical location information of the mobile phone, the mobile phone may further store, as the parking location information, the third location information obtained through positioning performed by the mobile phone, so that the mobile phone may determine, in step 819, whether the first location information matches the parking location information.

In some other embodiments of the vehicle door opening scenario, when the head unit has a positioning service, the head unit may further obtain parking location information when the vehicle is turned off, and send the parking location information to the mobile phone, so that the mobile phone determines, in step 819, whether the first location information matches the parking location information. The head unit may send the parking location information to the mobile phone when the vehicle is turned off. Alternatively, the head unit may send the parking location information to the mobile phone when sending the first identifier to the mobile phone. Alternatively, the head unit may send the parking location information to the mobile phone after sending the first identifier to the mobile phone. A specific time of sending a parking location is not specifically limited in this embodiment of this application.

Figure 13:
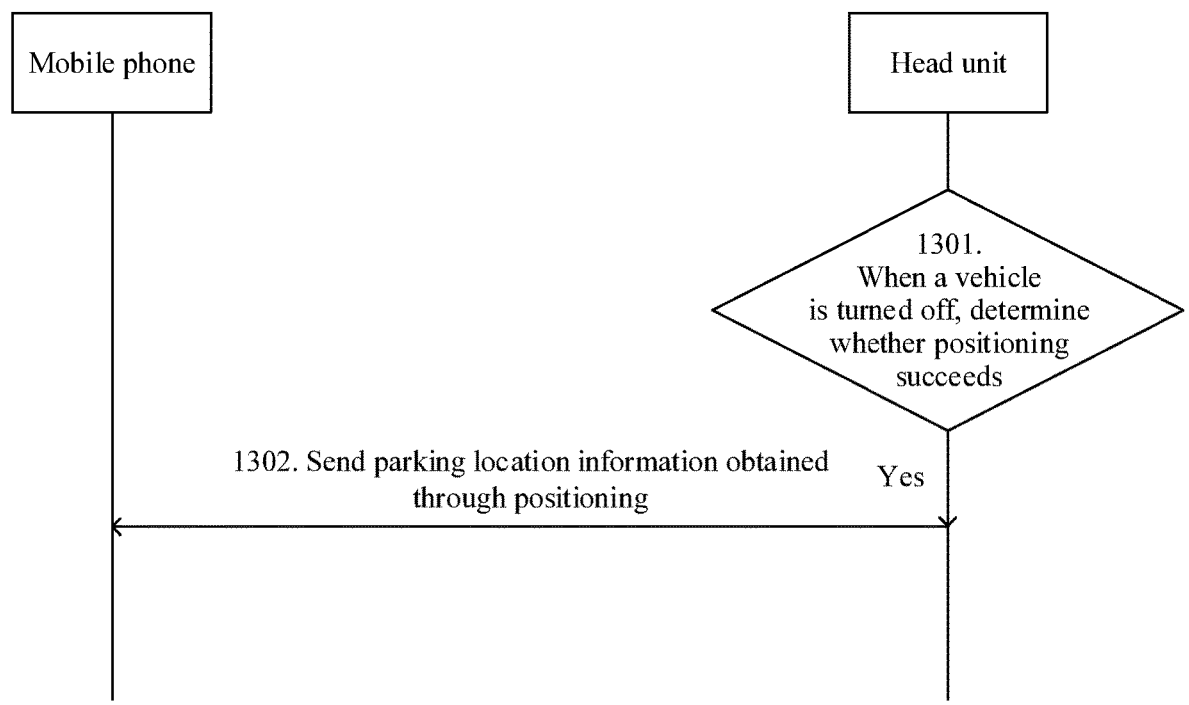
FIG. 13 is a flowchart of obtaining parking location information according to an embodiment of this application.

Specifically, referring to FIG. 13, that the head unit sends the parking location information of the vehicle to the mobile phone may include the following steps.

1301: When the vehicle is turned off, the head unit determines whether positioning succeeds.

If positioning performed by the head unit succeeds, step 1302 is performed.

1302: The head unit sends the parking location information to the mobile phone, where the parking location information is location information obtained by the head unit through positioning.

In some embodiments, if positioning performed by the head unit fails in step 1301, the head unit does not send the parking location information to the mobile phone.

In some embodiments, if positioning performed by the head unit fails in step 1301, the head unit may alternatively send the parking location information to the mobile phone. The parking location information is NULL or a preset value.

In some other embodiments, the head unit may further store the parking location information. The parking location information may be location information obtained by the head unit through positioning, or may be NULL or a preset value.

In some other embodiments, the mobile phone may further send location information request information to the head unit periodically or after receiving an instruction from the user, and the head unit may send current location information obtained through positioning to the mobile phone, so that the user learns of a current location of the vehicle in real time.

In addition, another embodiment of this application further provides another service processing method. In this method, a first device and a second device do not need to exchange a first identifier, a second identifier, and a third identifier. The first device directly sends a location of the first device to the second device, and the second device determines, based on the location of the first device and a location of the second device, whether to perform a service. Further, the first device may further determine, based on whether a location of the first device is normal, whether user identity authentication needs to be performed. Alternatively, when determining that the location of the first device is invalid, the second device may notify the first device to perform user identity authentication. After the authentication succeeds, the second device may perform the service. The method may be applied to scenarios such as credit card swiping, paying a fee at a toll station, opening a home door, opening a vehicle door, a scenario in which a mobile phone simulates a bank card and is swiped on a fixed POS terminal, a scenario in which a mobile phone simulates a bus card and is swiped on a POS terminal of a bus, and a scenario in which a mobile phone simulates a bank card and is swiped on a mobile POS terminal. The following provides specific descriptions by using an example.

Figure 14:
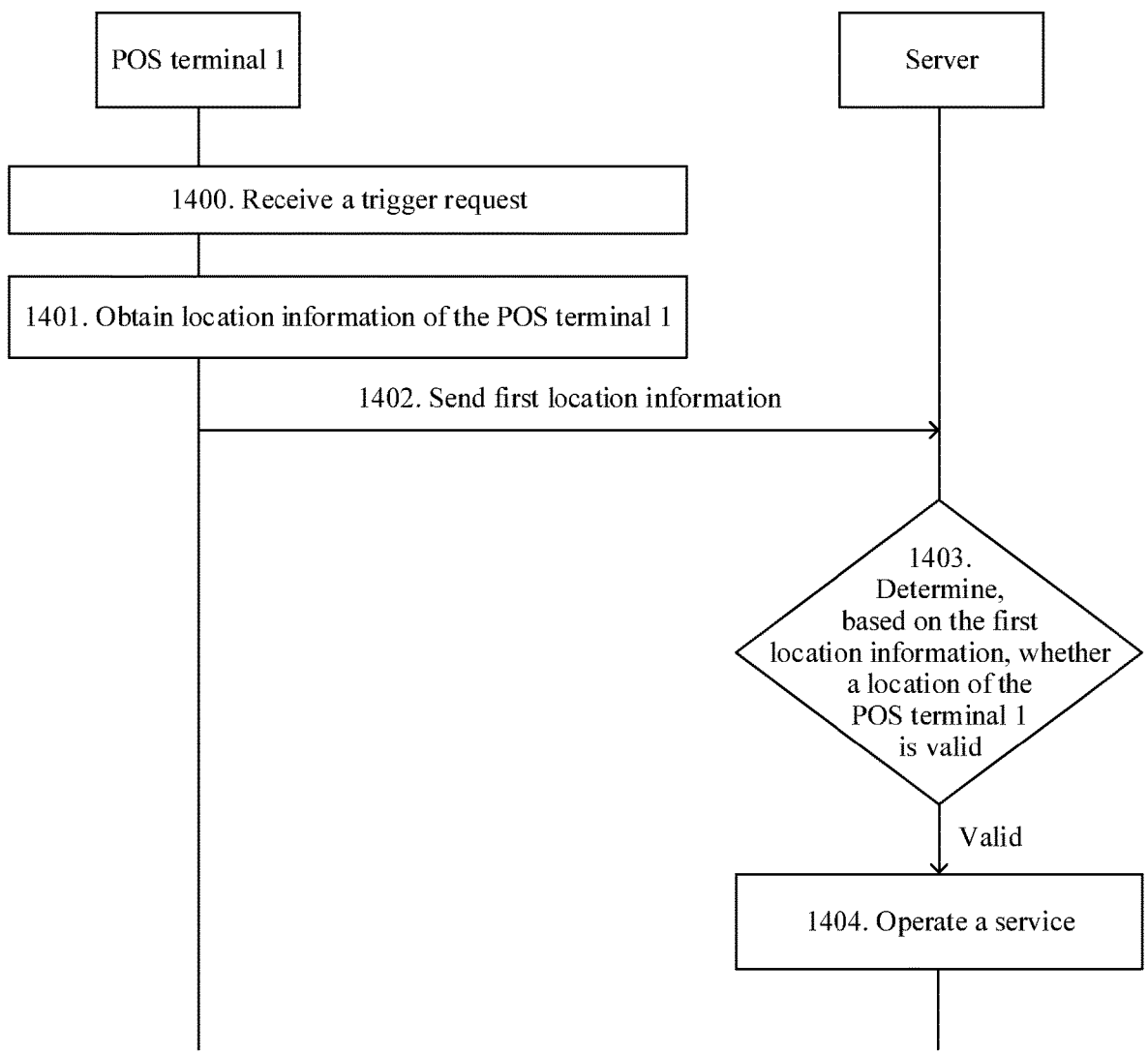
FIG. 14 is a flowchart of another service processing method according to an embodiment of this application.

For example, in a credit card swiping scenario (namely, a payment scenario), the service processing method is described by using an example in which a POS terminal 1 is the first device and a background server of a credit card issuing bank is the second device. Referring to FIG. 14, the method may include the following steps.

1400: The POS terminal 1 receives a trigger request for swiping a credit card.

The trigger request may be triggered by the user on the POS terminal 1, or may be received by the POS terminal 1 from another device. For example, the trigger request may be request information that is sent by a credit card chip and that is received by the POS terminal 1 from the credit card.

1401: The POS terminal 1 obtains location information of the POS terminal 1, namely, first location information.

In response to the trigger request, the POS terminal 1 may obtain the location information of the POS terminal 1 by using a positioning service such as GPS, BeiDou, or Wi-Fi. If positioning performed by the POS terminal 1 succeeds, the first location information is location information obtained through positioning; or if positioning performed by the POS terminal 1 fails, the first location information may be NULL or a preset value.

1402: The POS terminal 1 sends the first location information to a server.

The POS terminal 1 sends the obtained first location information to the server, so that the server determines, based on the location information of the POS terminal 1, whether a location of the POS terminal 1 is valid.

1403: The server determines, based on the first location information, whether the location of the POS terminal 1 is valid.

Before the server determines, based on the first location information, whether the location of the POS terminal 1 is valid, the server may further obtain second location information. The second location information may be reference location information, and may specifically vary with an actual application scenario. If the server determines, based on the first location information and the second location information, that a distance between the location of the POS terminal 1 and a location indicated by the second location information is less than or equal to a first threshold, the server determines that the location of the POS terminal 1 is valid.

In a scenario in which a credit card is swiped, the second location information may be location information of a fixed POS terminal of an authorized merchant. If the location of the POS terminal 1 is near a location of the fixed POS terminal of the authorized merchant, the server may determine that the location of the POS terminal 1 is valid. The location of the fixed POS terminal of the authorized merchant may be preset in a background server of a bank, or may be obtained by the background server of the bank from a receiving bank server of the POS terminal.

1404: If the location of the POS terminal 1 is valid, the server performs a credit card swiping service.

If the location of the POS terminal 1 is near a preset location, the POS terminal 1 may be a POS terminal of a determined authorized merchant. Therefore, the server may perform, for the POS terminal 1, a fee deduction operation of swiping the credit card.

In this solution, the POS terminal 1 may securely and reliably obtain the first location information through a secure module, and then send the first location information to the server. The server determines, based on the first location information, whether the location of the POS terminal 1 is valid, and performs the fee deduction operation when the location of the POS terminal 1 is valid.

In some other embodiments, the POS terminal 1 may further sign the first location information, and send the signed first location information to the server in step 1402. The server performs signature verification after receiving the signed first location information. If the signature verification succeeds, the server sends a service failure message to the POS terminal 1, and refuses to perform the credit card swiping service; or if the signature verification succeeds, the server determines, in step 1403, whether the location of the POS terminal 1 is valid, and performs the credit card swiping service when the location of the POS terminal 1 is valid.

Specifically, the POS terminal 1 may directly obtain the first location information of the POS terminal 1 from a positioning service module through the secure module (for example, an SE module or a TEE module), and sign the first location information through the secure module. In this way, the POS terminal 1 may directly obtain the first location information and store the first location information in the secure module, and the first location information does not pass through the insecure module. Therefore, the first location information is not tampered with by the insecure module, thereby ensuring security and reliability of the first location information. In addition, the POS terminal 1 sends the signed first location information to the server, so that the first location information is not tampered with or forged by another device in a transmission process.

Figure 15:
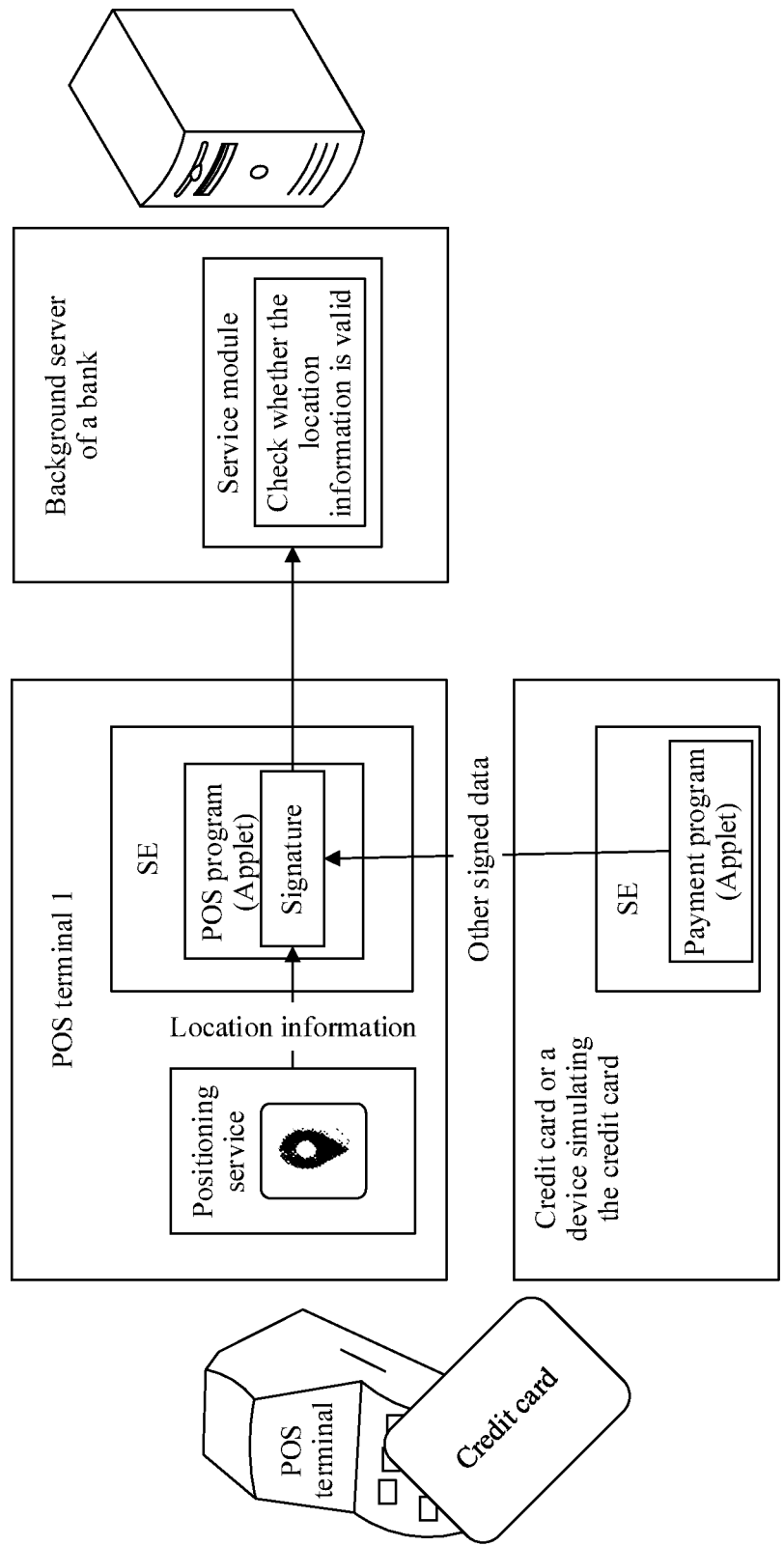
FIG. 15 is a schematic diagram of a service processing scenario according to an embodiment of this application.

To be specific, referring to FIG. 15, an SE module of the POS terminal 1 may obtain the first location information from the positioning service module, sign the first location information of the POS terminal 1, and send the signed first location information to the server. After a service module of the server determines, through signature verification, that the first location information is not forged or tampered with, may determine, based on the first location information, whether the location of the POS terminal 1 is valid, and performs an operation such as fee deduction when the location of the POS terminal 1 is valid.

In some other embodiments, the method may further include: if the location of the POS terminal 1 is invalid, the server sends service failure information to the POS terminal 1, and refuses to perform the credit card swiping service.

In some other embodiments, the first location information sent by the POS terminal 1 to the server may alternatively be unsigned information. After receiving the unsigned first location information, the server may directly determine, based on the first location information without a need to perform signature verification, whether the location of the POS terminal 1 is valid.

In the prior art, there is an illegal operation of cashing out a credit card. Specifically, a cash-out person cooperates with the background of an illegal mobile POS, the cash-out person swipes the credit card by using the mobile POS terminal, and the background of the mobile POS terminal forges this card swiping service into a service that occurs on a fixed POS terminal of an authorized merchant. A background server of a bank considers that the card swiping operation is performed on the fixed POS terminal of the authorized merchant, and therefore allows to swipe the card. If the service processing method provided in this embodiment of this application is used, a current location of the mobile POS is transmitted, in a temper-proof manner, to the background server of the bank by using a signature. If the background server of the bank determines that the location of the mobile POS terminal is not within a proper range, the server refuses to perform the credit card swiping service, to avoid an illegal operation of cashing out the credit card.

Figure 16:
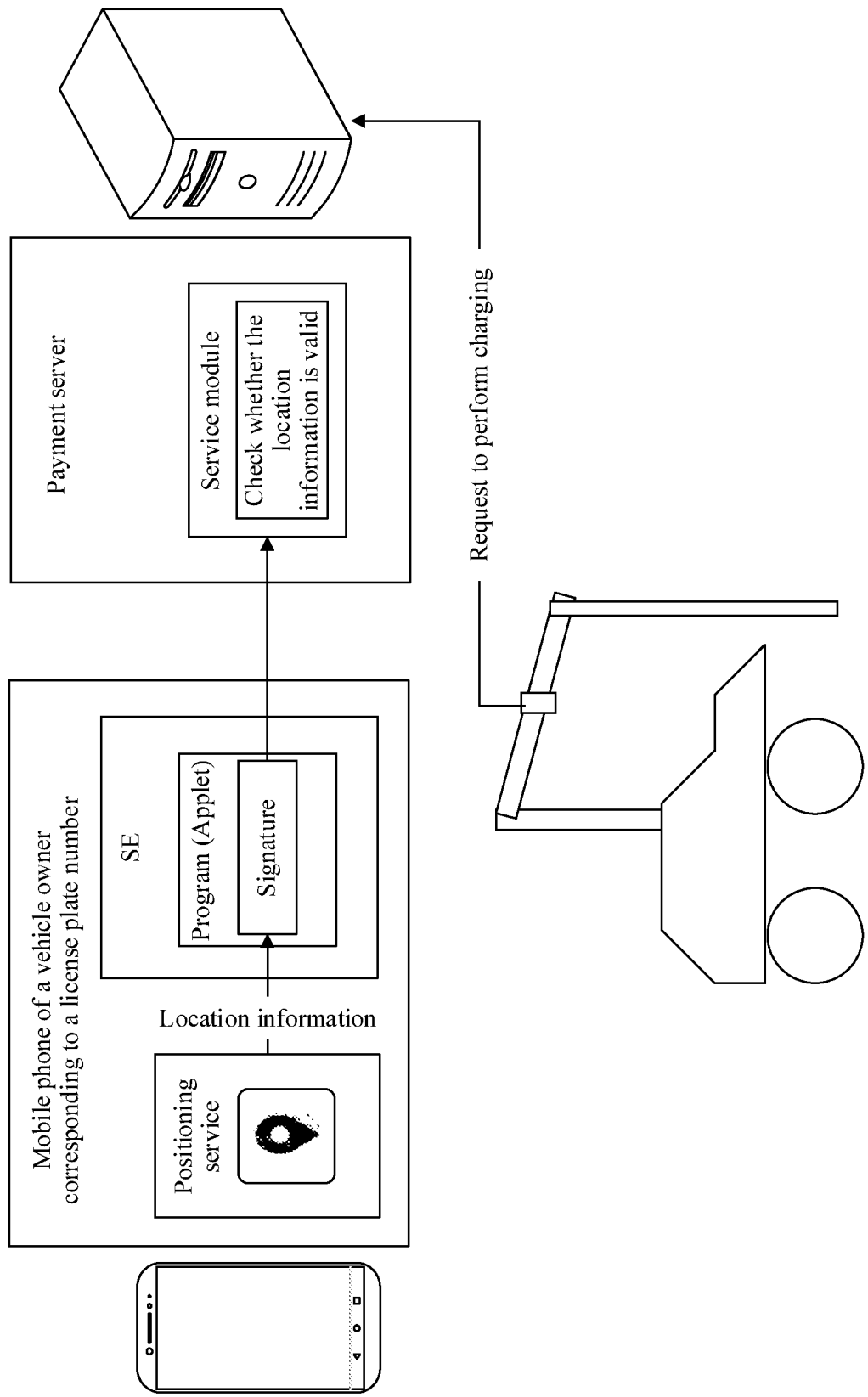
FIG. 16 is a schematic diagram of another service processing scenario according to an embodiment of this application.

For another example, referring to FIG. 16, in a scenario of paying a fee at a toll station, the service processing method is described by using an example in which a mobile phone (or a device such as a wearable device or a head unit) of a vehicle owner is the first device, and a background payment server corresponding to a mobile phone payment account is the second device. Specifically, when the vehicle passes the toll station, a server of the toll station server may send charging request information to the payment server, and the payment server may send service request information to a mobile phone of a payment account bound to a license plate number. Then, the mobile phone obtains current location information, namely, the first location information, through a positioning service module. An SE module of the mobile phone generates signed first location information, and sends the signed first location information to the payment server. After receiving the signed first location information sent by the mobile phone, the payment server performs signature verification on the first location information. If the signature verification succeeds, the payment server determines, based on the first location information, whether the location of the mobile phone is valid. If the location of the mobile phone is valid, the payment server performs a service operation, to charge a fee. If the location of the mobile phone is invalid, the payment server refuses to perform a service operation, and sends service failure information to the mobile phone.

If the payment server determines, based on the first location information and second location information, that a distance between a location of the mobile phone and a location indicated by the second location information is less than or equal to a first threshold, the payment server determines that the location of the mobile phone is valid. The second location information may be location information of the toll station. In other words, if the location of the mobile phone is near the toll station, the payment server may determine that the location of the mobile phone is valid. The location information of the toll station may be information preset in the payment server, or may be information obtained by the payment server from a device in the toll station.

In other words, in this scenario, the mobile phone of the vehicle owner may sign the first location information and then send the signed first location information to the payment server. After determining, through signature verification, that the first location information is not forged or tampered with, the payment server may determine, based on the reliable first location information, whether the location of the mobile phone of the vehicle owner is valid, and perform a charging operation when the location of the mobile phone of the vehicle owner is valid.

In the prior art, there is an illegal operation of using a fake license plate. Specifically, a payment account is bound to a license plate number in advance, an unauthorized user uses a license plate number of another vehicle, and a toll station identifies the license plate number and calculates a payable fee. A background payment server finds the payment account based on the license plate and automatically deducts the fee. If the service processing method provided in this embodiment of this application is used, when the fake license plate passes through the toll station, after finding an associated payment account based on the license plate number, the payment server does not directly perform settlement, but requests, in a wireless manner, to obtain signed location information sent by a mobile phone of a vehicle owner of the license plate. The mobile phone of the vehicle owner transfers, in a temper-proof manner, a current location to the payment server by using a signature. If the payment server determines that the location is not within a proper range of the toll station, the payment server refuses to perform the charging operation, and indicates that there is a risk of the fake license plate.

For another example, in a home door opening scenario, a mobile phone, of the user, that supports a home key application is the first device, and a door lock is the second device. The mobile phone may send signed location information (that is, first location information) of the mobile phone to the door lock. After determining, through signature verification, that the first location information is not forged or tampered with, the door lock may determine, based on the first location information, whether a location of the mobile phone is near a home door, and when the location of the mobile phone is near the home door, determine that the location of the mobile phone is valid, and therefore, open the home door.

When an attacker leads, to a range around the home door in a relay manner, a wireless signal of a mobile phone of a remote user, if the service processing method provided in this embodiment of this application is used, a current location of the mobile phone is transmitted, in a temper-proof manner, to the door lock by using a signature, and the door lock determines that the location of the mobile phone is not in a proper range, that is, the location of the mobile phone is invalid. Therefore, the door lock refuses to operate the service, and sends service failure information to the mobile phone, so as to avoid an illegal operation of unauthorized home door opening caused by a relay attack.

Other applicable scenarios are not described in detail in this embodiment of this application.

In some other embodiments, in the service processing process, if the location of the first device is invalid, the first device may further initiate user identity authentication, and determine, based on an identity authentication result of the user, whether to continue to process the service, thereby improving service security.

For example, a scenario of paying a fee at a toll station is used as an example. If the payment server determines that the location of the mobile phone is invalid, the payment server may send identity authentication request information to the mobile phone. After receiving the identity authentication request information sent by the payment server, the mobile phone prompts the user to perform identity authentication. If identity authentication succeeds, the mobile phone sends authentication success response information to the payment server; or if identity authentication fails, the mobile phone sends authentication failure response information to the payment server. If the payment server receives the authentication success response information, the payment server operates a service and charges a fee; or if the payment server receives the service failure information, the payment server refuses to operate the service.

For another example, in a scenario of paying a fee at a toll station, if the mobile phone of the vehicle owner does not obtain the first location information, or if the mobile phone of the vehicle owner obtains the first location information, but the first location information does not match the historical location information of the mobile phone, it may indicate that the location of the mobile phone is abnormal, and the mobile phone may prompt the user to perform identity authentication. If identity authentication succeeds, the mobile phone sends authentication success indication information to the payment server; or if identity authentication fails, the mobile phone sends authentication failure indication information to the payment server. If the payment server receives the authentication success response information, the payment server operates a service and charges a fee; or if the payment server receives authentication failure information, the payment server refuses to operate the service.

It may be understood that, to implement the foregoing functions, the electronic device includes corresponding hardware and/or software modules for performing the functions. With reference to algorithm steps of each example described in the embodiments disclosed in this specification, this application may be implemented in a form of hardware or a combination of hardware and computer software. Whether a function is performed by hardware or hardware driven by computer software depends on particular applications and design constraints of the technical solutions. A person skilled in the art may use different methods to implement the described functions for each particular application with reference to the embodiments, but it should not be considered that the implementation goes beyond the scope of the embodiments of this application.

In the embodiments, the electronic device may be divided into function modules based on the example in the foregoing method. For example, each function module corresponding to each function may be obtained through division, or two or more functions may be integrated into one processing module. The integrated module may be implemented in a form of hardware. It should be noted that, in this embodiment of this application, division into modules is an example, and is merely a logical function division. In actual implementation, another division manner may be used.

Figure 17:
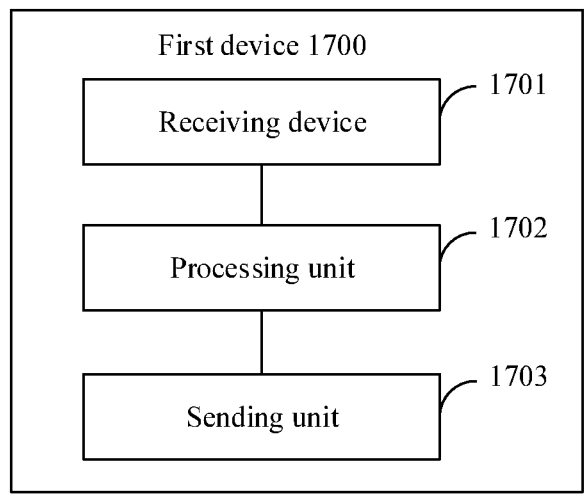
FIG. 17 is a schematic structural diagram of a first device according to an embodiment of this application.

When function modules are obtained through division by using corresponding functions, FIG. 17 is a schematic diagram of possible composition of a first device 1700 according to the foregoing embodiment. As shown in FIG. 17, the first device 1700 may include a receiving unit 1701, a processing unit 1702, and a sending unit 1703.

In some embodiments, the receiving unit 1701 may be configured to support the first device 1700 in performing step 601, step 806, step 1201, step 1302, or the like, and/or another process of the technology described in this specification.

The processing unit 1702 may be configured to support the first device 1700 in performing step 602, step 604, step 807, step 808A, step 808B, step 809, step 811, step 812, step 813, step 819, step 1202, step 1203, step 1204, step 1205, or the like, and/or another process used for the technology described in this specification.

The sending unit 1703 may be configured to support the first device 1700 in performing step 603, step 605, step 810A, step 810B, step 1206A, step 1206B, or the like, and/or another process of the technology described in this specification.

In some other embodiments, the receiving unit 1701 may be configured to support the first device 1700 in performing step 1400, and/or another process of the technology described in this specification. The processing unit 1702 may be configured to support the first device 1700 in performing step 1401, and/or another process of the technology described in this specification. The sending unit 1703 may be configured to support the first device 1700 in performing step 1402, and/or another process of the technology described in this specification.

It should be noted that all related content of the steps in the foregoing method embodiments may be cited in function descriptions of corresponding function modules. Details are not described herein again.

The first device 1700 provided in this embodiment of this application is configured to perform the foregoing service processing method, and therefore, an effect the same as that of the foregoing implementation may be achieved.

When an integrated unit is used, the first device 1700 may include a processing module, a storage module, and a communications module. The processing module may be configured to control and manage actions of the first device 1700, for example, may be configured to support the first device in performing the steps performed by the processing unit 1702. The storage module may be configured to support the first device 1700 in storing the first identifier, the parking location information, the first location information, and the like, and storing program code, data, and the like. The communications module may be configured to support the first device 1700 in communicating with another device, for example, may be configured to support the first device 1700 in performing the steps performed by the receiving unit 1701 and the sending unit 1703.

The processing module may be a processor or a controller. The processor may implement or execute various example logical blocks, modules, and circuits described with reference to content disclosed in this application. Alternatively, the processor may be a combination of processors implementing a computing function, for example, a combination of one or more microprocessors, or a combination of digital signal processor (digital signal processing, DSP) and a microprocessor. The storage module may be a memory. The communications module may be specifically a device that interacts with another electronic device, such as a radio frequency circuit, a Bluetooth chip, or a Wi-Fi chip.

In an embodiment, when the processing module is a processor and the storage module is a memory, the first device in this embodiment may be an electronic device in the structure shown in FIG. 3 and FIG. 4.

Figure 18:
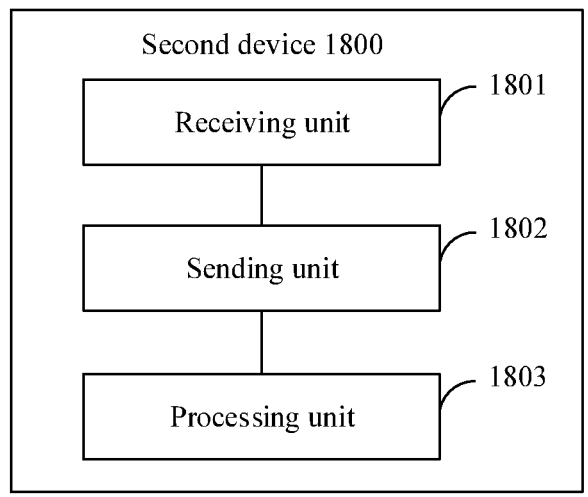
FIG. 18 is a schematic structural diagram of a second device according to an embodiment of this application.

When function modules are obtained through division by using corresponding functions, FIG. 18 is a schematic diagram of possible composition of a second device 1800 according to the foregoing embodiment. As shown in FIG. 18, the second device 1800 may include a receiving unit 1801, a sending unit 1802, and a processing unit 1803.

The receiving unit 1801 may be configured to support the second device 1800 in performing step 600, step 603, step 605, step 810A, step 810B, step 1206A, step 1206B, or the like, and/or another process of the technology described in this specification.

The sending unit 1802 may be configured to support the second device 1800 in performing step 601, step 806, step 1201, step 1302, and/or another process of the technology described in this specification.

The processing unit 1803 may be configured to support the second device 1800 in performing step 606, step 607, steps 800 to 805, steps 814 to 818, steps 1207 to 1209, step 1210A, step 1210B, or the like, and/or another process of the technology described in this specification.

In some other embodiments, the second device 1800 may include a receiving unit 1801 and a processing unit 1803. The receiving unit 1801 may be configured to support the second device 1800 in performing step 1402, or the like, and/or another process of the technology described in this specification. The processing unit 1803 may be configured to support the second device 1800 in performing step 1403, step 1404, or the like, and/or another process of the technology described in this specification.

It should be noted that all related content of the steps in the foregoing method embodiments may be cited in function descriptions of corresponding function modules. Details are not described herein again.

The second device 1800 provided in this embodiment of this application is configured to perform the foregoing notification message processing method, and therefore, an effect the same as that of the foregoing implementation may be achieved.

When an integrated unit is used, the second device 1800 may include a processing module, a storage module, and a communications module. The processing module may be configured to control and manage actions of the second device 1800, for example, may be configured to support the second device 1800 in performing the steps performed by the processing unit 1803. The storage module may be configured to support the second device 1800 in storing a first identifier, parking location information, and the like, and storing program code, data, and the like. The communications module may be configured to support the second device 1800 in communicating with another device, for example, may be configured to support the second device 1800 in performing the steps performed by the receiving unit 1801 and the sending unit 1802.

An embodiment of this application further provides a computer storage medium. The computer storage medium stores a computer instruction, and when the computer instruction is run on a first device, the first device performs the foregoing related method steps to implement the service processing method in the foregoing embodiments.

An embodiment of this application further provides a computer program product. When the computer program product is run on a computer, the computer performs the foregoing related steps, to implement the service processing method performed by the first device in the foregoing embodiments.

In addition, an embodiment of this application further provides an apparatus. The apparatus may be specifically a chip, a component, or a module. The apparatus may include a processor and a memory that are connected. The memory is configured to store a computer executable instruction, and when the apparatus runs, the processor may execute the computer executable instruction stored in the memory, so that the chip performs the service processing method in the foregoing method embodiments.

An embodiment of this application further provides a computer storage medium. The computer storage medium stores a computer instruction, and when the computer instruction is run on an electronic device, the second device performs the foregoing related method steps to implement the service processing method in the foregoing embodiments.

An embodiment of this application further provides a computer program product. When the computer program product is run on a computer, the computer performs the foregoing related steps, to implement the service processing method performed by the second device in the foregoing embodiments.

In addition, an embodiment of this application further provides an apparatus. The apparatus may be specifically a chip, a component, or a module. The apparatus may include a processor and a memory that are connected. The memory is configured to store a computer executable instruction, and when the apparatus runs, the processor may execute the computer executable instruction stored in the memory, so that the chip performs the service processing method performed by the second device in the foregoing method embodiments.

The electronic device, the computer storage medium, the computer program product, or the chip provided in the embodiments is configured to perform the corresponding method provided above. Therefore, for beneficial effects that can be achieved, refer to the beneficial effects in the corresponding method provided above. Details are not described herein again.

Another embodiment of this application provides a system. The system may include the foregoing first device and the foregoing second device, and may be configured to implement the foregoing service processing method.

The foregoing descriptions about implementations allow a person skilled in the art to understand that, for the purpose of convenient and brief description, division into the foregoing function modules is taken as an example for illustration. In actual application, the foregoing functions can be allocated to different modules and implemented based on a requirement, that is, an inner structure of an apparatus is divided into different function modules to implement all or some of the functions described above.

In the several embodiments provided in this application, it should be understood that the disclosed apparatus and method may be implemented in other manners. For example, the described apparatus embodiment is merely an example. For example, division into modules or units is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed on different places. Some or all of the units may be selected based on actual requirements to achieve the objectives of the solutions of the embodiments.

In addition, function units in the embodiments of this application may be integrated into one processing unit, or each of the units may exist alone physically, or two or more units are integrated into one unit. The integrated unit may be implemented in a form of hardware, or may be implemented in a form of a software function unit.

When the integrated unit is implemented in the form of a software function unit and sold or used as an independent product, the integrated unit may be stored in a readable storage medium. Based on such an understanding, the technical solutions of this application essentially, or the part contributing to the prior art, or all or some of the technical solutions may be implemented in the form of a software product. The software product is stored in a storage medium and includes several instructions for instructing a device (which may be a single-chip microcomputer, a chip, or the like) or a processor (processor) to perform all or some of the steps of the methods described in the embodiments of this application. The foregoing storage medium includes: any medium that can store program code, such as a USB flash drive, a removable hard disk, a read-only memory (read-only memory, ROM), a random access memory (random access memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A first device, comprising:
a memory configured to store instructions; and
a processor coupled to the memory and configured to execute the instructions to cause the first device to:
receive a first identifier from a second device in response to a trigger request to perform a first service, wherein the first identifier is in a first state or a second state, wherein the first service is an unlocking service or a payment service, wherein a second location of the second device or a first location of the first device is abnormal when the first identifier is in the first state, and wherein the first location or the second location is normal when the first identifier is in the second state; and
if the first device determines, based on the first identifier in the first state, to perform authentication and the authentication succeeds, send, by the first device, a second identifier to the second device, wherein the second identifier indicates that the second device is to perform the first service; or
if the first device determines, based on the first identifier in the second state, not to perform the authentication, send, by the first device, first information to the second device, wherein the first information comprises first location information and a third identifier, wherein the first location information is of the first device, wherein the third identifier indicates that the first location and the second location are normal when the first identifier is in the second state, and wherein the first identifier in the first state, the first identifier in the second state, the second identifier, and the third identifier are different identifiers.

2. The first device of claim 1, wherein the instructions further cause the first device to send second information comprising the second identifier to the second device, wherein either the first information or the second information is signed information.

3. The first device of claim 1, wherein before sending the second identifier or the first information, the instructions further cause the first device to:
perform a positioning to obtain the first location information;
determine to perform the authentication when the first identifier is in the first state;
determine to perform the authentication when the first identifier is in the second state and the positioning fails; and
determine to perform the authentication when the first identifier is in the second state and the first location information does not match historical location information of the first device.

4. The first device of claim 1 wherein before sending the second identifier or the first information, the instructions further cause the first device to:
perform a positioning to obtain the first location information; and determine not to perform the authentication when the first identifier is in the second state and the first location information matches historical location information of the first device.

5. The first device of claim 1, wherein the first device is a mobile terminal and the second device is a head device of a vehicle or a lock when the first service is the unlocking service.

6. The first device of claim 5, wherein the second device is the head device, and wherein before sending the second identifier or the first information, the instructions further cause the first device to:
obtain parking location information of a third location at which the vehicle is located when the vehicle is turned off;
perform a positioning to obtain the first location information;
determine to perform the authentication when the first identifier is in the second state, the first location information matches historical location information of the first device, and the first location information does not match the parking location information; and
determine not to perform the authentication when the first identifier is in the second state, the first location information matches the historical location information, and the first location information matches the parking location information.

7. The first device of claim 6, wherein the instructions further cause the first device to obtain the parking location information by receiving the parking location information from the second device.

8. The first device of claim 6, wherein the instructions further cause the first device to obtain the parking location information by:
receiving, from the second device, parking location request information; and
performing, in response to the parking location request information, a second positioning to obtain the parking location information.

9. The first device of claim 1, wherein when the first service is a payment service, the first device is a mobile terminal and the second device is a charging terminal when the first service is the payment service.

10. A second device, comprising:
a memory configured to store instructions; and
a processor coupled to the memory and configured to execute the instructions to cause the first device to:
receive a trigger request to perform a first service, wherein the first service is either an unlocking service or a payment service;
send a first identifier to a first device, wherein the first identifier is in a first state or a second state, wherein a second location of the second device or a first location of the first device is abnormal when the first identifier is in the first state, and wherein the first location or the second location is normal when the first identifier is in the second state; and
perform the first service if the second device receives a second identifier from the first device, wherein the second identifier indicates to perform the first service; or
if the second device receives a third identifier and first location information from the first device, determine, based on the first location information, whether the location of the first device is valid, wherein the first location information is of the first device, wherein the third identifier indicates that the first location and the second location are normal when the first identifier is in the second state, and wherein the first identifier in the first state, the first identifier in the second state, the second identifier, and the third identifier are different identifiers; and
perform the first service if the location of the first device is valid.

11. The second device of claim 10, wherein the instructions further cause the second device to:
identify that the first location is invalid; and
send, in response to the identifying, the first identifier in the first state to the first device.

12. The second device of claim 10, wherein the instructions further cause the second device to:
receive, from the first device, third information;
perform, signature verification on the third information;
perform the first service when the signature verification succeeds and the third information comprises the second identifier; and
determine, based on the first location information, whether the first location is valid when the signature verification succeeds, and the third information comprises the third identifier and the first location information.

13. The second device of claim 10, wherein before sending the first identifier to the first device, the instructions further cause the second device to obtain the first identifier from a storage.

14. The second device of claim 10, wherein before sending the first identifier to the first device, the instructions further cause the second device to:
perform a positioning to obtain second location information;
set the first identifier to be in the first state when the positioning fails or the second location information does not match historical location information of the second device; and
set the first identifier to be in the second state when the second location information-matches the historical location information.

15. The second device of claim 14, wherein the instructions cause the second device to determine, based on the first location information, whether the location of the first device is valid by:
identifying that a distance between a fourth location indicated by the first location information and a fifth location indicated by the second location information is less than or equal to a preset threshold; and
determining, in response to the identifying, that the first location is valid.

16. The second device of claim 10, wherein the first device is a mobile terminal and the second device is a charging terminal when the first service is the payment service.

17. The second device of claim 10, wherein the first device is a mobile terminal and the second device is a head device of a vehicle or a lock when the first service is the unlocking service.

18. The second device of claim 17, wherein the second device is the head device, wherein before determining whether the first location is valid, the instructions further cause the second device to obtain the second location information from a storage, wherein the second location information is parking location information, and wherein the parking location information is of a third location at which the vehicle is located when the vehicle is turned off.

19. The second device of claim 17, wherein before receiving the third information from the first device, the instructions further cause the second device to:
 identify that the vehicle is turned off; and
 send, in response to the identifying, parking location information to the first device, wherein the parking location information is of a third location at which the vehicle is located when the vehicle is turned off.

20. A system, comprising:
a first device; and
a second device,
wherein the first device comprises:
 a first memory configured to store first instructions; and
 a first processor coupled to the first memory and configured to execute the first instructions to cause the first device to:
  receive a first identifier from the second device, wherein the first identifier is received from the second device after the second device receives a trigger request used to perform a first service, wherein the first identifier is in a first state or a second state, wherein the first service is an unlocking service or a payment service, wherein that the first identifier is in the first state indicates that a location of the second device or a location of the first device is abnormal, and wherein that the first identifier is in the second state indicates that the location of the first device or the second device is normal; and
  if the first device determines, based on the received first identifier in the first state, to perform authentication and the authentication succeeds, send a second identifier to the second device, wherein the second identifier indicates that it is determined to perform the first service; or
  if the first device determines, based on the received first identifier in the second state, not to perform authentication, send first information to the second device, wherein the first information comprises first location information and a third identifier, wherein the first location information is location information of the first device, wherein the third identifier indicates that the location of the first device and the location of the second device are normal when the first identifier is in the second state, and wherein the first identifier in the first state, the first identifier in the second state, the second identifier, and the third identifier are different identifiers; and
wherein the second device comprises:
 a second memory configured to store second instructions; and
 a second processor coupled to the second memory and configured to execute the second instructions to cause second device to:
  receive a trigger request used to perform a first service, wherein the first service is an unlocking service or a payment service;
  send a first identifier to a first device, wherein the first identifier is in a first state or a second state, wherein that the first identifier is in the first state indicates that a location of the second device or a location of the first device is abnormal, and wherein that the first identifier is in the second state indicates that the location of the second device is normal; and
  perform the first service if the second device receives a second identifier from the first device, wherein the second identifier indicates that it is determined to perform the first service; or
  if the second device receives a third identifier and first location information that are received from the first device, determine based on the first location information, whether the location of the first device is valid, wherein the first location information is location information of the first device, wherein the third identifier indicates that the location of the first device and the location of the second device are normal the first identifier is in the second state, and wherein the first identifier in the first state, the first identifier in the second state, the second identifier, and the third identifier are different identifiers; and
  perform the first service if the location of the first device is valid.

* * * * *

UNITED STATES PATENT AND TRADEMARK OFFICE
CERTIFICATE OF CORRECTION

| | |
|---|---|
| PATENT NO. | : 11,910,197 B2 |
| APPLICATION NO. | : 17/271281 |
| DATED | : February 20, 2024 |
| INVENTOR(S) | : Zhuofei Li |

It is certified that error appears in the above-identified patent and that said Letters Patent is hereby corrected as shown below:

On the Title Page

Item (73) HUAWEI TECHNOLOGIES CO., LTD., Shenzhen (CN) should read Huawei Device Co., Ltd., Dongguan (CN)

Signed and Sealed this
Thirteenth Day of August, 2024

Katherine Kelly Vidal
*Director of the United States Patent and Trademark Office*